(12) United States Patent
Kubota et al.

(10) Patent No.: US 8,767,166 B2
(45) Date of Patent: Jul. 1, 2014

(54) LIQUID CRYSTAL DISPLAY DEVICE

(75) Inventors: Daisuke Kubota, Kanagawa (JP);
Tetsuji Ishitani, Kanagawa (JP); Akio Yamashita, Kanagawa (JP); Tomohiro Tamura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 295 days.

(21) Appl. No.: 12/952,751

(22) Filed: Nov. 23, 2010

(65) Prior Publication Data

US 2011/0128491 A1 Jun. 2, 2011

(30) Foreign Application Priority Data

Nov. 27, 2009 (JP) .................................. 2009-270055

(51) Int. Cl.
*C09K 19/02* (2006.01)
*G02F 1/1337* (2006.01)
*G02F 1/1343* (2006.01)
*G02F 1/137* (2006.01)

(52) U.S. Cl.
CPC *G02F 1/133707* (2013.01); *G02F 2001/13775* (2013.01); *G02F 2001/13793* (2013.01); *G02F 1/134336* (2013.01)
USPC ............................ 349/182; 349/139; 349/141

(58) Field of Classification Search
CPC ............................................... G02F 1/134363
USPC .................................................. 349/139, 141
See application file for complete search history.

(56) References Cited

U.S. PATENT DOCUMENTS

| 6,097,465 | A | 8/2000 | Hiroki et al. |
| 6,175,395 | B1 | 1/2001 | Yamazaki et al. |
| 6,266,109 | B1 * | 7/2001 | Yamaguchi et al. ............ 349/86 |
| 6,449,024 | B1 | 9/2002 | Hirakata et al. |
| 7,038,754 | B2 | 5/2006 | Hirakata et al. |

(Continued)

FOREIGN PATENT DOCUMENTS

| JP | 2005-227760 | 8/2005 |
| JP | 2007-171938 | 7/2007 |

(Continued)

OTHER PUBLICATIONS

International Search Report (Application No. PCT/JP2010/070420; PCT12951) Dated Dec. 21, 2010.

(Continued)

*Primary Examiner* — Edward Glick
*Assistant Examiner* — Sang V Nguyen
(74) *Attorney, Agent, or Firm* — Nixon Peabody LLP; Jeffrey L. Costellia

(57) ABSTRACT

In the liquid crystal display device where a liquid crystal layer exhibiting a blue phase is interposed between a first substrate and a second substrate, a pixel electrode layer (first electrode layer) and a common electrode layer (second electrode layer) provided between the first substrate and the liquid crystal layer are positioned not to overlap with each other. The pixel electrode layer is formed to cover top and side surfaces of a rib-shaped first structure body which projects into the liquid crystal layer from a surface of the first substrate on the liquid crystal layer side. The common electrode layer is formed to cover top and side surfaces of a rib-shaped second structure body which projects into the liquid crystal layer from the surface of the first substrate on the liquid crystal layer side.

36 Claims, 33 Drawing Sheets

(56) References Cited

U.S. PATENT DOCUMENTS

| | | | |
|---|---|---|---|
| 7,136,128 B2* | 11/2006 | Hirakata et al. | 349/141 |
| 7,211,825 B2 | 5/2007 | Shih et al | |
| 7,327,433 B2 | 2/2008 | Miyachi et al. | |
| 7,342,632 B2 | 3/2008 | Miyachi et al. | |
| 7,576,829 B2 | 8/2009 | Kikuchi et al. | |
| 7,728,942 B2 | 6/2010 | Hirakata et al. | |
| 8,058,647 B2* | 11/2011 | Kuwabara et al. | 257/43 |
| 8,188,477 B2* | 5/2012 | Miyairi et al. | 257/59 |
| 8,236,635 B2* | 8/2012 | Suzawa et al. | 438/197 |
| 8,355,109 B2 | 1/2013 | Kubota et al. | |
| 2005/0179847 A1* | 8/2005 | Miyachi et al. | 349/141 |
| 2005/0185125 A1* | 8/2005 | Miyachi et al. | 349/128 |
| 2005/0237472 A1* | 10/2005 | Shibahara et al. | 349/167 |
| 2006/0203169 A1 | 9/2006 | Ozawa et al. | |
| 2006/0227283 A1 | 10/2006 | Ooi et al. | |
| 2006/0279685 A1* | 12/2006 | Hirakata et al. | 349/141 |
| 2007/0070282 A1* | 3/2007 | Shibahara et al. | 349/141 |
| 2007/0126969 A1 | 6/2007 | Kimura et al. | |
| 2008/0129901 A1* | 6/2008 | You et al. | 349/33 |
| 2008/0259254 A1 | 10/2008 | Kikuchi et al. | |
| 2009/0109202 A1 | 4/2009 | Kitagawa | |
| 2009/0153761 A1 | 6/2009 | Park et al. | |
| 2010/0053490 A1* | 3/2010 | Kang et al. | 349/48 |
| 2010/0072471 A1* | 3/2010 | Yamazaki et al. | 257/43 |
| 2010/0091228 A1* | 4/2010 | Kim et al. | 349/122 |
| 2010/0165280 A1 | 7/2010 | Ishitani et al. | |
| 2010/0195028 A1 | 8/2010 | Kubota et al. | |
| 2010/0245724 A1 | 9/2010 | Nishi et al. | |
| 2010/0302492 A1 | 12/2010 | Kubota et al. | |
| 2011/0025938 A1 | 2/2011 | Hirakata et al. | |

FOREIGN PATENT DOCUMENTS

| | | |
|---|---|---|
| JP | 2008-112022 | 5/2008 |
| JP | 2009-109656 A | 5/2009 |
| JP | 2009-145865 | 7/2009 |
| WO | WO-2005/090520 A1 | 9/2005 |

OTHER PUBLICATIONS

Written Opinion (Application No. PCT/JP2010/070420; PCT12951) Dated Dec. 21, 2010.

* cited by examiner

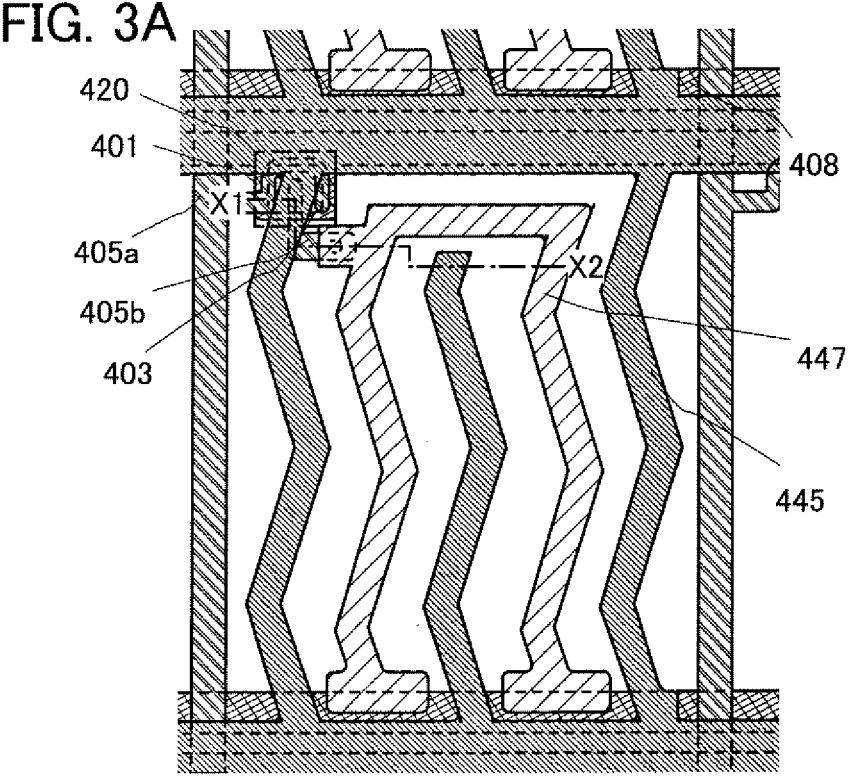
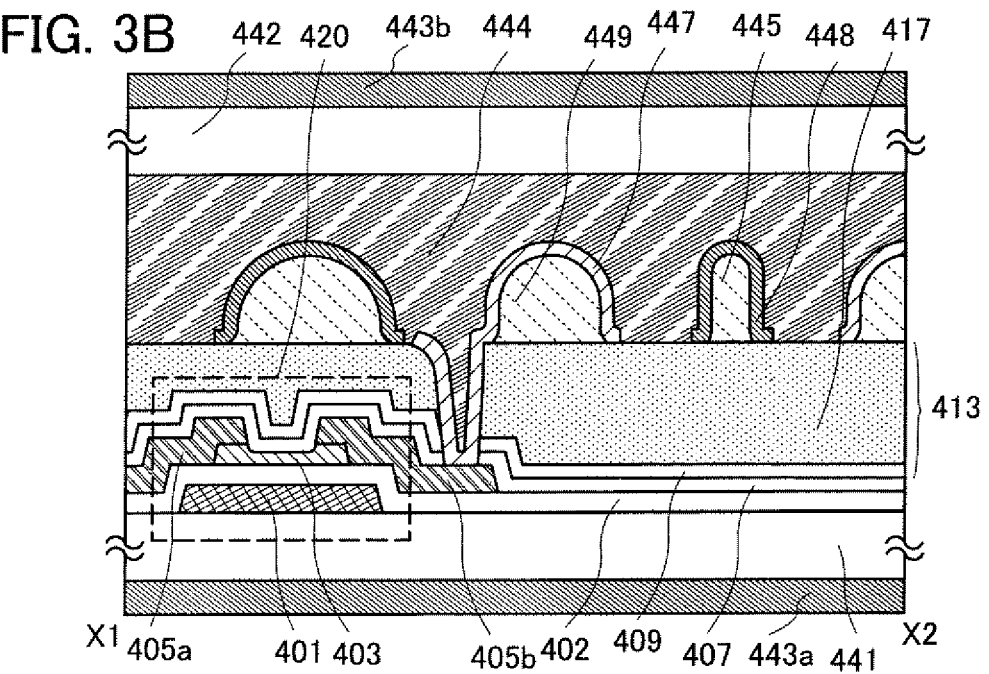

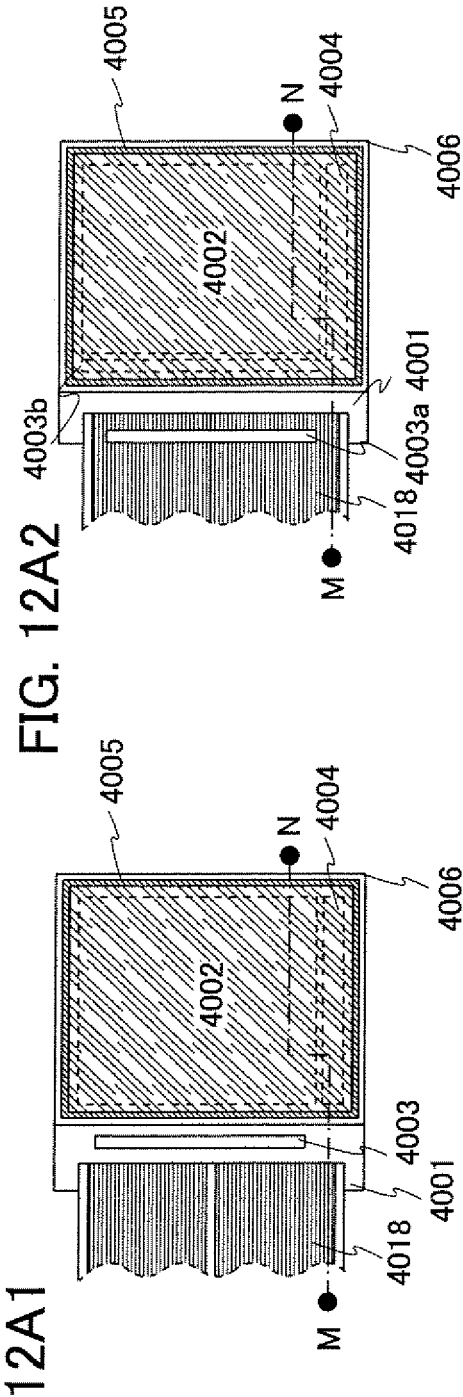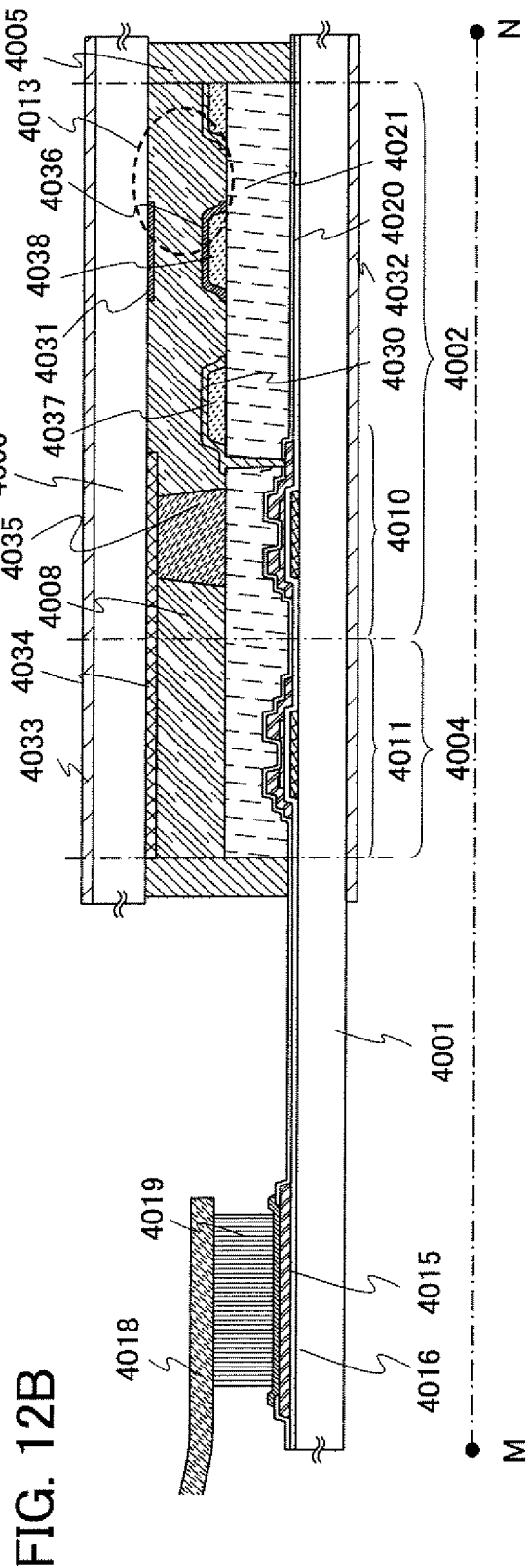
FIG. 12A1
FIG. 12A2
FIG. 12B

LIQUID CRYSTAL DISPLAY DEVICE

TECHNICAL FIELD

The present invention relates to a liquid crystal display device and a manufacturing method thereof.

BACKGROUND ART

A liquid crystal display device having a liquid crystal element, a light-emitting device having a self-light-emitting element, a field emission display (FED), and the like have been competitively developed in the market of display devices which are thin and lightweight (so-called flat panel displays).

Increase in response speed of liquid crystal molecules is required for liquid crystal display devices. A display mode of liquid crystal has a variety of types, and among them, a ferroelectric liquid crystal (FLC) mode, an optical compensated birefringence (OCB) mode, and a mode using liquid crystal exhibiting a blue phase can be given as liquid crystal modes capable of high-speed response.

In particular, with the use of a mode using liquid crystal exhibiting a blue phase, an alignment film is not necessary and the viewing angle can be widened; thus, research for practical use has been promoted (e.g., see Patent Document 1). Patent Document 1 reports that liquid crystal is subjected to polymer stabilization treatment so that the temperature range where a blue phase is exhibited is widened.

REFERENCE

[Patent Document 1] PCT International Publication No. 05/090520

DISCLOSURE OF INVENTION

A problem for liquid crystal display devices is that high white transmittance (light transmittance in white display) is necessary in order to achieve high contrast.

Therefore, in order to achieve higher contrast, it is an object to provide a liquid crystal display device which is suitable for a liquid crystal display mode using liquid crystal exhibiting a blue phase.

It is another object to achieve reduction in power consumption of a liquid crystal display device including liquid crystal exhibiting a blue phase.

In a liquid crystal display device in which a liquid crystal layer exhibiting a blue phase is interposed between a first substrate and a second substrate, a pixel electrode layer (a first electrode layer) having an opening pattern (slit) and a common electrode layer (a second electrode layer) having an opening pattern (slit), which are provided between the first substrate and the liquid crystal layer, are positioned so as not to overlap with each other. The pixel electrode layer is formed to cover a top surface and a side surface of a rib-shaped first structure body which is provided to project into the liquid crystal layer from a surface of the first substrate on the liquid crystal layer side (a surface that faces the liquid crystal layer). The common electrode layer is formed to cover a top surface and a side surface of a rib-shaped second structure body which is provided to project into the liquid crystal layer from the surface of the first substrate on the liquid crystal layer side.

Another common electrode layer may be provided on a counter substrate (the second substrate) side so that a pair of common electrode layers faces each other. In this case, a first common electrode layer on the first substrate side and a second common electrode layer (a third electrode layer) on the second substrate side are positioned so as to overlap with each other with the liquid crystal layer interposed therebetween.

The pixel electrode layer and the first common electrode layer which are formed over the first substrate and the second common electrode layer which is formed on the second substrate are fixed to each other with a sealant with the liquid crystal layer interposed therebetween. The pixel electrode layer, the first common electrode layer, and the second common electrode layer have various opening patterns and each have a shape including a bend portion or a branching comb-like shape, instead of a flat shape. Moreover, in the case of forming the second common electrode layer, the first common electrode layer and the second common electrode layer have substantially the same pattern at least in a pixel region in a plan view and are positioned so as to overlap with each other with the liquid crystal layer interposed therebetween. The first common electrode layer and the second common electrode layer overlap at least partly with each other.

The first structure body and the second structure body are rib-shaped. The rib-shaped first structure body and the rib-shaped second structure body reflect the shapes of the pixel electrode layer and the common electrode layer, which are formed over the top surfaces and the side surfaces thereof, and each have an opening pattern and a shape including a bend portion or a branching comb-like shape.

The pixel electrode layer is provided so as to cover the top surface and the side surface of the first structure body and the common electrode layer is provided so as to cover the top surface and the side surface of the second structure body, whereby the formation area of the pixel electrode layer and the common electrode layer can be increased in a thickness direction (three-dimensionally) of the liquid crystal layer. Accordingly, when voltage is applied between the pixel electrode layer and the common electrode layer, an electric field can be widely formed between the pixel electrode layer and the common electrode layer.

In addition, when the second common electrode layer is provided on the second substrate side, an electric field can be applied to liquid crystal in an oblique direction (in a direction oblique to the substrate) between the pixel electrode layer and the second common electrode layer; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance (light transmittance in black display) can also be increased. Further, an electric field can be effectively applied even to a liquid crystal material (a liquid crystal mixture) exhibiting a blue phase, which has high viscosity; therefore, reduction in power consumption can also be achieved.

The structure bodies can be formed using an insulator which includes an insulating material (an organic material or an inorganic material) and/or a conductor which includes a conductive material (an organic material or an inorganic material). Typically, a visible light curable resin, an ultraviolet curable resin, or a thermosetting resin is preferably used. For example, an acrylic resin, an epoxy resin, an amine resin, or the like can be used. Moreover, the structure bodies may be formed using a conductive resin or a metal material. Note that the structure bodies may each have a stacked-layer structure of plural thin films.

Each of the structure bodies can have a columnar shape, a truncated conical or pyramidal shape with a flat top surface and a trapezoidal cross section, a conical or pyramidal shape with a rounded dome top, or the like. In this specification, since a pixel electrode layer and a common electrode layer (a first common electrode layer) are formed so as to cover surfaces (top surfaces and side surfaces) of structure bodies, it is preferable that the structure bodies each have a curved surface with little unevenness so as to be favorably covered with the pixel electrode layer and the common electrode layer (the first common electrode layer). Further, a material with a light-transmitting property with respect to visible light is preferably used for the structure bodies because reduction in aperture ratio and white transmittance can be prevented.

Furthermore, each of the structure bodies may be a portion which projects into the liquid crystal layer from the surface of the first substrate on the liquid crystal layer side; thus, a projecting structure body may be formed by processing an interlayer film so that the surface on the liquid crystal layer side is uneven. Accordingly, each of the structure bodies may be formed using a continuous film provided with a plurality of projections, or the first structure body and the second structure body may be formed as a continuous film.

In this specification, a first electrode layer (a pixel electrode layer) and a second electrode layer (a common electrode layer) (or a third electrode layer (a second common electrode layer) each have a comb-like pattern which does not form a closed space and is opened. The first electrode layer and the second electrode layer are not in contact with each other, and they are provided over the same insulating surface (e.g., the same substrate or the same insulating film) such that their comb-like patterns are engaged with each other.

In this specification, a substrate which is provided with a semiconductor element (e.g., a transistor), a pixel electrode layer, a first common electrode layer, and an interlayer film is referred to as an element substrate (a first substrate), and a substrate which faces the element substrate with a liquid crystal layer interposed therebetween is referred to as a counter substrate (a second substrate). A second common electrode layer which overlaps with the first common electrode layer may be formed between the counter substrate (the second substrate) and the liquid crystal layer.

A liquid crystal material exhibiting a blue phase is used for the liquid crystal layer. Note that a liquid crystal material refers to a mixture which includes liquid crystal and is used for a liquid crystal layer. The liquid crystal material exhibiting a blue phase has a short response time of 1 msec or less and is capable of high-speed response. Thus, a high-performance liquid crystal display device can be achieved.

The liquid crystal material exhibiting a blue phase includes liquid crystal and a chiral agent. The chiral agent is used to align liquid crystal such that the liquid crystal forms a helical structure and exhibits a blue phase. For example, a liquid crystal material into which a chiral agent is mixed at 5 wt % or more may be used for the liquid crystal layer.

As the liquid crystal, thermotropic liquid crystal, low molecular liquid crystal, high molecular liquid crystal, ferroelectric liquid crystal, anti-ferroelectric liquid crystal, or the like is used.

For the chiral agent, a material which has a high compatibility with liquid crystal and a strong twisting power is used. In addition, as a material, either an R-enantiomer or an S-enantiomer is favorable, and a racemic body in which an R-enantiomer and an S-enantiomer are mixed at a ratio of 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are observed in a liquid crystal material having a cholesteric phase or a smectic phase with a relatively short helical pitch of 500 nm or less. The alignment of the liquid crystal material has a double twist structure. Having the order of less than or equal to a wavelength of visible light, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

The blue phase is exhibited only within a narrow temperature range; therefore, it is preferable that a photocurable resin and a photopolymerization initiator be added to a liquid crystal material and polymer stabilization treatment be performed in order to widen the temperature range. The polymer stabilization treatment is performed in such a manner that a liquid crystal material including liquid crystal, a chiral agent, a photocurable resin, and a photopolymerization initiator is irradiated with light having a wavelength with which the photocurable resin and the photopolymerization initiator are reacted. This polymer stabilization treatment may be performed by irradiating a liquid crystal material in the state of exhibiting an isotropic phase with light or by irradiating a liquid crystal material in the state of exhibiting a blue phase with light under the control of the temperature.

For example, the polymer stabilization treatment is performed in such a manner that the temperature of a liquid crystal layer is controlled and the liquid crystal layer is irradiated with light with a blue phase exhibited. Note that the polymer stabilization treatment is not limited to this manner and may be performed in such a manner that a liquid crystal layer is irradiated with light with an isotropic phase exhibited at a temperature within +10° C., preferably +5° C. from the phase transition temperature between the blue phase and the isotropic phase. The phase transition temperature between the blue phase and the isotropic phase is a temperature at which the phase changes from the blue phase to the isotropic phase when the temperature is raised, or a temperature at which the phase changes from the isotropic phase to the blue phase when the temperature is lowered. As an example of the polymer stabilization treatment, the following method can be employed: after heating a liquid crystal layer to exhibit an isotropic phase, the temperature is gradually lowered so that the phase changes to a blue phase, and then irradiation with light is performed while the temperature at which a blue phase is exhibited is kept. Alternatively, after the phase changes to an isotropic phase by gradually heating a liquid crystal layer, the liquid crystal layer can be irradiated with light at a temperature within +10° C., preferably +5° C. from the phase transition temperature between the blue phase and the isotropic phase (with an isotropic phase exhibited). Moreover, in the ease where an ultraviolet curable resin (a UV curable resin) is used as the photocurable resin included in the liquid crystal material, the liquid crystal layer may be irradiated with ultraviolet rays. Even in the case where a blue phase is not exhibited, if polymer stabilization treatment is performed by irradiation with light at a temperature within +10° C., preferably +5° C. from the phase transition temperature between the blue phase and the isotropic phase (with an isotropic phase exhibited), the response time can be made as short as 1 msec or less and thus high-speed response is possible.

An embodiment of a structure of the invention disclosed in this specification is a liquid crystal display device including: a first substrate and a second substrate between which a liquid crystal layer including a liquid crystal material exhibiting a blue phase is interposed; a rib-shaped first structure body which projects into the liquid crystal layer from a surface of the first substrate on the liquid crystal layer side; a rib-shaped second structure body which is provided between the rib-shaped first structure bodies and projects into the liquid crystal layer from the surface of the first substrate on the liquid crystal layer side; a first electrode layer which covers top surface and side surface of the rib-shaped first structure body; and a second electrode layer which covers a top surface and a side surface of the rib-shaped second structure body.

Another embodiment of a structure of the invention disclosed in this specification is a liquid crystal display device including: a first substrate and a second substrate between which a liquid crystal layer including a liquid crystal material exhibiting a blue phase is interposed; a rib-shaped first structure body which projects into the liquid crystal layer from a surface of the first substrate on the liquid crystal layer side; a rib-shaped second structure body which is provided between the rib-shaped first structure bodies and projects into the liquid crystal layer from the surface of the first substrate on the liquid crystal layer side; a first electrode layer which covers top surface and side surface of the rib-shaped first structure body; a second electrode layer which covers a top surface and a side surface of the rib-shaped second structure body; and a third electrode layer having an opening pattern, which overlaps with the second electrode layer and is provided between the second substrate and the liquid crystal layer.

Since the liquid crystal layer exhibiting a blue phase is used, it is not necessary to form an alignment film. Thus, a structure in which a pixel electrode layer (the first electrode layer) is in contact with the liquid crystal layer, and the second electrode layer (a first common electrode layer) is in contact with the liquid crystal layer is obtained. Note that in the case where the third electrode layer (a second common electrode layer) is provided, the third electrode layer (the second common electrode layer) is also in contact with the liquid crystal layer.

Note that the ordinal numbers such as "first" and "second" are used for convenience and do not denote the order of steps and the stacking order of layers. In addition, the ordinal numbers in this specification do not denote particular names which specify the invention.

Note that in this specification, semiconductor devices refer to all devices which can function by utilizing semiconductor characteristics, and electro-optical devices, semiconductor circuits, and electronic devices are all included in the category of semiconductor devices.

A pixel electrode layer is provided so as to cover a top surface and a side surface of a rib-shaped first structure body and a common electrode layer is provided so as to cover a top surface and a side surface of a rib-shaped second structure body, whereby the formation area of the pixel electrode layer and the common electrode layer can be increased in a thickness direction (three-dimensionally) of a liquid crystal layer. Accordingly, when voltage is applied between the pixel electrode layer and the common electrode layer, an electric field can be widely formed between the pixel electrode layer and the common electrode layer. Thus, liquid crystal molecules can be controlled using the electric field.

Therefore, liquid crystal molecules in the entire liquid crystal layer in a thickness direction can be made to respond and white transmittance can be improved. In a liquid crystal display device which includes a liquid crystal layer exhibiting a blue phase, the contrast ratio can be increased.

Further, an electric field can be effectively applied even to a liquid crystal layer exhibiting a blue phase, which has high viscosity; therefore, reduction in power consumption of a liquid crystal display device can also be achieved.

BRIEF DESCRIPTION OF DRAWINGS

In the accompanying drawings:

FIGS. 3A and 3B illustrate a liquid crystal display device;

FIGS. 12A1, 12A2, and 12B illustrate a liquid crystal display device;

BEST MODE FOR CARRYING OUT THE INVENTION

Figure 1:
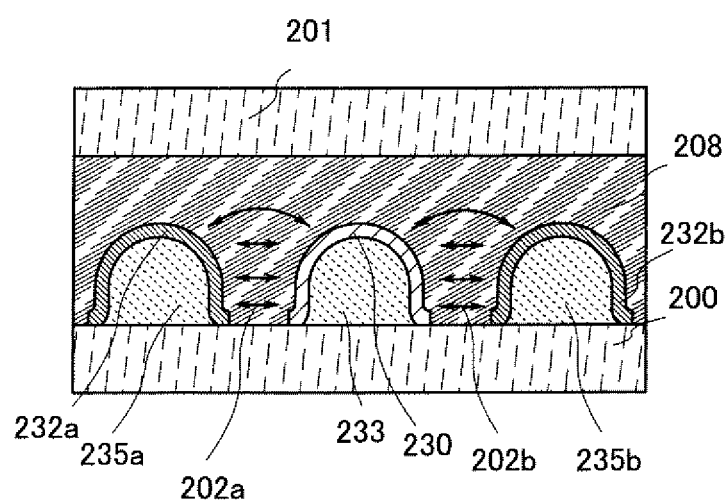
FIG. 1 illustrates an electric field mode of a liquid crystal display device.

Embodiments will be described in detail with reference to the drawings. Note that the present invention is not limited to the following description, and it is easily understood by those skilled in the art that modes and details of the present invention can be modified in a variety of ways without departing from the spirit and scope of the present invention. Therefore, the present invention should not be construed as being limited to the description of the following embodiments. In the structures described below, the same portions or portions having similar functions will be denoted by the same reference numerals in different drawings, and repetitive description thereof will be omitted.

Embodiment 1

A liquid crystal display device which is an embodiment of a structure of the invention disclosed in this specification will be described with reference to FIG. 1. FIG. 1 is a cross-sectional view of a liquid crystal display device.

In a liquid crystal display device which includes a liquid crystal layer exhibiting a blue phase, a method in which the gray scale is controlled by generation of an electric field generally parallel (i.e., in a lateral direction) to a substrate to move liquid crystal molecules in a plane parallel to the substrate can be used. In such a method, an electrode structure used in an in-plane switching (IPS) mode can be employed.

In a lateral electric field mode such as an IPS mode, a first electrode layer (e.g., a pixel electrode layer with which voltage is controlled per pixel) having an opening pattern and a second electrode layer (e.g., a common electrode layer with which common voltage is supplied to all pixels) having an opening pattern are positioned below a liquid crystal layer. The first electrode layer and the second electrode layer have various opening patterns and each have a shape including a bend portion or a branching comb-like shape, instead of a flat shape. The first electrode layer and the second electrode layer are positioned so that they do not overlap with each other, in order to generate an electric field therebetween.

By applying an electric field between the pixel electrode layer and the common electrode layer, liquid crystal is controlled. An electric field in a lateral direction is applied to the liquid crystal, so that liquid crystal molecules can be controlled using the electric field. That is, the liquid crystal molecules aligned in parallel to the substrate can be controlled in a direction parallel to the substrate; accordingly the viewing angle can be widened.

FIG. 1 illustrates a liquid crystal display device in which a first substrate 200 and a second substrate 201 are positioned so as to face each other with a liquid crystal layer 208 which includes a liquid crystal material exhibiting a blue phase interposed therebetween. A first structure body 233, a pixel electrode layer 230, second structure bodies 235a and 235b, and common electrode layers 232a and 232b are provided between the first substrate 200 and the liquid crystal layer 208. The first structure body 233 and the second structure bodies 235a and 235b are provided to project into the liquid crystal layer 208 from a surface of the first substrate 200 on the liquid crystal layer 208 side.

The pixel electrode layer 230 is formed to cover a top surface and a side surface of the first structure body 233 which is provided to project into the liquid crystal layer 208 from the surface of the first substrate 200 on the liquid crystal layer 208 side (a surface which faces the liquid crystal layer 208). The common electrode layers 232a and 232b are formed to cover top surfaces and side surfaces of the second structure bodies 235a and 235b which are provided to project into the liquid crystal layer 208 from the surface of the first substrate 200 on the liquid crystal layer 208 side.

The first structure body and the second structure bodies are rib-shaped. The rib-shaped first structure body and the rib-shaped second structure bodies reflect the shapes of the pixel electrode layer and the common electrode layers, which are formed over the top surfaces and the side surfaces thereof, and each have an opening pattern and a shape including a bend portion or a branching comb-like shape.

The first structure body 233 and the second structure bodies 235a and 235b are structure bodies each having a dome shape with a rounded top and a generally semicircular cross section. When a structure body has such a curved surface, a pixel electrode layer or a common electrode layer stacked thereover can be formed to have a favorable shape with favorable coverage.

The pixel electrode layer 230 and the common electrode layers 232a and 232b each have a shape including an opening pattern instead of a flat shape; thus, they are illustrated as a plurality of divided electrode layers in the cross-sectional view.

It is preferable that in a pixel region, the pixel electrode layer 230 and the common electrode layers 232a and 232b each have a comb-like pattern which does not form a closed space and is opened. The pixel electrode layer 230 and the common electrode layers 232a and 232b are not in contact with each other, and they are provided over the same insulating surface, that is, over the first substrate 200 such that their comb-like patterns are engaged with each other.

In the liquid crystal display device of FIG. 1, the pixel electrode layer 230 is provided so as to cover the top surface and the side surface of the first structure body 233 and the common electrode layers 232a and 232b are provided so as to cover the top surfaces and the side surfaces of the second structure bodies 235a and 235b, whereby the formation area of the pixel electrode layer 230 and the common electrode layers 232a and 232b can be increased in a thickness direction (three-dimensionally) of the liquid crystal layer 208. Accordingly, as illustrated in FIG. 1, an electric field indicated by an arrow 202a and an electric field indicated by an arrow 202b are applied widely in a thickness direction of the liquid crystal layer, between the pixel electrode layer 230 and the common electrode layer 232a and between the pixel electrode layer 230 and the common electrode layer 232b, respectively. Note that as indicated by the arrows 202a and 202b, potential lines are curved above top surfaces of (in upper regions between) the pixel electrode layer 230 and the common electrode layers 232a and 232b.

Figure 28A:
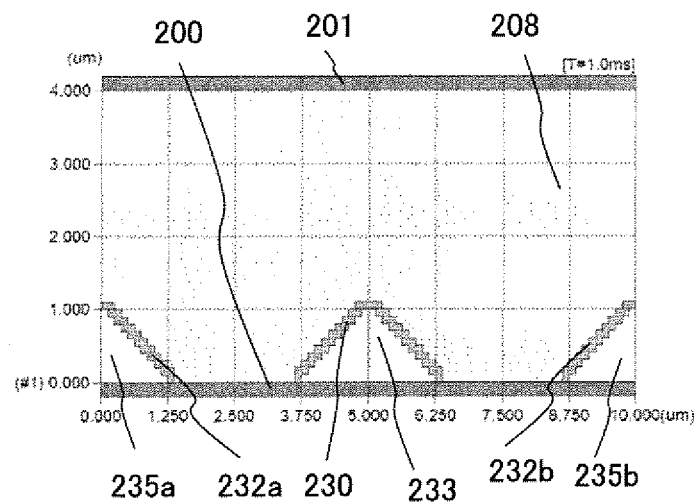
FIGS. 28A and 28B show results of calculating an electric field mode of a liquid crystal display device.
Figure 28B:
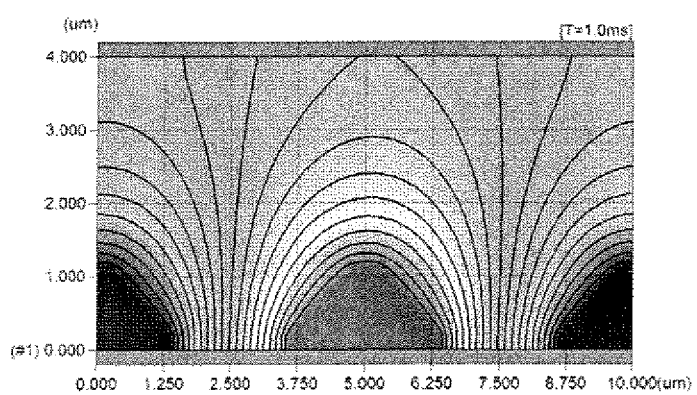
Figure 29A:
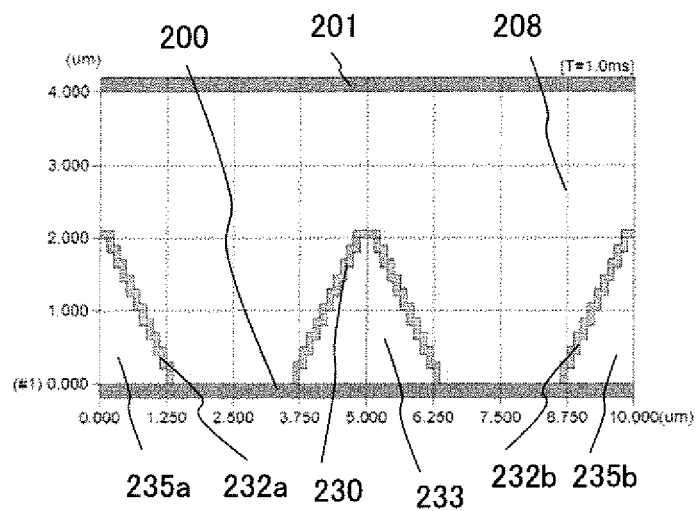
FIGS. 29A and 29B show results of calculating an electric field mode of a liquid crystal display device.
Figure 29B:
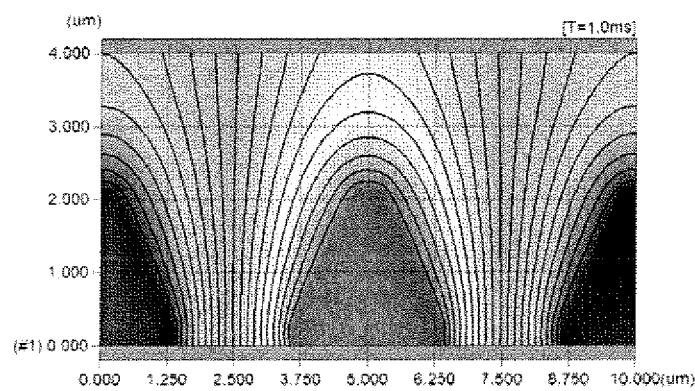
Figure 32A:
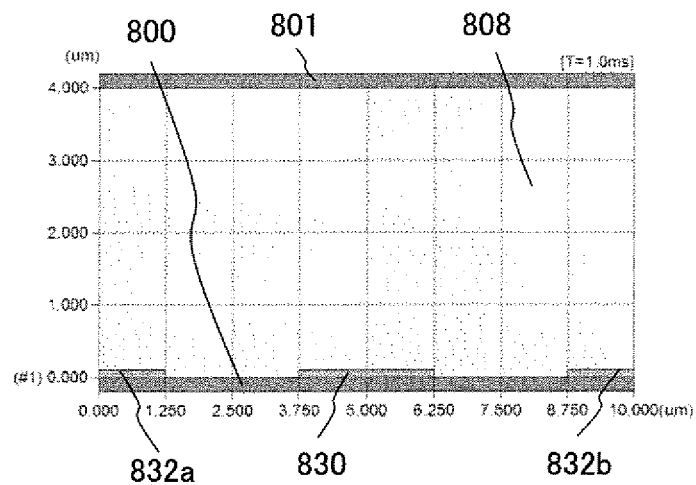
FIGS. 32A and 32B show results of calculating an electric field mode of a liquid crystal display device.
Figure 32B:
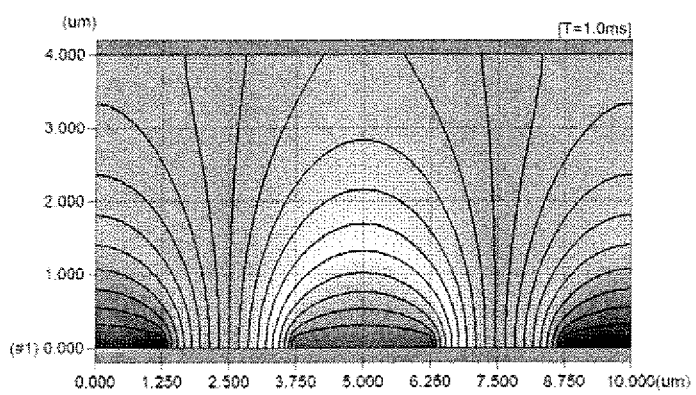

FIG. 28B, FIG. 29B, and FIG. 32B show results of calculating an electric field applied in liquid crystal display devices. FIG. 28A, FIG. 29A, and FIG. 32A show structures of the liquid crystal display devices used for calculation. The calculation was performed using LCD Master, 2s Bench manufactured by SHINTECH, Inc. An insulator with a dielectric constant of 4 was used as the structure bodies (the first structure body 233 and the second structure bodies 235a and 235b), and the cross-sectional widths thereof were each set to 2.5 μm. In FIGS. 28A and 28B, the thicknesses (heights) of the first structure body 233 and the second structure bodies 235a and 235b are each 1 μm. In FIGS. 29A and 29B, the thicknesses (heights) of the first structure body 233 and the second structure bodies 235a and 235b are each 2 μm. Here, the thicknesses (heights) of the first structure body 233 and the second structure bodies 235a and 235b are each a maximum thickness (height) from the bottom surface.

In FIGS. 28A and 28B and FIGS. 29A and 29B, the pixel electrode layer 230 is formed so as to cover a top surface and a side surface of the first structure body 233, and in a similar manner, the common electrode layers 232a and 232b are formed so as to cover top surfaces and side surfaces of the second structure bodies 235a and 235b, respectively. The thicknesses of the pixel electrode layer 230 and the common electrode layers 232a and 232b are each 0.1 μm, and the distance between the first structure body 233 and the second structure bodies 235a and 235b is 2.5 μm. The distance between the first substrate 200 and the second substrate 201, which corresponds to a cell gap (the maximum thickness of the liquid crystal layer), is 4 μm.

In addition, FIGS. 32A and 32B show a comparative example in which common electrode layers 832a and 832b and a pixel electrode layer 830 are alternately provided between a first substrate 800 and a liquid crystal layer 808 and sealed with a second substrate 801. In a cross section of the comparative example, the widths of the pixel electrode layer 830 and the common electrode layers 832a and 832b are each 2.5 μm, the thicknesses thereof are each 0.1 μm, and the distance between the first substrate 800 and the second substrate 801, which corresponds to a cell gap (the maximum thickness of the liquid crystal layer), is 4 μm.

FIG. 28B, FIG. 29B, and FIG. 32B show results of calculation performed on the structures of FIG. 28A, FIG. 29A, and FIG. 32A under the condition where the common electrode layer was set at 0 V and the pixel electrode layer was set at 10 V.

In FIG. 28B, FIG. 29B, and FIG. 32B, a solid line represents an equipotential line, and the pixel electrode layer or the common electrode layer is positioned in the center of a circular pattern of the equipotential lines.

Since an electric field is generated perpendicular to an equipotential line, it can be confirmed that electric fields are applied in a lateral direction between the pixel electrode layer 230 which is provided so as to cover a surface of the first structure body 233 and the common electrode layers 232a and 232b which are provided so as to cover surfaces of the second structure bodies 235a and 235b, as shown in FIG. 28B and FIG. 29B.

Especially in FIGS. 29A and 29B, where the first structure body 233 and the second structure bodies 235a and 235b having a large thickness are provided, an electric field is widely formed in the liquid crystal layer. Thus, an electric field can be widely formed in the entire liquid crystal layer.

On the other hand, in FIG. 32B, an equipotential line appears and an electric field is formed in the liquid crystal layer 808 in the proximity of the first substrate 800 over which the pixel electrode layer 830 and the common electrode layers 832a and 832b are alternately formed; however, a potential line is not distributed and a potential difference is not generated in a region closer to the second substrate 801. Therefore, electric fields are not formed in the liquid crystal layer 808 in the proximity of the second substrate 801, and it can be confirmed that it is difficult to make all liquid crystal molecules in the liquid crystal layer respond when the structure in FIGS. 32A and 32B is employed.

A pixel electrode layer is provided so as to cover a top surface and a side surface of a first structure body and a common electrode layer is provided so as to cover a top surface and a side surface of a second structure body, whereby the formation area of the pixel electrode layer and the common electrode layer can be increased in a thickness direction (three-dimensionally) of a liquid crystal layer. Accordingly, when voltage is applied between the pixel electrode layer and the common electrode layer, an electric field can be widely formed between the pixel electrode layer and the common electrode layer.

Accordingly, when voltage is applied between the pixel electrode layer 230 and the common electrode layers 232a and 232b, an electric field can be widely formed between the pixel electrode layer 230 and the common electrode layers 232a and 232b in the liquid crystal layer 208. Thus, liquid crystal molecules can be controlled using the electric field.

Therefore, liquid crystal molecules in the entire liquid crystal layer 208 in a thickness direction can be made to respond and white transmittance can be improved. Accordingly, the contrast ratio which is a ratio of white transmittance to black transmittance (light transmittance in black display) can also be increased. Further, an electric field can be effectively applied even to a liquid crystal material (a liquid crystal mixture) exhibiting a blue phase, which has high viscosity; therefore, reduction in power consumption can also be achieved.

The structure bodies (the first structure body and the second structure bodies) can be formed using an insulator which includes an insulating material (an organic material or an inorganic material) and/or a conductor which includes a conductive material (an organic material or an inorganic material). Typically, a visible light curable resin, an ultraviolet curable resin, or a thermosetting resin is preferably used. For example, an acrylic resin, an epoxy resin, an amine resin, or the like can be used. Moreover, the structure bodies may be formed using a conductive resin or a metal material. Note that the structure bodies may each have a stacked-layer structure of plural thin films.

Each of the structure bodies can have a columnar shape, a truncated conical or pyramidal shape with a flat top surface and a trapezoidal cross section, a conical or pyramidal shape with a rounded dome top, or the like. In this specification, since a pixel electrode layer and a common electrode layer (a first common electrode layer) are formed so as to cover surfaces (top surfaces and side surfaces) of structure bodies, it is preferable that the structure bodies each have a curved surface with little unevenness so as to be favorably covered with the pixel electrode layer and the common electrode layer (the first common electrode layer). Further, a material with a light-transmitting property with respect to visible light is preferably used for the structure bodies because reduction in aperture ratio and white transmittance can be prevented.

Furthermore, each of the structure bodies may be a portion which projects into the liquid crystal layer from a surface of the first substrate on the liquid crystal layer side; thus, a projecting structure body may be formed by processing an interlayer film so that the surface on the liquid crystal layer side is uneven. Accordingly, each of the structure bodies may be formed using a continuous film provided with a plurality of projections, or the first structure body and the second structure bodies may be formed as a continuous film.

Figure 19A:
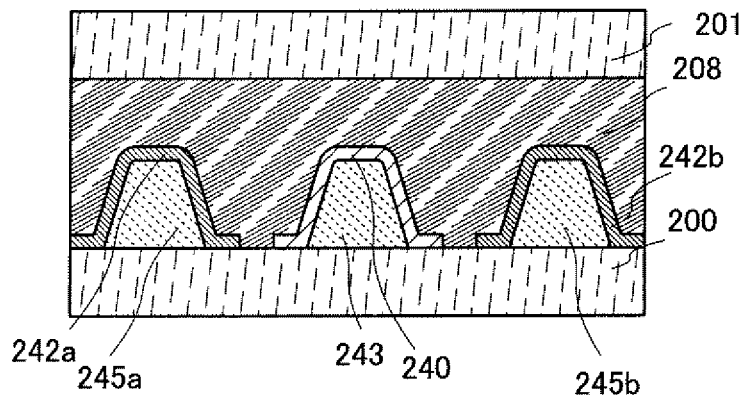
FIGS. 19A to 19C illustrate liquid crystal display devices.
Figure 19B:
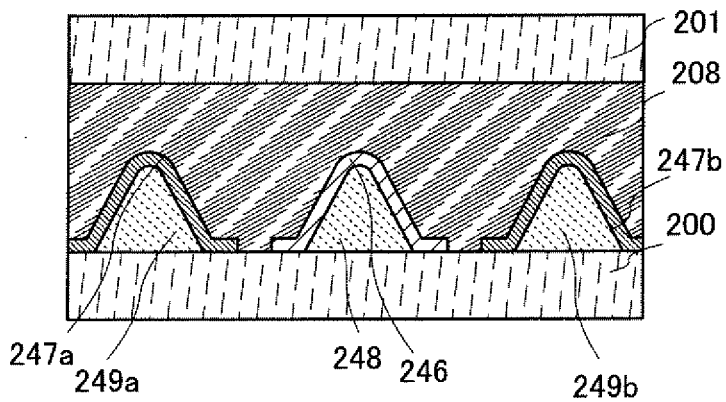
Figure 19C:
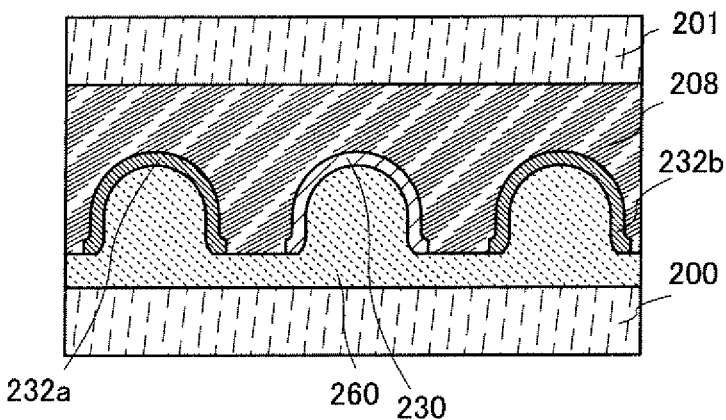

Note that the shapes of the pixel electrode layer and the common electrode layers which are formed over the structure bodies reflect the shapes of the structure bodies and are also influenced by an etching process method. FIGS. 19A to 19C illustrate examples of shapes of structure bodies, and a pixel electrode layer and common electrode layers which are formed over the structure bodies.

FIG. 19A illustrates an example in which a pixel electrode layer 240 and common electrode layers 242a and 242b are formed over a first structure body 243 and second structure bodies 245a and 245b, respectively. The first structure body 243 and the second structure bodies 245*a* and 245*b* each have a truncated conical or pyramidal shape with a flat top surface and a trapezoidal cross section, and the shapes of the pixel electrode layer 240 and the common electrode layers 242*a* and 242*b* which are formed to cover the structure bodies reflect the shapes thereof. Further, although the pixel electrode layer 240 and the common electrode layers 242*a* and 242*b* are formed so as to be in contact with the first substrate 200, the area of a portion where they are formed in contact with the first substrate 200 can be set as appropriate as long as the pixel electrode layer 240 and the common electrode layers 242*a* and 242*b* are not in contact with each other.

FIG. 19B illustrates an example in which a pixel electrode layer 246 and common electrode layers 247*a* and 247*b* are formed over a first structure body 248 and second structure bodies 249*a* and 249*b*, respectively. The first structure body 248 and the second structure bodies 249*a* and 249*b* each have a conical or pyramidal shape with a rounded top, and the shapes of the pixel electrode layer 246 and the common electrode layers 247*a* and 247*b* which are formed to cover the structure bodies reflect the shapes thereof. In the case of such a conical or pyramidal shape, continuity of the pixel electrode layer 246 and the common electrode layers 247*a* and 247*b* might be partly lost in the vicinity of the apex of the conical or pyramidal shape (for example, an opening (a hole) is formed in the film); however, there is no problem as long as the pixel electrode layer 246 and the common electrode layers 247*a* and 247*b* can be used for application of voltage.

FIG. 19C illustrates an example in which the pixel electrode layer 230 and the common electrode layers 232*a* and 232*b* are formed over projections of a structure body 260 having an uneven surface. The structure body 260 having an uneven surface is an example of a structure body which is formed by processing a surface of an insulating layer on the liquid crystal layer side into an uneven shape so that a continuous film having a plurality of projections is formed. Thus, the pixel electrode layer 230 and the common electrode layers 232*a* and 232*b* are formed over the projections corresponding to the first structure body and the second structure bodies, respectively.

In drawings of this specification, the pixel electrode layer 230 is illustrated with a hatching pattern different from that of the common electrode layers 232*a* and 232*b* so as to be distinguishable, as in FIG. 1. The purpose of this is to make it clear that the electrode layers have different functions, and the pixel electrode layer 230 can be formed using the same process and the same material as the common electrode layers 232*a* and 232*b*. FIGS. 18A to 18E illustrate an example of a method for manufacturing the liquid crystal display device of this embodiment.

Figure 18A:
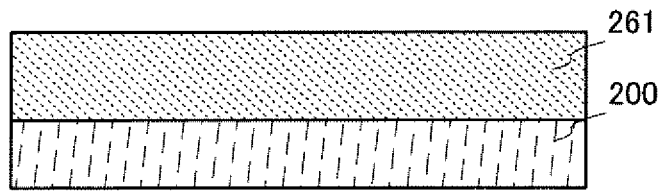
FIGS. 18A to 18E illustrate a method for manufacturing a liquid crystal display device.

A film 261 which is to be processed into structure bodies later is formed over the first substrate 200 (see FIG. 18A). In this embodiment, a resin insulating layer is formed as the film 261.

Figure 18B:
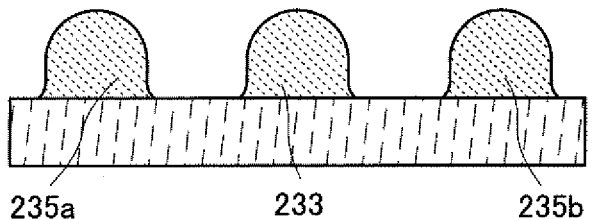

The film 261 is processed by etching using a photolithography process, so that the first structure body 233 and the second structure bodies 235*a* and 235*b* are formed (see FIG. 18B). Note that the first structure body 233 and the second structure bodies 235*a* and 235*b* may be formed by a printing method such as an ink jetting method. Formation by a printing method such as an ink jetting method does not need a photolithography process; thus, a process is simplified and manufacturing cost can be reduced.

Figure 18C:
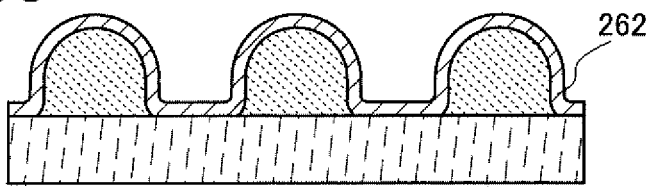

Next, a conductive film 262 is formed over the first structure body 233 and the second structure bodies 235*a* and 235*b* (see FIG. 18C).

Figure 18D:
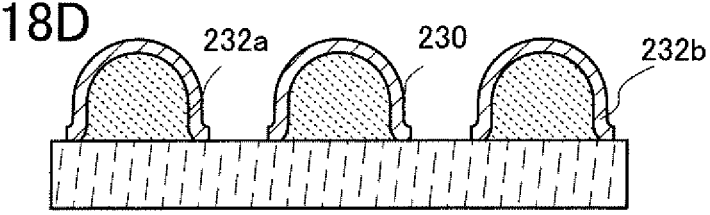

The conductive film 262 is processed by etching using a photolithography process, so that the pixel electrode layer 230 and the common electrode layers 232*a* and 232*b* are formed (see FIG. 18D).

The second substrate 201 serving as a counter substrate is firmly attached to the first substrate 200 provided with the first structure body 233, the second structure bodies 235*a* and 235*b*, the pixel electrode layer 230, and the common electrode layers 232*a* and 232*b* with the liquid crystal layer 208 interposed between the first substrate and the second substrate. Thus, the liquid crystal display device is manufactured (see FIG. 18E).

Figure 18E:
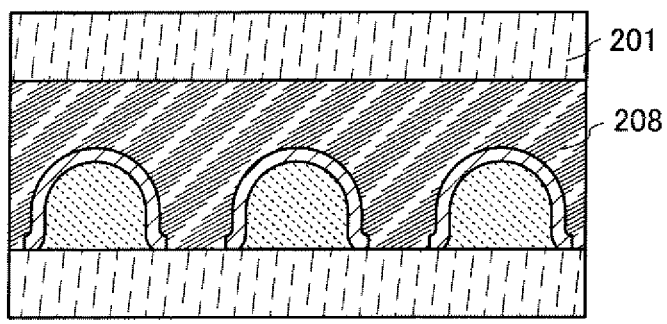

In the above manner, the first structure body 233 and the second structure bodies 235*a* and 235*b* can be formed using the same process and the same material, and the pixel electrode layer 230 and the common electrode layers 232*a* and 232*b* can be formed using the same process and the same material. In FIG. 18E, the pixel electrode layer 230 and the common electrode layers 232*a* and 232*b* are illustrated with the same hatching pattern in order to make it clear that they are formed using the same process and the same material. Needless to say, the first structure body 233 and the second structure bodies 235*a* and 235*b* may be formed using different processes or different materials, and the pixel electrode layer 230 and the common electrode layers 232*a* and 232*b* may be formed using different processes or different materials; the liquid crystal display device can be manufactured by combining any of these examples as appropriate.

Figure 8A:
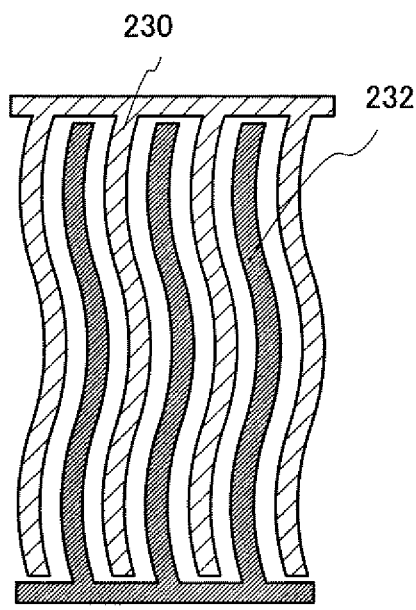
FIGS. 8A and 8B illustrate electrode layers of a liquid crystal display device.
Figure 8B:
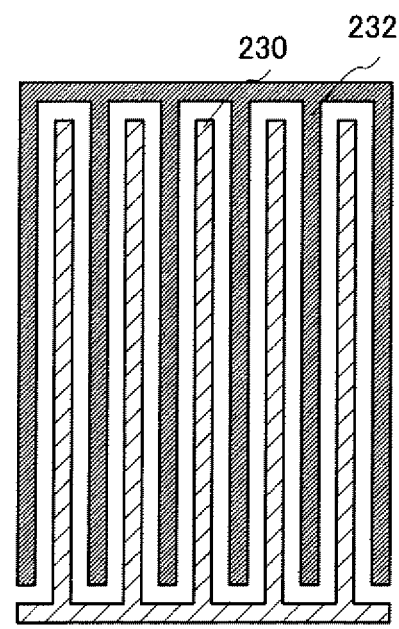

FIGS. 8A and 8B illustrate examples applicable to the pixel electrode layer 230 and a common electrode layer 232 (232*a* and 232*b*). FIGS. 8A and 8B are plan views of the pixel electrode layer 230 and the common electrode layer 232. The pixel electrode layer 230 and the common electrode layer 232 are each an electrode layer having a comb-like shape, and are provided such that their comb-like patterns are engaged with each other. In FIG. 8A, the pixel electrode layer 230 and the common electrode layer 232 each have a wavelike shape. A first structure body and a second structure body may be selectively provided under the pixel electrode layer and the common electrode layer, respectively. In the case where the pixel electrode layer 230 and the common electrode layer 232 have complicated shapes, the first structure body 233 and the second structure bodies 235*a* and 235*b* are selectively provided, whereby injection of a liquid crystal material and filling with the liquid crystal material are facilitated, and process time is shortened.

The liquid crystal layer 208 can be formed by a dispenser method (a dropping method), or an injection method by which liquid crystal is injected using a capillary phenomenon or the like after the first substrate 200 is attached to the second substrate 201.

A liquid crystal material exhibiting a blue phase is used for the liquid crystal layer 208. The liquid crystal material exhibiting a blue phase has a short response time of 1 msec or less and is capable of high-speed response. Thus, a high-performance liquid crystal display device can be achieved.

For example, a liquid crystal material exhibiting a blue phase, which is capable of high-speed response, can be favorably used for a successive additive color mixing method (a field sequential method) in which light-emitting diodes (LEDs) of RGB or the like are arranged in a backlight unit and color display is performed by time division, or a three-dimensional display method using a shutter glasses system in which images for right eye and images for left eye are alternately viewed by time division.

The liquid crystal material exhibiting a blue phase includes liquid crystal and a chiral agent. The chiral agent is used so that the liquid crystal is aligned to form a helical structure and exhibits a blue phase. For example, a liquid crystal material into which a chiral agent is mixed at 5 wt % or more may be used for the liquid crystal layer.

As the liquid crystal, thermotropic liquid crystal, low molecular liquid crystal, high molecular liquid crystal, ferroelectric liquid crystal, anti-ferroelectric liquid crystal, or the like is used.

For the chiral agent, a material which has a high compatibility with liquid crystal and has a strong twisting power is used. In addition, as a material, either an R-enantiomer or an S-enantiomer is favorable, and a racemic body in which an R-enantiomer and an S-enantiomer are mixed at a ratio of 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are observed in a liquid crystal material having a cholesteric phase or a smectic phase with a relatively short helical pitch of 500 nm or less. The alignment of the liquid crystal material has a double twist structure. Having the order of less than or equal to a wavelength of visible light, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

The blue phase is exhibited only within a narrow temperature range; therefore, it is preferable that a photocurable resin and a photopolymerization initiator be added to a liquid crystal material and polymer stabilization treatment be performed in order to widen the temperature range. The polymer stabilization treatment is performed in such a manner that a liquid crystal material including liquid crystal, a chiral agent, a photocurable resin, and a photopolymerization initiator is irradiated with light having a wavelength with which the photocurable resin and the photopolymerization initiator are reacted. This polymer stabilization treatment may be performed by irradiating a liquid crystal material in the state of exhibiting an isotropic phase with light or by irradiating a liquid crystal material in the state of exhibiting a blue phase with light under the control of the temperature.

For example, the polymer stabilization treatment is performed in such a manner that the temperature of a liquid crystal layer is controlled and the liquid crystal layer is irradiated with light with a blue phase exhibited. Note that the polymer stabilization treatment is not limited to this manner and may be performed in such a manner that a liquid crystal layer is irradiated with light with an isotropic phase exhibited at a temperature within +10° C. preferably +5° C. from the phase transition temperature between the blue phase and the isotropic phase. The phase transition temperature between the blue phase and the isotropic phase is a temperature at which the phase changes from the blue phase to the isotropic phase when the temperature is raised, or a temperature at which the phase changes from the isotropic phase to the blue phase when the temperature is lowered. As an example of the polymer stabilization treatment, the following method can be employed: after heating a liquid crystal layer to exhibit an isotropic phase, the temperature is gradually lowered so that the phase changes to a blue phase, and then irradiation with light is performed while the temperature at which a blue phase is exhibited is kept. Alternatively, after the phase changes to an isotropic phase by gradually heating a liquid crystal layer, the liquid crystal layer can be irradiated with light at a temperature within +10° C., preferably +5° C. from the phase transition temperature between the blue phase and the isotropic phase (with an isotropic phase exhibited). Moreover, in the case where an ultraviolet curable resin (a UV curable resin) is used as the photocurable resin included in the liquid crystal material, the liquid crystal layer may be irradiated with ultraviolet rays. Even in the case where a blue phase is not exhibited, if polymer stabilization treatment is performed by irradiation with light at a temperature within +10° C., preferably +5° C. from the phase transition temperature between the blue phase and the isotropic phase (with an isotropic phase exhibited), the response time can be made as short as 1 msec or less and thus high-speed response is possible.

The photocurable resin may be a monofunctional monomer such as acrylate or methacrylate, a polyfunctional monomer such as diacrylate, triacrylate, dimethacrylate, or trimethacrylate, or a mixture of thereof. Further, the photocurable resin may have liquid crystallinity, non-liquid crystallinity, or both of them. A resin which is cured with light having a wavelength with which the photopolymerization initiator to be used is reacted may be selected as the photocurable resin, and an ultraviolet curable resin can be typically used.

The photopolymerization initiator may be a radical polymerization initiator which generates a radical by light irradiation, an acid generator which generates acid by light irradiation, or a base generator which generates a base by light irradiation.

Specifically, a mixture of JC-1041XX (produced by Chisso Corporation) and 4-cyano-4'-pentylbiphenyl can be used as the liquid crystal material. ZLI-4572 (produced by Merck Ltd., Japan) can be used as the chiral agent. As the photocurable resin, 2-ethylhexyl acrylate, RM257 (produced by Merck Ltd., Japan), or trimethylolpropane triacrylate can be used. As the photopolymerization initiator, 2,2-dimethoxy-2-phenylacetophenone can be used.

Further, although not illustrated in FIG. 1, an optical film or the like, such as a polarizing plate, a retardation plate, or an anti-reflection film, is provided as appropriate. For example, circular polarization may be employed using a polarizing plate and a retardation plate. In addition, a backlight or the like can be used as a light source.

In the case where, in this specification, the liquid crystal display device is a transmissive liquid crystal display device in which display is performed by transmission of light from a light source (or a semi-transmissive liquid crystal display device), it is necessary to transmit light at least in a pixel region. Therefore, the first substrate, the second substrate, and thin films such as an insulating film and a conductive film which are present in the pixel region through which light is transmitted all have a light-transmitting property with respect to light in a visible wavelength range.

It is preferable that the pixel electrode layer and the common electrode layer each have a light-transmitting property; however, since an opening pattern is provided, a non-light-transmitting material such as a metal film may be used depending on the shape.

The pixel electrode layer and the common electrode layer may be formed using any one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organoindium, organotin, indium oxide including tungsten oxide, indium zinc oxide including tungsten oxide, indium oxide including titanium oxide, and indium tin oxide including titanium oxide; metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy thereof; and a nitride thereof.

As the first substrate 200 and the second substrate 201, a glass substrate formed using barium borosilicate glass, aluminoborosilicate glass, or the like, a quartz substrate, a plastic substrate, or the like can be used.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

Embodiment 2

Figure 2:
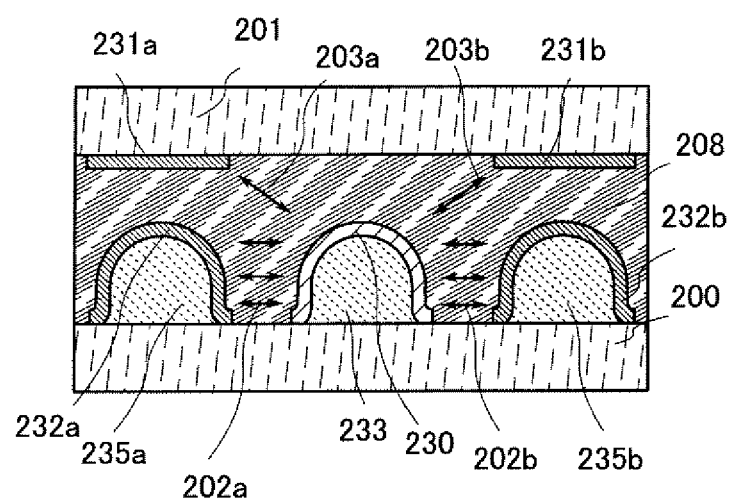
FIG. 2 illustrates an electric field mode of a liquid crystal display device.

A liquid crystal display device which is another embodiment of a structure of the invention disclosed in this specification will be described with reference to FIG. 2. FIG. 2 is a cross-sectional view of a liquid crystal display device in which a common electrode layer is further provided on a counter substrate (a second substrate) side in the liquid crystal display device described in Embodiment 1. Note that components in common with those in Embodiment 1 can be formed using a similar material and manufacturing method, and detailed description of the same portions and portions having similar functions will be omitted.

FIG. 2 illustrates a liquid crystal display device in which the first substrate 200 and the second substrate 201 are positioned so as to face each other with the liquid crystal layer 208 which includes a liquid crystal material exhibiting a blue phase interposed between the first substrate 200 and the second substrate 201. The first structure body 233, the pixel electrode layer 230, the second structure bodies 235a and 235b, and the common electrode layers 232a and 232b are provided between the first substrate 200 and the liquid crystal layer 208. The first structure body 233 and the second structure bodies 235a and 235b are provided to project into the liquid crystal layer 208 from a surface of the first substrate 200 on the liquid crystal layer 208 side.

Another common electrode layer may be provided on the counter substrate (the second substrate) side so that a pair of common electrode layers faces each other. As illustrated in FIG. 2, the common electrode layers (also referred to as first common electrode layers) 232a and 232b on the first substrate 200 side and common electrode layers (also referred to as third electrode layers or second common electrode layers) 231a and 231b on the second substrate side are positioned so as to overlap with each other with the liquid crystal layer 208 interposed between the common electrode layers 232a and 232b and the common electrode layers 231a and 231b.

The pixel electrode layer 230, the common electrode layers 232a and 232b, and the common electrode layers 231a and 231b have various opening patterns and each have a shape including a bend portion or a branching comb-like shape, instead of a flat shape. Moreover, in the case of forming the common electrode layers 231a and 231b, the common electrode layers 232a and 232b and the common electrode layers 231a and 231b have substantially the same pattern at least in a pixel region in a plan view and are positioned so as to overlap with each other with the liquid crystal layer interposed therebetween. Although the cross-sectional view of FIG. 2 illustrates an example in which end portions of the common electrode layers 232a and 232b are aligned with end portions of the common electrode layers 231a and 231b, the end portions are not necessarily aligned as long as at least parts of the common electrode layers overlap with each other (for example, the end portions of the common electrode layers 232a and 232b may be positioned at an outer or inner side of the end portions of the common electrode layers 231a and 231b).

The pixel electrode layer 230 is formed to cover a top surface and a side surface of the first structure body 233 which is provided to project into the liquid crystal layer 208 from the surface of the first substrate 200 on the liquid crystal layer 208 side (a surface which faces the liquid crystal layer 208). The common electrode layers 232a and 232b are formed to cover top surfaces and side surfaces of the second structure bodies 235a and 235b which are provided to project into the liquid crystal layer 208 from the surface of the first substrate 200 on the liquid crystal layer 208 side.

It is preferable that the pixel electrode layer 230 and the common electrode layers 232a and 232b each have a comb-like pattern which does not form a closed space and is opened. The pixel electrode layer 230 and the common electrode layers 232a and 232b are not in contact with each other, and they are provided over the same insulating surface, that is, over the first substrate 200 such that their comb-like patterns are engaged with each other.

In the liquid crystal display device of FIG. 2, the pixel electrode layer 230 is provided so as to cover the top surface and the side surface of the first structure body 233 and the common electrode layers 232a and 232b are provided so as to cover the top surfaces and the side surfaces of the second structure bodies 235a and 235b, whereby the formation area of the pixel electrode layer 230 and the common electrode layers 232a and 232b can be increased in a thickness direction (three-dimensionally) of the liquid crystal layer 208. Accordingly, as illustrated in FIG. 2, an electric field indicated by the arrow 202a and an electric field indicated by the arrow 202b are applied widely in a thickness direction of the liquid crystal layer, between the pixel electrode layer 230 and the common electrode layer 232a and between the pixel electrode layer 230 and the common electrode layer 232b, respectively.

In addition, when the common electrode layers 231a and 231b are provided on the second substrate 201 side as second common electrode layers as in this embodiment, an electric field can be applied to liquid crystal in an oblique direction (in a direction oblique to the substrate) between the pixel electrode layer 230 and the common electrode layers 231a and 231b; thus, liquid crystal molecules can be controlled more efficiently.

Figure 30A:
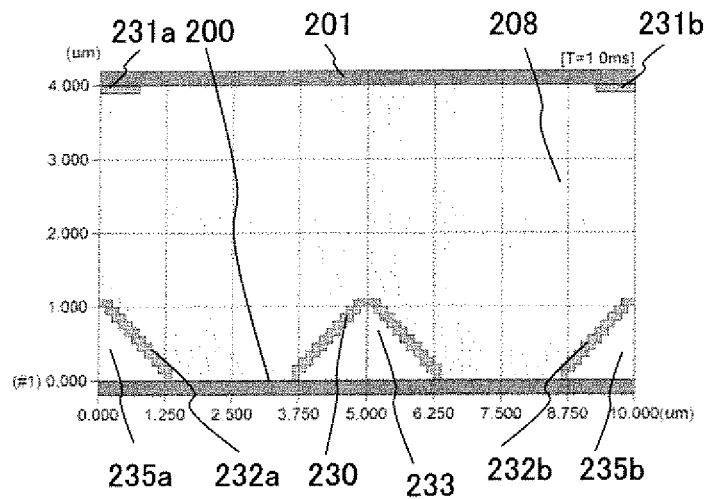
FIGS. 30A and 30B show results of calculating an electric field mode of a liquid crystal display device.
Figure 30B:
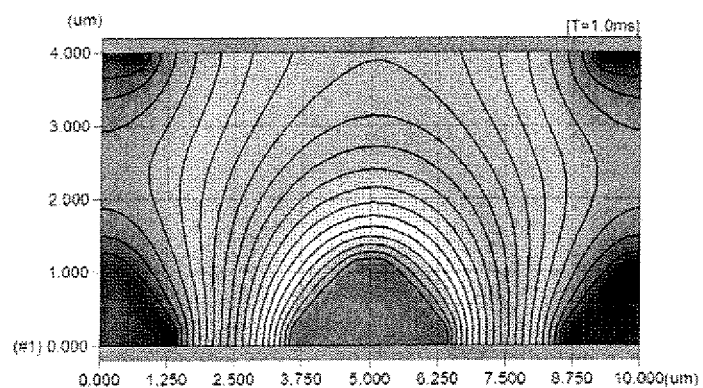
Figure 31A:
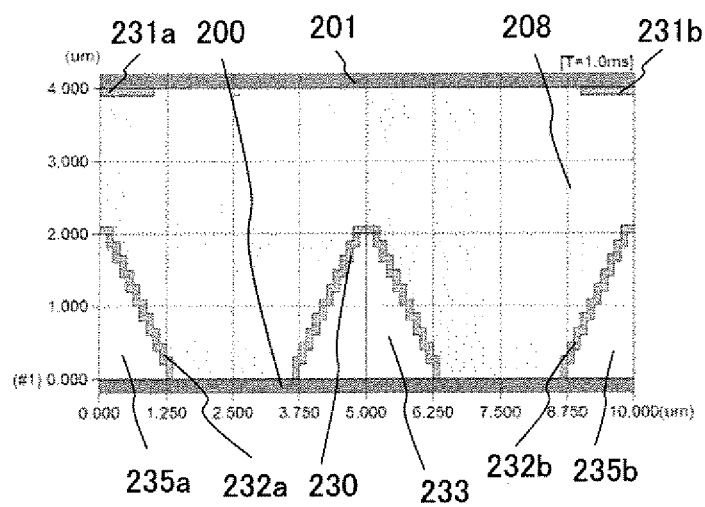
FIGS. 31A and 31B show results of calculating an electric field mode of a liquid crystal display device.
Figure 31B:
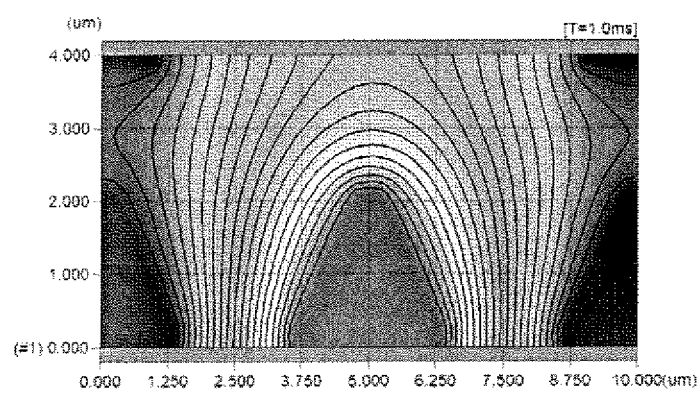

FIG. 30B, FIG. 31B, and FIG. 32B show results of calculating an electric field applied in liquid crystal display devices. FIG. 30A, FIG. 31A, and FIG. 32A show structures of the liquid crystal display devices used for calculation. The calculation was performed using LCD Master, 2s Bench manufactured by SHINTECH, Inc. An insulator with a dielectric constant of 4 was used as the structure bodies (the first structure body 233 and the second structure bodies 235a and 235b), and the cross-sectional widths thereof were each set to 2.5 μm. In FIGS. 30A and 30B, the thicknesses (heights) of the first structure body 233 and the second structure bodies 235a and 235b are each 1 μm. In FIGS. 31A and 31B, the thicknesses (heights) of the first structure body 233 and the second structure bodies 235a and 235b are each 2 μm. Here, the thicknesses (heights) of the first structure body 233 and the second structure bodies 235a and 235b are each a maximum thickness (height) from the bottom surface. Further, in FIGS. 30A and 30B and FIGS. 31A and 31B, the common electrode layers 231a and 231b are provided between the second substrate 201 and the liquid crystal layer 208 so as to overlap with the common electrode layers 232a and 232b.

In FIGS. 30A and 30B and FIGS. 31A and 31B, the pixel electrode layer 230 is formed so as to cover a top surface and a side surface of the first structure body 233, and in a similar manner, the common electrode layers 232a and 232b are formed so as to cover top surfaces and side surfaces of the second structure bodies 235a and 235b, respectively. The thicknesses of the pixel electrode layer 230, the common electrode layers 232a and 232b, and the common electrode layers 231a and 231b are each 0.1 µm, and the distance between the first structure body 233 and the second structure bodies 235a and 235b is 2.5 µm. The distance between the first substrate 200 and the second substrate 201, which corresponds to a cell gap (the maximum thickness of the liquid crystal layer), is 4 µm. Note that the distance between the common electrode layer 231a and the common electrode layer 231b is 8 µm, and the widths of the common electrode layers 231a and 231b are each 1 µm.

In addition, FIGS. 32A and 32B show a comparative example in which the common electrode layers 832a and 832b and the pixel electrode layer 830 are to alternately provided between the first substrate 800 and the liquid crystal layer 808 and sealed with the second substrate 801. In a cross section of the comparative example, the widths of the pixel electrode layer 830 and the common electrode layers 832a and 832b are each 2.5 µm, the thicknesses thereof are each 0.1 µm, and the distance between the first substrate 800 and the second substrate 801, which corresponds to a cell gap (the maximum thickness of the liquid crystal layer), is 4 µm.

FIG. 30B, FIG. 31B, and FIG. 32B show results of calculation performed on the structures of FIG. 30A, FIG. 31A, and FIG. 32A under the condition where the common electrode layer was set at 0 V and the pixel electrode layer was set at 10 V.

In FIG. 30B, FIG. 31B, and FIG. 32B, a solid line represents an equipotential line, and the pixel electrode layer or the common electrode layer is positioned in the center of a circular pattern of the equipotential lines.

Since an electric field is generated perpendicular to an equipotential line, it can be confirmed that electric fields are applied in a lateral direction between the pixel electrode layer 230 which is provided so as to cover a surface of the first structure body 233 and the common electrode layers 232a and 232b which are provided so as to cover surfaces of the second structure bodies 235a and 235b, as shown in FIG. 30B and FIG. 31B.

Moreover, an electric field can be formed in an oblique direction between the pixel electrode layer 230 and the common electrode layers 231a and 231b. Thus, electric fields can be widely formed in the entire liquid crystal layer 208.

Especially in FIGS. 31A and 31B, where the first structure body 233 and the second structure bodies 235a and 235b having a large thickness are provided, an electric field is widely formed in the liquid crystal layer. Thus, an electric field can be widely formed in the entire liquid crystal layer.

On the other hand, in FIG. 32B, an equipotential line appears and an electric field is formed in the liquid crystal layer 808 in the proximity of the first substrate 800 over which the pixel electrode layer 830 and the common electrode layers 832a and 832b are alternately formed; however, a potential line is not distributed and a potential difference is not generated in a region closer to the second substrate 801. Therefore, electric fields are not formed in the liquid crystal layer 808 in the proximity of the second substrate 801, and it can be confirmed that it is difficult to make all liquid crystal molecules in the liquid crystal layer respond when the structure in FIGS. 32A and 32B is employed.

A pixel electrode layer is provided so as to cover a top surface and a side surface of a first structure body and a first common electrode layer is provided so as to cover a top surface and a side surface of a second structure body, whereby the formation area of the pixel electrode layer and the first common electrode layer can be increased in a thickness direction (three-dimensionally) of a liquid crystal layer. Further, a second common electrode layer is provided on the second substrate side in a position that does not overlap with the pixel electrode layer, whereby an oblique electric field can be formed between the pixel electrode layer and the second common electrode layer. Accordingly, when voltage is applied between the pixel electrode layer, and the first common electrode layer and the second common electrode layer, electric fields can be widely formed between the pixel electrode layer, and the first common electrode layer and the second common electrode layer.

Accordingly, when voltage is applied between the pixel electrode layer 230, and the common electrode layers 232a and 232b and the common electrode layers 231a and 231b, electric fields can be widely formed in the liquid crystal layer 208. Thus, liquid crystal molecules can be controlled using the electric fields.

Therefore, liquid crystal molecules in the entire liquid crystal layer 208 in a thickness direction can be made to respond and white transmittance can be improved. Accordingly, the contrast ratio which is a ratio of white transmittance to black transmittance (light transmittance in black display) can also be increased. Further, an electric field can be effectively applied even to a liquid crystal material (a liquid crystal mixture) exhibiting a blue phase, which has high viscosity; therefore, reduction in power consumption can also be achieved.

The common electrode layers 231a and 231b which are second common electrode layers can be formed using a material and a method similar to those of the common electrode layers 232a and 232b, which are described in Embodiment 1.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

Embodiment 3

An example of an active matrix liquid crystal display device to which the invention disclosed in this specification is applied will be described with reference to FIGS. 3A and 3B.

FIG. 3A is a plan view of a liquid crystal display device and illustrates one pixel. FIG. 3B is a cross-sectional view taken along line X1-X2 in FIG. 3A.

In FIG. 3A, a plurality of source wiring layers (including a wiring layer 405a) is provided in parallel to each other (extended in a vertical direction in the drawing) and apart from each other. A plurality of gate wiring layers (including a gate electrode layer 401) is extended in a direction generally perpendicular to the source wiring layers (a horizontal direction in the drawing) and provided apart from each other. Capacitor wiring layers 408 are adjacent to the plurality of gate wiring layers and extended in a direction generally parallel to the gate wiring layers, that is, a direction generally perpendicular to the source wiring layers (the horizontal direction in the drawing). A space with a generally rectangular shape, which is surrounded by the source wiring layers, the capacitor wiring layers 408, and the gate wiring layers, is provided with a pixel electrode layer and a common electrode layer of the liquid crystal display device with a liquid crystal layer 444 interposed therebetween. A transistor 420 for driving the pixel electrode layer is provided at an upper left corner of the drawing. A plurality of pixel electrode layers and a plurality of transistors are arranged in matrix.

In the liquid crystal display device illustrated in FIGS. 3A and 3B, a first electrode layer 447 which is electrically connected to the transistor 420 functions as a pixel electrode layer, a second electrode layer 448 functions as a common electrode layer. Note that a capacitor is formed by the first electrode layer 447 and the capacitor wiring layer 408. Although the common electrode layer can operate in a floating state (an electrically isolated state), the potential thereof may be set to a fixed potential, preferably to a potential around a common potential (an intermediate potential of an image signal which is transmitted as data) in such a level as not to generate flickers. Note that in the case where two kinds of common electrode layers are provided as in Embodiment 2, it is preferable that a first common electrode layer and a second common electrode layer have the same potential.

The first electrode layer 447 which is a pixel electrode layer is formed to cover a top surface and a side surface of a first structure body 449 which is provided to project into the liquid crystal layer 444 from a surface of an interlayer film 413 on the liquid crystal layer 444 side over a first substrate 441 (also referred to as an element substrate). The second electrode layer 448 is formed to cover a top surface and a side surface of a second structure body 445 which is provided to project into the liquid crystal layer 444 from the surface of the interlayer film 413 on the liquid crystal layer 444 side over the first substrate 441.

In addition, in the cross-sectional view of FIG. 3B, the first electrode layer 447 and the second electrode layer 448 are alternately provided without overlapping with each other.

The first electrode layer 447 and the second electrode layer 448 have various opening patterns and each have a shape including a bend portion or a branching comb-like shape, instead of a flat shape.

The first structure body 449 and the second structure body 445 are rib-shaped. The rib-shaped first structure body 449 and the rib-shaped second structure body 445 reflect the shapes of the first electrode layer 447 and the second electrode layer 448, which are formed over the top surfaces and the side surfaces thereof, and each have an opening pattern and a shape including a bend portion or a branching comb-like shape.

The first electrode layer 447 is provided so as to cover the top surface and the side surface of the first structure body 449 and the second electrode layer 448 is provided so as to cover the top surface and the side surface of the second structure body 445, whereby the formation area of the first electrode layer 447 and the second electrode layer 448 can be increased in a thickness direction (three-dimensionally) of the liquid crystal layer 444. Accordingly, when voltage is applied between the first electrode layer 447 and the second electrode layer 448, an electric field can be widely formed between the first electrode layer 447 and the second electrode layer 448.

Note that as in Embodiment 2, another common electrode layer may be provided on a counter substrate (a second substrate) side so that a pair of common electrode layers faces each other. In this case, a first common electrode layer on the first substrate side and a second common electrode layer (a third electrode layer) on the second substrate side are positioned so as to overlap with each other with the liquid crystal layer interposed therebetween.

In addition, when the second common electrode layer is provided on the second substrate side, an electric field can be applied to liquid crystal in an oblique direction (in a direction oblique to the substrate) between the pixel electrode layer and the second common electrode layer; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance (light transmittance in black display) can also be increased.

The structure bodies can be formed using an insulator which includes an insulating material (an organic material or an inorganic material) and/or a conductor which includes a conductive material (an organic material or an inorganic material). Typically, a visible light curable resin, an ultraviolet curable resin, or a thermosetting resin is preferably used. For example, an acrylic resin, an epoxy resin, an amine resin, or the like can be used. Moreover, the structure bodies may be formed using a conductive resin or a metal material. Note that the structure bodies may each have a stacked-layer structure of plural thin films.

Each of the structure bodies can have a columnar shape, a truncated conical or pyramidal shape with a flat top surface and a trapezoidal cross section, a conical or pyramidal shape with a rounded dome top, or the like. In this specification, since a pixel electrode layer and a common electrode layer (a first common electrode layer) are formed so as to cover surfaces (top surfaces and side surfaces) of structure bodies, it is preferable that the structure bodies each have a curved surface with little unevenness so as to be favorably covered with the pixel electrode layer and the common electrode layer (the first common electrode layer). Further, a material with a light-transmitting property with respect to visible light is preferably used for the structure bodies because reduction in aperture ratio and white transmittance can be prevented.

Furthermore, each of the structure bodies may be a portion which projects into the liquid crystal layer from a surface of the first substrate on the liquid crystal layer side; thus, a projecting structure body may be formed by processing an interlayer film so that the surface on the liquid crystal layer side is uneven. Accordingly, each of the structure bodies may be formed using a continuous film provided with a plurality of projections, or the first structure body and the second structure body may be formed as a continuous film.

There is no particular limitation on the method for forming the structure bodies, and a dry method such as an evaporation method, a sputtering method, or a CVD method or a wet method such as spin coating, dip coating, spray coating, a droplet discharging method (an ink jetting method), nanoimprinting, or various printing methods (screen printing or offset printing) may be used in accordance with the material. As needed, an etching method (dry etching or wet etching) may be employed to form a desired pattern.

It is preferable that the first structure body 449 over which the first electrode layer 447 is formed and the second structure body 445 each have a tapered shape in which end portions have curvatures as illustrated in FIG. 3B because coverage with the first electrode layer 447 and the second electrode layer 448 is improved. In this embodiment, an example is described in which the first electrode layer 447 is in contact with a wiring layer 405b of the transistor 420 and continuously formed over the first structure body 449; however, the first electrode layer 447 may be formed by forming an electrode layer which is in contact with the wiring layer 405b so that the first electrode layer 447 is electrically connected to the wiring layer 405b through the electrode layer.

In addition, in the case where an interlayer film is formed to cover a transistor and a structure body is formed over the interlayer film, after the structure body is formed by an etching process, a contact hole for connection of the transistor may be opened in the interlayer film. Note that FIGS. 3A and 3B illustrate an example in which a contact hole is formed in an interlayer film and an insulating film which is to be structure bodies, and then the insulating film is processed by etching so that the structure bodies are formed.

The transistor 420 is an inverted staggered thin film transistor in which the gate electrode layer 401, a gate insulating layer 402, a semiconductor layer 403, and the wiring layers 405a and 405b which function as a source electrode layer and a drain electrode layer are provided over the first substrate 441 which is a substrate having an insulating surface.

An insulating film 407 which covers the transistor 420 and is in contact with the semiconductor layer 403, and an insulating layer 409 are provided. The interlayer film 413 is stacked over the insulating layer 409.

The liquid crystal display device can be provided with a coloring layer which functions as a color filter layer. The color filter layer may be provided on an outer side of the first substrate 441 and a second substrate 442 (on a side opposite to the liquid crystal layer 444) or on an inner side of the first substrate 441 and the second substrate 442.

A color filter may be formed using materials which exhibit red (R), green (G), and blue (B) in the case where the liquid crystal display device performs full-color display, and the coloring layer may be omitted or may be formed using a material which exhibits at least one color in the case where the liquid crystal display device performs monochrome display. Note that the color filler is not always provided in the case where light-emitting diodes (LEDs) of RGB or the like are arranged in a backlight unit and a successive additive color mixing method (a field sequential method) in which color display is performed by time division is employed.

FIGS. 3A and 3B illustrate an example of a liquid crystal display device in which a chromatic-color light-transmitting resin layer 417 which functions as a color filter layer is used as the interlayer film 413.

In the case of providing the color filter layer on the counter substrate side, precise positional alignment of a pixel region with an element substrate over which the transistor is formed is difficult, and thus there is a possibility that image quality is degraded. Here, since the interlayer film is formed directly on the element substrate side as the color filter layer, the formation region can be controlled more precisely and this structure is adjustable to a pixel with a minute pattern. In addition, one insulating layer functions as both the interlayer film and the color filter layer, whereby the process can be simplified and a liquid crystal display device can be manufactured at lower cost.

As the chromatic-color light-transmitting resin, a photosensitive organic resin or a non-photosensitive organic resin can be used. A photosensitive organic resin layer is preferably used because the number of resist masks can be reduced; thus, the process can be simplified. In addition, the shape of a contact hole which is formed in the interlayer film is also an opening shape with a curvature; thus, coverage with a film such as an electrode layer formed in the contact hole can also be improved.

Chromatic colors are colors except achromatic colors such as black, gray, and white. In order to function as a color filter, the coloring layer is formed using a material which transmits only the chromatic color light. As the chromatic color, red, green, blue, or the like can be used. Alternatively, cyan, magenta, yellow, or the like may be used. "Transmitting only the chromatic color light" means that light transmitted through the coloring layer has a peak at the wavelength of the chromatic color light.

The thickness of the chromatic-color light-transmitting resin layer 417 is preferably controlled as appropriate in consideration of the relation between the concentration of the coloring material to be included and transmittance of light in order that the chromatic-color light-transmitting resin layer 417 functions as a coloring layer (color filter). In the case where the interlayer film 413 is formed by stacking a plurality of thin films and at least one layer of them is a chromatic-color light-transmitting resin layer, it can function as a color filter.

In the case where the thickness of the chromatic-color light-transmitting resin layer varies depending on the color of the chromatic color or in the case where there is unevenness due to a light-blocking layer or a transistor, an insulating layer which transmits light in a visible wavelength range (a so-called colorless and transparent insulating layer) may be stacked for planarization of a surface of the interlayer film. The planarization of the interlayer film enables favorable coverage with a pixel electrode layer or a first common electrode layer to be formed thereover and a uniform gap (thickness) of a liquid crystal layer, whereby the visibility of the liquid crystal display device is increased and higher image quality can be achieved.

There is no particular limitation on the method for forming the interlayer film 413 (the chromatic-color light-transmitting resin layer 417), and any of the following can be employed in accordance with the material: methods such as spin coating, dip coating, spray coating, and a droplet discharging method (such as an ink jetting method, screen printing, or offset printing); tools (equipment) such as a doctor knife, a roll coater, a curtain coater, and a knife coater; and the like.

The liquid crystal layer 444 is provided over the first electrode layer 447 and the second electrode layer 448 and sealed with the second substrate 442 which is a counter substrate.

The first substrate 441 and the second substrate 442 are light-transmitting substrates and provided with polarizing plates 443a and 443b on outer sides (on the sides opposite to the liquid crystal layer 444), respectively.

A manufacturing process of the liquid crystal display device illustrated in FIGS. 3A and 3B is described with reference to FIGS. 7A to 7D. FIGS. 7A to 7D are cross-sectional views illustrating a manufacturing process of a liquid crystal display device. Note that a pixel electrode layer, a first common electrode layer, and a second common electrode layer which are included are omitted in FIGS. 7A to 7D. The pixel electrode layer and the common electrode layer can have the structures illustrated in FIGS. 3A and 3B, and the pixel electrode layer and the common electrode layer are provided so as to cover top surfaces and side surfaces of structure bodies in a liquid crystal layer, whereby a wide electric field can be formed.

Figure 7A:
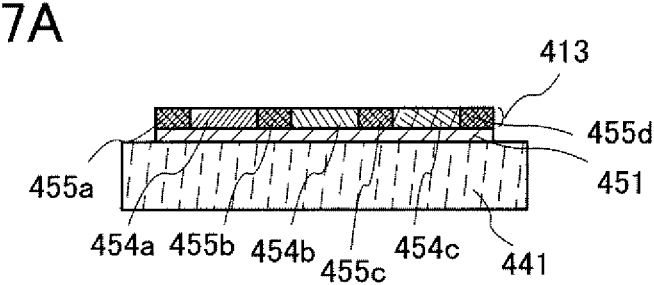
FIGS. 7A to 7D illustrate a method for manufacturing a liquid crystal display device.

In FIG. 7A, an element layer 451 is formed over the first substrate 441 which is an element substrate, and the interlayer film 413 is formed over the element layer 451.

The interlayer film 413 includes chromatic-color light-transmitting resin layers 454a, 454b, and 454c and light-blocking layers 455a, 455b, 455c, and 455d and has a structure in which the chromatic-color light-transmitting resin layers 454a, 454b, and 454c are formed between the light-blocking layers 455a and 455b, between the light-blocking layers 455b and 455c, and between the light-blocking layers 455c and 455d, respectively. Note that in FIGS. 7A to 7D, the pixel electrode layer and the common electrode layer which are included are omitted.

Figure 7B:
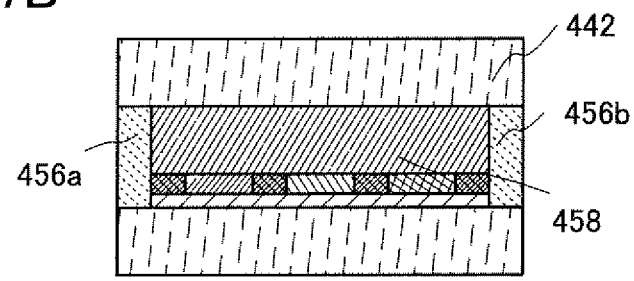

As illustrated in FIG. 7B, the first substrate 441 and the second substrate 442 which is a counter substrate are firmly attached to each other with sealants 456a and 456b with a liquid crystal layer 458 interposed between the first substrate 441 and the second substrate 442. The liquid crystal layer 458 can be formed by a dispenser method (a dropping method), or an injection method by which liquid crystal is injected using a capillary phenomenon or the like after the first substrate 441 is attached to the second substrate 442.

A liquid crystal material exhibiting a blue phase can be used for the liquid crystal layer 458. The liquid crystal layer 458 is formed using a liquid crystal material including liquid crystal, a chiral agent, a photocurable resin, and a photopolymerization initiator.

As the sealants 456a and 456b, typically, a visible light curable resin, an ultraviolet curable resin, or a thermosetting resin is preferably used. An acrylic resin, an epoxy resin, an amine resin, or the like can be typically used. In addition, the sealants 456a and 456b may include a photopolymerization initiator (typically an ultraviolet polymerization initiator), a thermosetting agent, a filler, or a coupling agent.

Figure 7C:
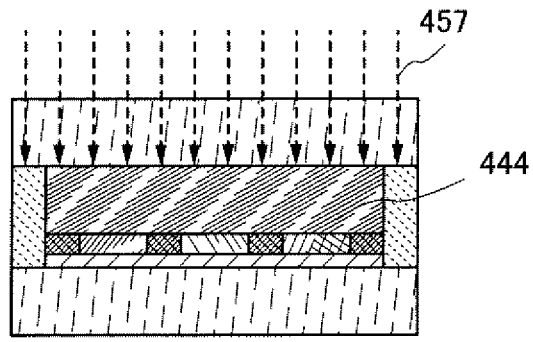

As illustrated in FIG. 7C, polymer stabilization treatment is performed by irradiating the liquid crystal layer 458 with light 457 so that the liquid crystal layer 444 is formed. The light 457 is light having a wavelength with which the photocurable resin and the photopolymerization initiator included in the liquid crystal layer 458 are reacted. By the polymer stabilization treatment using light irradiation, the temperature range where the liquid crystal layer 444 exhibits a blue phase can be widened.

In the case where, for example, a photocurable resin such as an ultraviolet curable resin is used for a sealant and a liquid crystal layer is formed by a dropping method, the sealant may be cured in the light irradiation step of the polymer stabilization treatment.

As illustrated in FIGS. 7A to 7D, when the liquid crystal display device has a structure in which the color filter layer and the light-blocking layer are formed over the element substrate, light from a counter substrate side is not absorbed or blocked by the color filter layer and the light-blocking layer; accordingly, the entire liquid crystal layer can be uniformly irradiated with light. Therefore, alignment disorder of liquid crystal due to nonuniform photopolymerization, display unevenness due to the alignment disorder, and the like can be prevented. In addition, the transistor can also be shielded from light by the light-blocking layer, whereby defects of electric characteristics due to the light irradiation can be prevented.

Figure 7D:
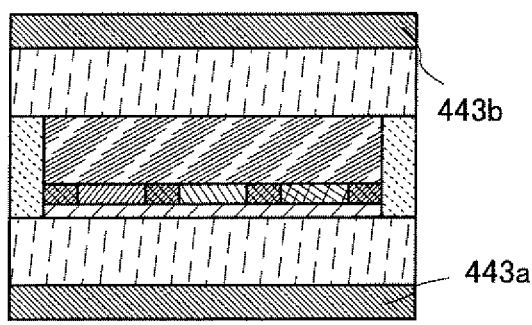

As illustrated in FIG. 7D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the second substrate 442. In addition to the polarizing plates, an optical film such as a retardation plate or an anti-reflection film may be provided. For example, circular polarization may be employed using a polarizing plate and a retardation plate. Through the above process, the liquid crystal display device can be completed.

In addition, in the case of manufacturing a plurality of liquid crystal display devices with the use of a large-sized substrate (a so-called multiple panel method), a division step can be performed before the polymer stabilization treatment or before provision of the polarizing plates. In consideration of the influence of the division step on the liquid crystal layer (such as alignment disorder due to force applied in the division step), it is preferable that the division step be performed after the first substrate is attached to the second substrate and before the polymer stabilization treatment is performed.

Although not illustrated, a backlight, a sidelight, or the like may be used as a light source. Light from the light source is emitted from a first substrate 441 side, which is an element substrate, so as to pass through the second substrate 442 on a viewing side.

The first electrode layer 447 and the second electrode layer 448 can be formed using a light-transmitting conductive material such as indium oxide including tungsten oxide, indium zinc oxide including tungsten oxide, indium oxide including titanium oxide, indium tin oxide including titanium oxide, indium tin oxide (ITO), indium zinc oxide, or indium tin oxide to which silicon oxide is added.

The first electrode layer 447 and the second electrode layer 448 can be formed using one or more of the following: metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy thereof; and a nitride thereof.

The first electrode layer 447 and the second electrode layer 448 can be formed using a conductive composition including a conductive macromolecule (also referred to as a conductive polymer). It is preferable that a pixel electrode formed using the conductive composition have sheet resistance of 10000 Ω/square or less and light transmittance of 70% or higher at a wavelength of 550 nm. It is also preferable that the conductive macromolecule which is included in the conductive composition have resistivity of 0.1 Ω·cm or less.

As the conductive macromolecule, a so-called π-electron conjugated conductive macromolecule can be used. For example, polyaniline or a derivative thereof, polypyrrole or a derivative thereof, polythiophene or a derivative thereof, a copolymer of two or more kinds of them, and the like can be given.

An insulating film serving as a base film may be provided between the first substrate 441 and the gate electrode layer 401. The base film has a function of preventing diffusion of an impurity element from the first substrate 441, and can be formed to have a single-layer structure or a stacked-layer structure using one or more of a silicon nitride film, a silicon oxide film, a silicon nitride oxide film, and a silicon oxynitride film. The gate electrode layer 401 can be formed to have a single-layer structure or a stacked-layer structure using a metal material such as molybdenum, titanium, chromium, tantalum, tungsten, aluminum, copper, neodymium, or scandium, or an alloy material which includes any of these as a main component. By using a light-blocking conductive film as the gate electrode layer 401, light from a backlight (light emitted through the first substrate 441) can be prevented from entering the semiconductor layer 403.

As a two-layer structure of the gate electrode layer 401, for example, a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and a molybdenum layer are stacked is preferable. As a three-layer structure, a stacked-layer structure in which a tungsten layer or a tungsten nitride layer, an alloy layer of aluminum and silicon or an alloy layer of aluminum and titanium, and a titanium nitride layer or a titanium layer are stacked is preferable.

The gate insulating layer 402 can be formed using a silicon oxide layer, a silicon nitride layer, a silicon oxynitride layer, or a silicon nitride oxide layer to have a single-layer structure or a stacked-layer structure by a plasma CVD method, a sputtering method, or the like. Alternatively, the gate insulating layer 402 can be formed using a silicon oxide layer by a CVD method in which an organosilane gas is used. As the organosilane gas, any of the following compounds including silicon can be used: tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), trisdimethylaminosilane ($SiH(N(CH_3)_2)_3$), and the like.

In a process of forming the semiconductor layer and the wiring layer, an etching step is used to process thin films into desired shapes. Dry etching or wet etching can be used for the etching step.

As an etching apparatus used for the dry etching, an etching apparatus using a reactive ion etching method (an RIE method), or a dry etching apparatus using a high-density plasma source such as electron cyclotron resonance (ECR) or inductively coupled plasma (ICP) can be used. As a dry etching apparatus with which uniform discharge can be easily obtained over a large area as compared to an ICP etching apparatus, there is an enhanced capacitively coupled plasma (ECCP) mode etching apparatus in which an upper electrode is grounded, a first high-frequency power source of 13.56 MHz is connected to a lower electrode, and further a second high-frequency power source of 3.2 MHz, which is a lower frequency than that of the first high-frequency power source, is connected to the lower electrode. This ECCP mode etching apparatus can be employed even when a substrate having a size exceeding 3 meters of the tenth generation is used as the substrate, for example.

When the ICP dry etching apparatus is used as an etching apparatus, the etching conditions (such as the amount of electric power applied to a coil-shaped electrode, the amount of electric power applied to an electrode on a substrate side, and the temperature of the electrode on the substrate side) are adjusted as appropriate so that the films can be etched to have desired shapes.

The etching conditions (such as an etchant, etching time, and temperature) are adjusted as appropriate in accordance with the material so that the films can be etched to have desired shapes.

As a material of the wiring layers 405a and 405b, an element selected from Al, Cr, Ta, Ti, Mo, and W, an alloy including any of these elements as a component, an alloy film including any of these elements in combination, and the like can be given. In the case where heat treatment is performed, it is preferable that the conductive film have heat resistance enough to withstand the heat treatment. For example, since the use of Al alone brings disadvantages such as low heat resistance and a tendency to corrosion, aluminum is used in combination with a conductive material having heat resistance. As the conductive material having heat resistance which is combined with Al, an element selected from titanium (Ti), tantalum (Ta), tungsten (W), molybdenum (Mo), chromium (Cr), neodymium (Nd), and scandium (Se), an alloy including any of these elements as a component, an alloy film including any of these elements in combination, or a nitride including any of these elements as a component is used.

The gate insulating layer 402, the semiconductor layer 403, and the wiring layers 405a and 405b may be successively formed without exposure to air. By successive formation without exposure to air, each interface between the stacked layers can be formed without being contaminated by atmospheric components or contaminant impurity elements in air; thus, variation in characteristics of the transistor can be reduced.

Note that the semiconductor layer 403 is partly etched and has a groove (a depressed portion).

As the insulating film 407 and the insulating layer 409 which cover the transistor 420, an inorganic insulating film or an organic insulating film which is formed by a dry method or a wet method can be used. A silicon nitride film, a silicon oxide film, a silicon oxynitride film, an aluminum oxide film, a tantalum oxide film, or the like, which is formed by a CVD method, a sputtering method, or the like, can be used, for example. In addition, an organic material such as polyimide, acrylic, benzocyclobutene, polyamide, or epoxy can be used. Other than such organic materials, it is also possible to use a low-dielectric constant material (a low-k material), a siloxane-based resin, phosphosilicate glass (PSG), borophosphosilicate glass (BPSG), or the like.

Note that the siloxane-based resin is a resin including a Si—O—Si bond, which is formed using a siloxane-based material as a starting material. The siloxane-based resin may include, as a substituent, an organic group (e.g., an alkyl group or an aryl group) or a fluoro group. The organic group may include a fluoro group. A siloxane-based resin is applied by a coating method and baked; thus, the insulating film 407 can be formed.

Alternatively, the insulating film 407 and the insulating layer 409 may be formed by stacking plural insulating films formed using any of these materials. For example, the insulating film 407 and the insulating layer 409 may each have a structure in which an organic resin film is stacked over an inorganic insulating film.

Further, with the use of a resist mask having a plurality of regions with different thicknesses (typically, two kinds of thicknesses), which is formed using a multi-tone mask, the number of resist masks can be reduced, resulting in a simplified process and lower cost.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

Embodiment 4

Figure 4A:
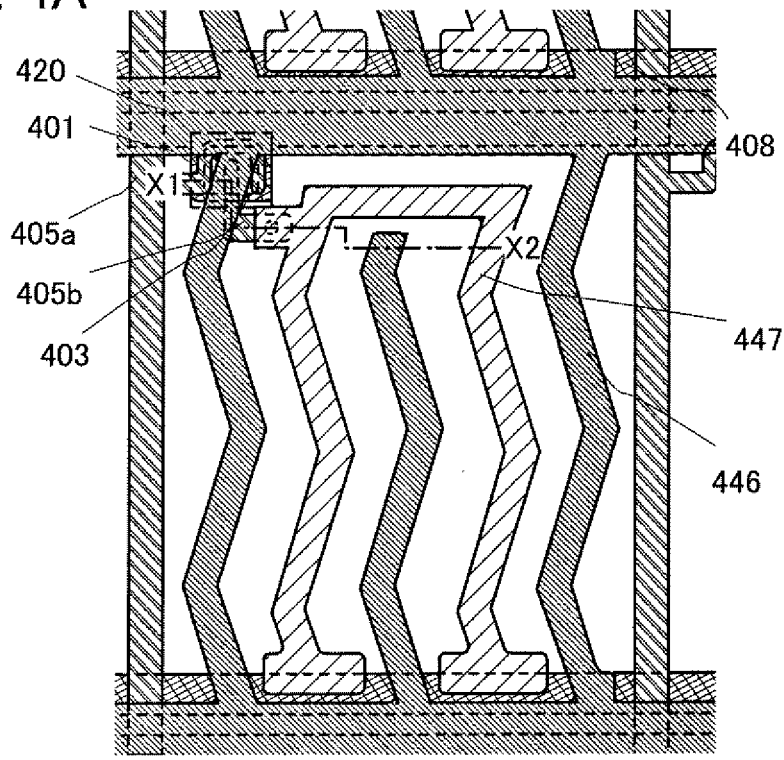
FIGS. 4A and 4B illustrate a liquid crystal display device.
Figure 4B:
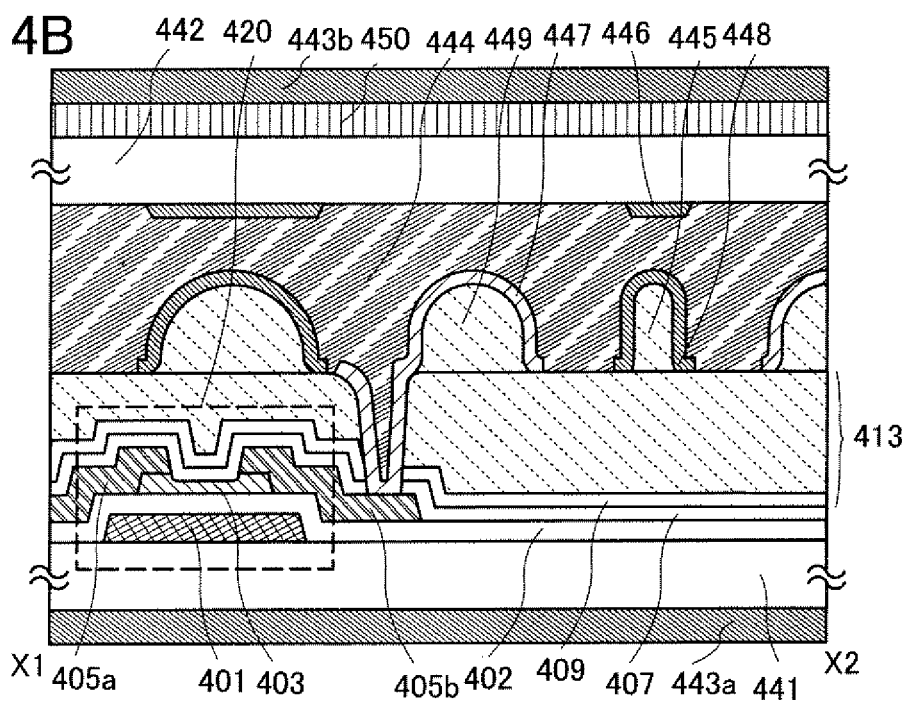

FIGS. 4A and 4B illustrate an example in which a color filter is provided on an outer side of substrates between which a liquid crystal layer is interposed in Embodiment 3. Note that components in common with those in Embodiments 1 to 3 can be formed using a similar material and manufacturing method, and detailed description of the same portions and portions having similar functions will be omitted.

FIG. 4A is a plan view of a liquid crystal display device and illustrates one pixel. FIG. 4B is a cross-sectional view taken along line X1-X2 in FIG. 4A.

In the plan view of FIG. 4A, in a manner similar to that of Embodiment 2, a plurality of source wiring layers (including the wiring layer 405a) is provided in parallel to each other (extended in a vertical direction in the drawing) and apart from each other. A plurality of gate wiring layers (including the gate electrode layer 401) is extended in a direction generally perpendicular to the source wiring layers (a horizontal direction in the drawing) and provided apart from each other. The capacitor wiring layers 408 are adjacent to the plurality of gate wiring layers and extended in a direction generally parallel to the gate wiring layers, that is, in a direction generally perpendicular to the source wiring layers (a horizontal direction in the drawing). A space with a generally rectangular shape, which is surrounded by the source wiring layers, the capacitor wiring layers 408, and the gate wiring layers, is provided with a pixel electrode layer (the first electrode layer 447), a first common electrode layer (the second electrode layer 448), and a second common electrode layer (a third electrode layer 446) of the liquid crystal display device with the liquid crystal layer 444 is interposed therebetween. The transistor 420 for driving the pixel electrode layer is provided at an upper left corner of the drawing. A plurality of pixel electrode layers and a plurality of transistors are arranged in matrix.

FIGS. 4A and 4B illustrate an example in which the interlayer film 413 is formed to cover the transistor 420, the first structure body 449 is formed over the interlayer film 413 by an etching process, and then a contact hole for connection of the transistor 420 is opened in the interlayer film 413. The first electrode layer 447 which is a pixel electrode layer is continuously formed to cover the first structure body 449 and the contact hole formed in the interlayer film 413.

The first electrode layer 447 which is a pixel electrode layer is formed to cover a top surface and a side surface of the first structure body 449 which is provided to project into the liquid crystal layer 444 from a surface of the interlayer film 413 on the liquid crystal layer 444 side over the first substrate 441. The second electrode layer 448 is formed to cover a top surface and a side surface of the second structure body 445 which is provided to project into the liquid crystal layer 444 from the surface of the inter layer film 413 on the liquid crystal layer 444 side over the first substrate 441.

In this embodiment, the second electrode layer 448 which is a first common electrode layer on the first substrate 441 side and the third electrode layer 446 which is a second common electrode layer on the second substrate 442 side are positioned so as to overlap with each other with the liquid crystal layer 444 interposed therebetween, as in Embodiment 2. In addition, in the cross-sectional view of FIG. 4B, the first electrode layer 447, and the second electrode layer 448 and the third electrode layer 446 are alternately provided without overlapping with each other.

The first electrode layer 447 is provided so as to cover the top surface and the side surface of the first structure body 449 and the second electrode layer 448 is provided so as to cover the top surface and the side surface of the second structure body 445, whereby the formation area of the first electrode layer 447 and the second electrode layer 448 can be increased in a thickness direction (three-dimensionally) of the liquid crystal layer 444. Accordingly, when voltage is applied between the first electrode layer 447 and the second electrode layer 448, an electric field can be widely formed between the first electrode layer 447 and the second electrode layer 448.

In addition, when the third electrode layer 446 is provided on the second substrate 442 side as a second common electrode layer, an electric field can be applied to liquid crystal in an oblique direction (in a direction oblique to the substrate) between the first electrode layer 447 which is a pixel electrode layer and the third electrode layer 446; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance (light transmittance in black display) can also be increased.

The third electrode layer 446 can be formed in a manner similar to that of the first electrode layer 447 or the second electrode layer 448, and a similar material and a similar method can be used.

In the liquid crystal display device illustrated in FIGS. 4A and 4B, a color filter 450 is provided between the second substrate 442 and the polarizing plate 443b. In this manner, the color filter 450 may be provided on an outer side of the first substrate 441 and the second substrate 442 between which the liquid crystal layer 444 is interposed.

FIGS. 17A to 17D illustrate a manufacturing process of the liquid crystal display device in FIGS. 4A and 4B.

Note that a pixel electrode layer, a first common electrode layer, a second common electrode layer, a first structure body, and a second structure body which are included are omitted in FIGS. 17A to 17D. For example, the pixel electrode layer, the first common electrode layer, the second common electrode layer, the first structure body, and the second structure body can have the structures described in Embodiment 1 or 2.

Figure 17A:
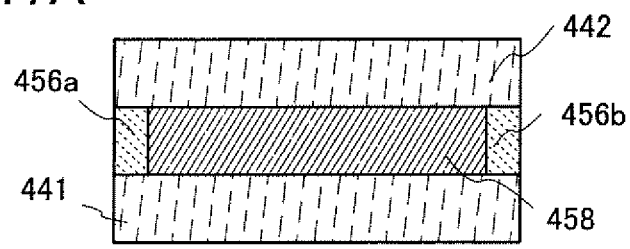
FIGS. 17A to 17D illustrate a method for manufacturing a liquid crystal display device.

As illustrated in FIG. 17A, the first substrate 441 and the second substrate 442 which is a counter substrate are firmly attached to each other with the sealants 456a and 456b with the liquid crystal layer 458 interposed between the first substrate 441 and the second substrate 442. The liquid crystal layer 458 can be formed by a dispenser method (a dropping method), or an injection method by which liquid crystal is injected using a capillary phenomenon after the first substrate 441 is attached to the second substrate 442.

A liquid crystal material exhibiting a blue phase is used for the liquid crystal layer 458. The liquid crystal layer 458 is formed using a liquid crystal material including liquid crystal, a chiral agent, a photocurable resin, and a photopolymerization initiator.

Figure 17B:
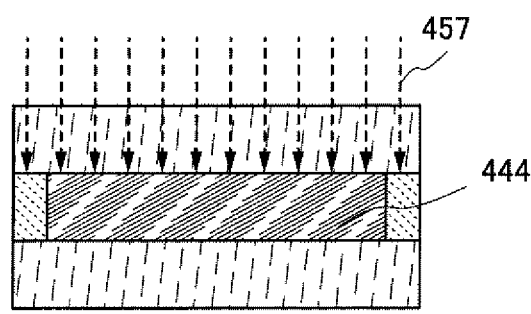

As illustrated in FIG. 17B, polymer stabilization treatment is performed by irradiating the liquid crystal layer 458 with the light 457 so that the liquid crystal layer 444 is formed. The light 457 is light having a wavelength with which the photocurable resin and the photopolymerization initiator included in the liquid crystal layer 458 are reacted. By the polymer stabilization treatment using light irradiation, the temperature range where the liquid crystal layer 458 exhibits a blue phase can be widened.

In the case where, for example, a photocurable resin such as an ultraviolet curable resin is used for a sealant and a liquid crystal layer is formed by a dropping method, the sealant may be cured in the light irradiation step of the polymer stabilization treatment.

Figure 17C:
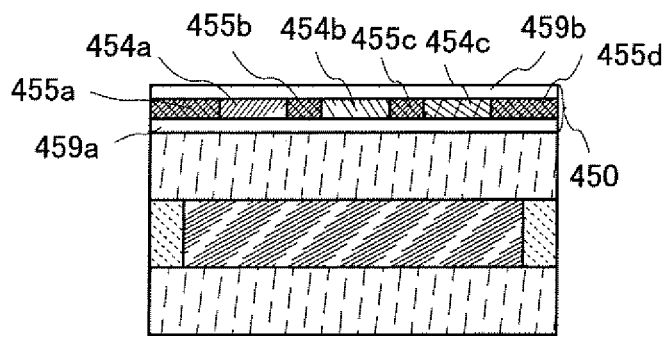

Next, as illustrated in FIG. 17C, the color filter 450 is provided on a second substrate 442 side which is a viewing side. The color filter 450 includes the chromatic-color light-transmitting resin layers 454a, 454b, and 454c which function as color filter layers and the light-blocking layers 455a, 455b, 455c, and 455d which function as black matrix layers between a pair of substrates 459a and 459b. The chromatic-color light-transmitting resin layers 454a, 454b, and 454c are formed between the light-blocking layers 455a and 455b, between the light-blocking layers 455b and 455c, and between the light-blocking layers 455c and 455d, respectively.

Figure 17D:
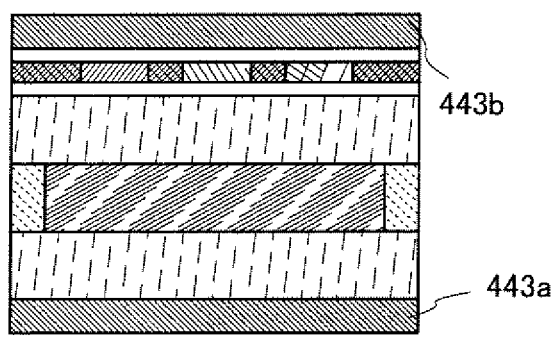

As illustrated in FIG. 17D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the color filter 450. In addition to the polarizing plates, an optical film such as a retardation plate or an anti-reflection film may be provided. For example, circular polarization may be employed using a polarizing plate and a retardation plate. Through the above process, the liquid crystal display device can be completed.

In addition, in the case of manufacturing a plurality of liquid crystal display devices with the use of a large-sized substrate (a so-called multiple panel method), a division step can be performed before the polymer stabilization treatment or before provision of the polarizing plates. In consideration of the influence of the division step on the liquid crystal layer (such as alignment disorder due to force applied in the division step), it is preferable that the division step be performed after the first substrate is attached to the second substrate and before the polymer stabilization treatment is performed.

Although not illustrated, a backlight, a sidelight, or the like may be used as a light source. Light from the light source is emitted from a first substrate 441 side, which is an element substrate, so as to pass through the second substrate 442 on a viewing side.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

Embodiment 5

A liquid crystal display device including a light-blocking layer (a black matrix) will be described with reference to FIGS. 5A and 5B.

Figure 5A:
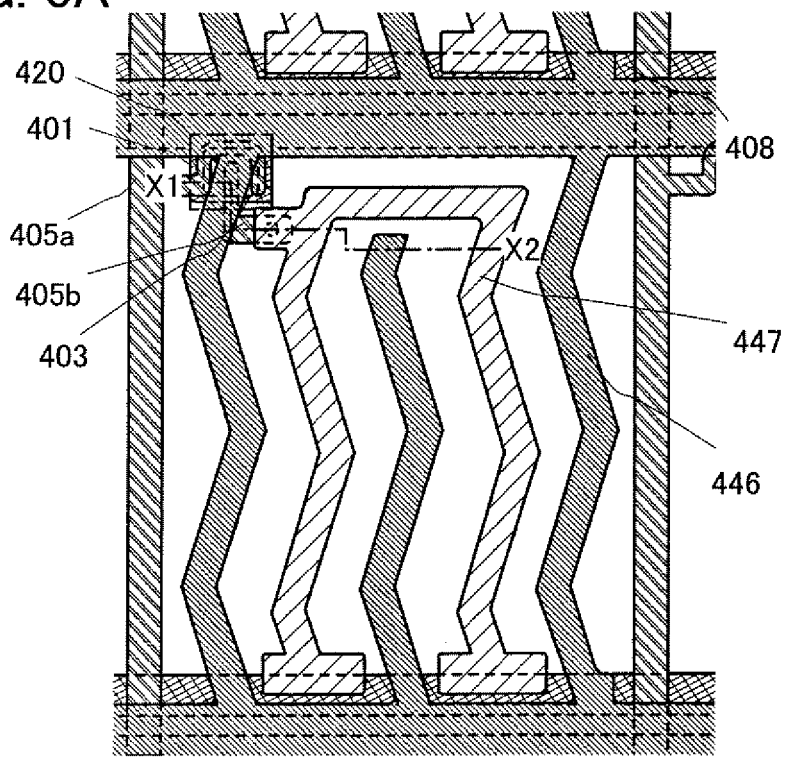
FIGS. 5A and 5B illustrate a liquid crystal display device.
Figure 5B:
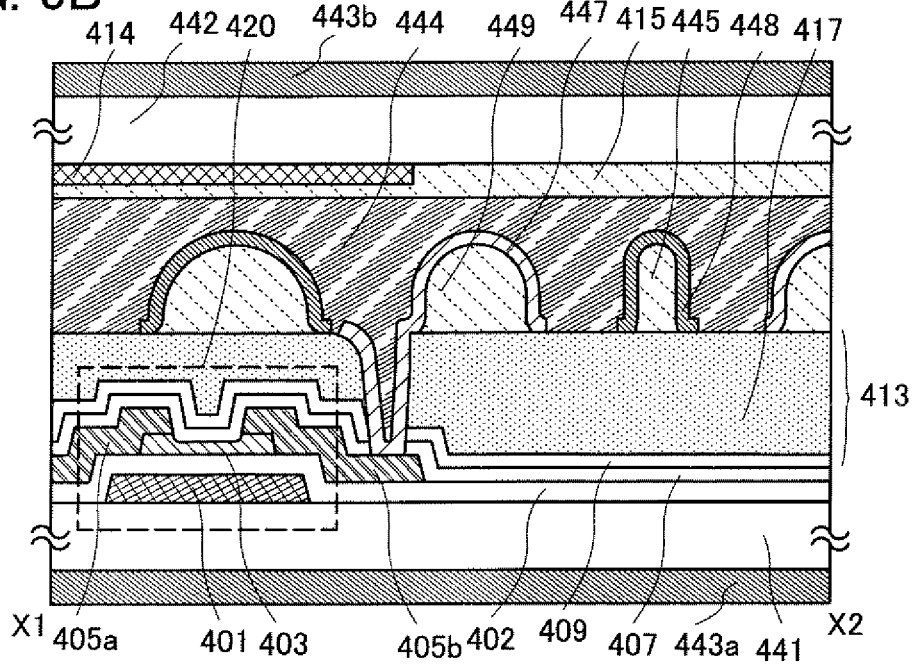

A liquid crystal display device illustrated in FIGS. 5A and 5B is an example in which a light-blocking layer 414 is further formed on a second substrate 442 side, which is a counter substrate, in the liquid crystal display device illustrated in FIGS. 3A and 3B of Embodiment 3. Therefore, components in common with those in Embodiment 3 can be formed using a similar material and manufacturing method, and detailed description of the same portions and portions having similar functions will be omitted.

FIG. 5A is a plan view of the liquid crystal display device. FIG. 5B is a cross-sectional view taken along line X1-X2 in FIG. 5A. Note that the plan view of FIG. 5A illustrates only the element substrate side and the counter substrate side is not illustrated.

The light-blocking layer 414 is formed on the liquid crystal layer 444 side of the second substrate 442 and an insulating layer 415 is formed as a planarization film. The light-blocking layer 414 is preferably formed in a region corresponding to the transistor 420 (a region which overlaps with a semiconductor layer of the transistor) with the liquid crystal layer 444 interposed therebetween. The first substrate 441 and the second substrate 442 are firmly attached to each other with the liquid crystal layer 444 interposed therebetween so that the light-blocking layer 414 is positioned to cover at least the semiconductor layer 403 of the transistor 420.

In FIGS. 5A and 5B, the light-blocking layer 414 is formed so as to cover a contact hole through which the first electrode layer 447 and the wiring layer 405b are connected to each other. Therefore, display unevenness caused by light leakage or the like due to an alignment defect of liquid crystal that occurs easily over a contact hole can be concealed; accordingly, reduction in contrast can be suppressed.

The light-blocking layer 414 is formed using a light-blocking material which reflects or absorbs light. For example, a black organic resin can be used, and the light-blocking layer 414 may be formed by mixing a black resin of a pigment material, carbon black, titanium black, or the like into a resin material such as photosensitive or non-photosensitive polyimide. Alternatively, a light-blocking metal film can be used, and chromium, molybdenum, nickel, titanium, cobalt, copper, tungsten, aluminum, or the like may be used, for example.

There is no particular limitation on the method for forming the light-blocking layer 414, and a dry method such as an evaporation method, a sputtering method, or a CVD method or a wet method such as spin coating, dip coating, spray coating, or a droplet discharging method (such as an ink jetting method, screen printing, or offset printing) may be used in accordance with the material. As needed, an etching method (dry etching or wet etching) may be employed to form a desired pattern.

The insulating layer 415 may be formed using an organic resin or the like such as acrylic or polyimide by a coating method such as spin coating or various printing methods.

When the light-blocking layer 414 is further provided on the counter substrate side in this manner, the contrast can be increased and the transistor can be stabilized more. The light-blocking layer 414 can block light incident on the semiconductor layer 403 of the transistor 420; accordingly, electric characteristics of the transistor 420 can be prevented from being varied due to photosensitivity of the semiconductor and can be further stabilized. Further, the light-blocking layer 414 can prevent light leakage to an adjacent pixel, which enables higher contrast and higher definition display. Therefore, high definition and high reliability of the liquid crystal display device can be achieved.

The first electrode layer 447 is provided so as to cover a top surface and a side surface of the first structure body 449 and the second electrode layer 448 is provided so as to cover a top surface and a side surface of the second structure body 445, whereby the formation area of the first electrode layer 447 and the second electrode layer 448 can be increased in a thickness direction (three-dimensionally) of the liquid crystal layer 444. Accordingly, when voltage is applied between the first electrode layer 447 and the second electrode layer 448, an electric field can be widely formed between the first electrode layer 447 and the second electrode layer 448.

Therefore, liquid crystal molecules in the entire liquid crystal layer in a thickness direction can be made to respond and white transmittance can be improved. Accordingly, the contrast ratio which is a ratio of white transmittance to black transmittance can also be increased.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

This embodiment can be combined with any of the structures described in the other embodiments as appropriate.

Embodiment 6

A liquid crystal display device including a light-blocking layer (a black matrix) will be described with reference to FIGS. 6A and 6B.

Figure 6A:
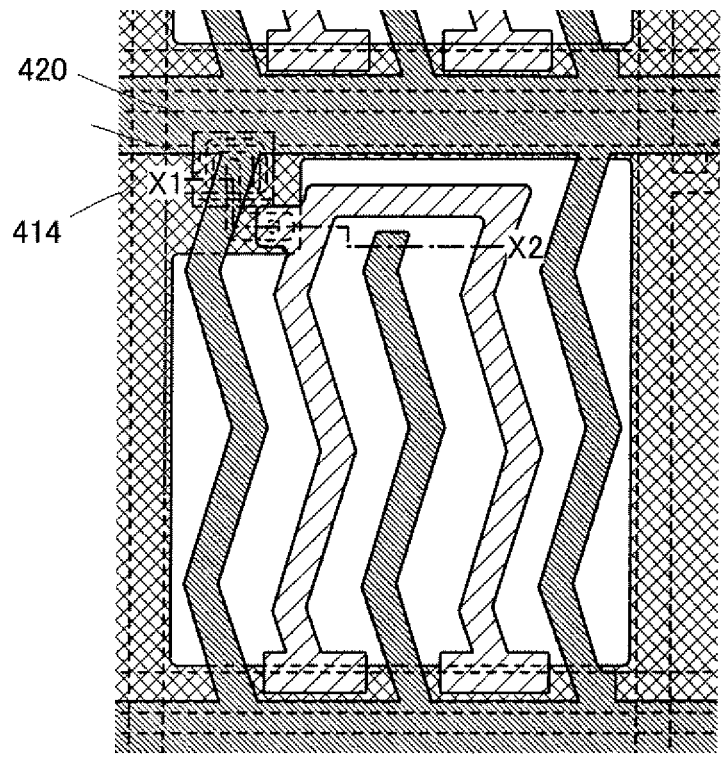
FIGS. 6A and 6B illustrate a liquid crystal display device.
Figure 6B:
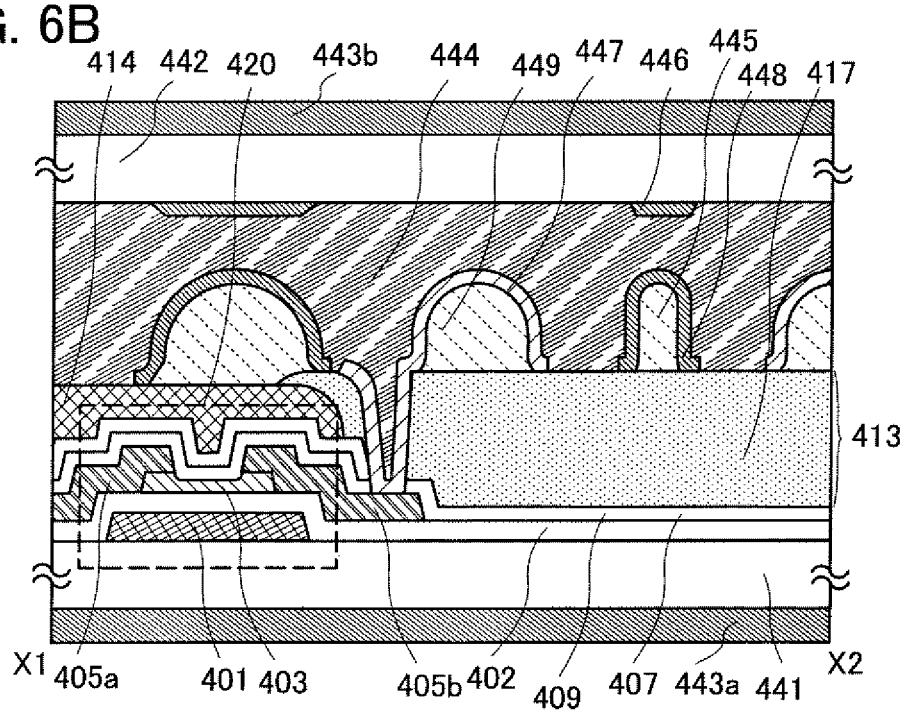

A liquid crystal display device illustrated in FIGS. 6A and 6B is an example in which the light-blocking layer 414 is formed on a first substrate 441 side, which is an element substrate, as part of the interlayer film 413 in the liquid crystal display device illustrated in FIGS. 3A and 3B of Embodiment 3. Therefore, components in common with those in Embodiment 3 can be formed using a similar material and manufacturing method, and detailed description of the same portions and portions having similar functions will be omitted.

FIG. 6A is a plan view of the liquid crystal display device. FIG. 6B is a cross-sectional view taken along line X1-X2 in FIG. 6A.

The interlayer film 413 includes the light-blocking layer 414 and the chromatic-color light-transmitting resin layer 417. The light-blocking layer 414 is provided on the first substrate 441 side, which is an element substrate, and formed over the transistor 420 (at least in a region which covers a semiconductor layer of the transistor) with the insulating film 407 and the insulating layer 409 interposed therebetween so as to function as a light-blocking layer for the semiconductor layer. On the other hand, the chromatic-color light-transmitting resin layer 417 is formed so as to overlap with the first electrode layer 447, the second electrode layer 448, and the third electrode layer 446 and functions as a color filter layer. In the liquid crystal display device of FIG. 6B, part of the second electrode layer 448 is formed over the light-blocking layer 414 and the liquid crystal layer 444 is provided thereover.

Since the light-blocking layer 414 is used as the interlayer film, it is preferable that a black organic resin be used for the light-blocking layer 414. For example, a black resin of a pigment material, carbon black, titanium black, or the like may be mixed into a resin material such as photosensitive or non-photosensitive polyimide. As a method for forming the light-blocking layer 414, a wet method such as spin coating, dip coating, spray coating, or a droplet discharging method (such as an ink jetting method, screen printing, or offset printing) may be used in accordance with the material. As needed, an etching method (dry etching or wet etching) may be employed to form a desired pattern.

When the light-blocking layer 414 is provided in this manner, the light-blocking layer 414 can block light incident on the semiconductor layer 403 of the transistor 420 without reduction in an aperture ratio of a pixel; accordingly, electric characteristics of the transistor 420 can be prevented from being varied and can be stabilized. Further, the light-blocking layer 414 can prevent light leakage to an adjacent pixel, which enables higher contrast and higher definition display. Therefore, high definition and high reliability of the liquid crystal display device can be achieved.

Further, the chromatic-color light-transmitting resin layer 417 can function as a color filter layer. In the case of providing the color filter layer on the counter substrate side, precise positional alignment of a pixel region with an element substrate over which the transistor is formed is difficult, and thus there is a possibility that image quality is degraded. Here, since the chromatic-color light-transmitting resin layer 417 included in the interlayer film is formed directly on the element substrate side as a color filter layer, the formation region can be controlled more precisely and this structure is adjustable to a pixel with a minute pattern. In addition, one insulating layer functions as both the interlayer film and the color filter layer, whereby the process can be simplified and a liquid crystal display device can be manufactured at lower cost.

The first electrode layer 447 is provided so as to cover a top surface and a side surface of the first structure body 449 and the second electrode layer 448 is provided so as to cover a top surface and a side surface of the second structure body 445, whereby the formation area of the first electrode layer 447 and the second electrode layer 448 can be increased in a thickness direction (three-dimensionally) of the liquid crystal layer 444. Accordingly, when voltage is applied between the first electrode layer 447 and the second electrode layer 448, an electric field can be widely formed between the first electrode layer 447 and the second electrode layer 448.

In addition, when the third electrode layer 446 is provided on the second substrate 442 side as a second common electrode layer, an electric field can be applied to liquid crystal in an oblique direction (in a direction oblique to the substrate) between the first electrode layer 447 which is a pixel electrode layer and the third electrode layer 446; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance (light transmittance in black display) can also be increased.

In addition, since high white transmittance can be obtained with lower voltage, reduction in power consumption of the liquid crystal display device can also be achieved.

This embodiment can be combined with any of the structures described in the other embodiments as appropriate.

Embodiment 7

Another example of a transistor which can be applied to the liquid crystal display devices in Embodiments 1 to 6 will be described. Note that components in common with those in Embodiments 1 to 6 can be formed using a similar material and manufacturing method, and detailed description of the same portions and portions having similar functions will be omitted.

Figure 10A:
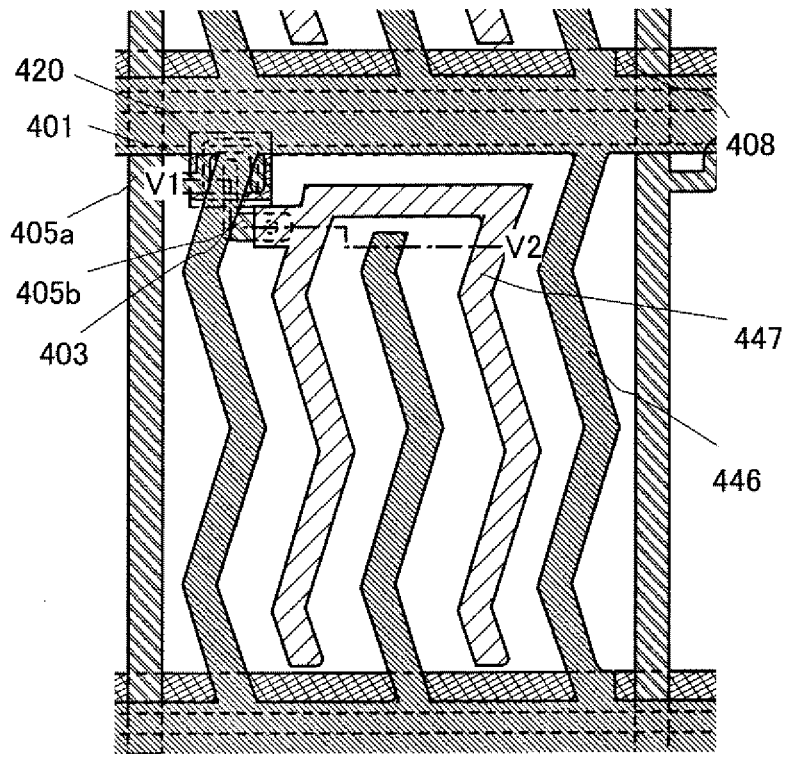
FIGS. 10A and 10B illustrate a liquid crystal display device.
Figure 10B:
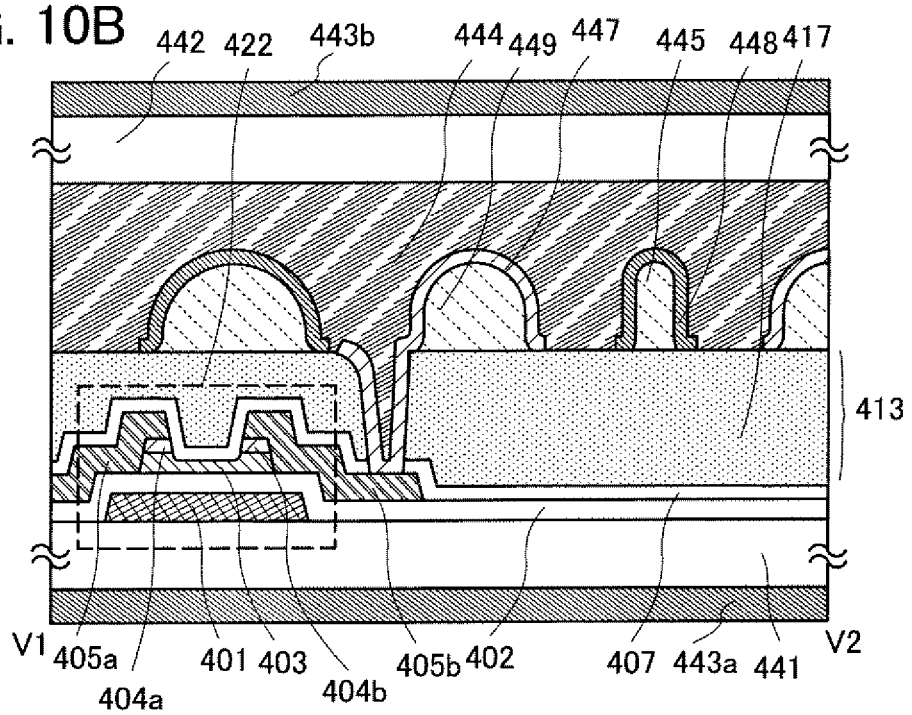

FIG. 10A is a plan view of a liquid crystal display device and illustrates one pixel. FIG. 10B is a cross-sectional view taken along line V1-V2 in FIG. 10A.

In the plan view of FIG. 10A, in a manner similar to that of Embodiment 2, a plurality of source wiring layers (including the wiring layer 405a) is provided in parallel to each other (extended in a vertical direction in the drawing) and apart from each other. A plurality of gate wiring layers (including the gate electrode layer 401) is extended in a direction generally perpendicular to the source wiring layers (a horizontal direction in the drawing) and provided apart from each other. The capacitor wiring layers 408 are adjacent to the plurality of gate wiring layers and extended in a direction generally parallel to the gate wiring layers, that is, a direction generally perpendicular to the source wiring layers (the horizontal direction in the drawing). A space with a generally rectangular shape, which is surrounded by the source wiring layers, the capacitor wiring layers 408, and the gate wiring layers, is provided with a pixel electrode layer and a common electrode layer of the liquid crystal display device. A transistor 422 for driving the pixel electrode layer is provided at an upper left corner of the drawing. A plurality of pixel electrode layers and a plurality of transistors are arranged in matrix.

The second substrate 442 and the first substrate 441 which is provided with the transistor 422, the interlayer film 413 that is a chromatic-color light-transmitting resin layer, the first structure body 449, the first electrode layer 447, the second structure body 445, and the second electrode layer 448 are firmly attached to each other with the liquid crystal layer 444 interposed therebetween.

FIGS. 10A and 10B illustrate an example of a structure in which a source region (also referred to as a semiconductor layer having one conductivity type or a buffer layer) is provided between the semiconductor layer 403 and a source electrode layer and a drain region (also referred to as a semiconductor layer having one conductivity type or a buffer layer) is provided between the semiconductor layer 403 and a drain electrode layer. For example, for the source region and the drain region, a semiconductor layer having n-type conductivity is used.

Further, when a semiconductor layer is used for source and drain regions 404a and 404b of the transistor 422, the semiconductor layer is preferably thinner than the semiconductor layer 403 used as a channel formation region and preferably has higher conductivity (electric conductivity) than the semiconductor layer 403.

The first electrode layer 447 is provided so as to cover a top surface and a side surface of the first structure body 449 and the second electrode layer 448 is provided so as to cover a top surface and a side surface of the second structure body 445, whereby the formation area of the first electrode layer 447 and the second electrode layer 448 can be increased in a thickness direction (three-dimensionally) of the liquid crystal layer 444. Accordingly, when voltage is applied between the first electrode layer 447 and the second electrode layer 448, an electric field can be widely formed between the first electrode layer 447 and the second electrode layer 448.

Therefore, liquid crystal molecules in the entire liquid crystal layer in a thickness direction can be made to respond and white transmittance can be improved. Accordingly, the contrast ratio which is a ratio of white transmittance to black transmittance can also be increased.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

This embodiment can be combined with any of the structures described in the other embodiments as appropriate.

Embodiment 8

Another example of a transistor which can be applied to the liquid crystal display devices in Embodiments 1 to 6 will be described with reference to FIGS. 9A and 9B.

Figure 9A:
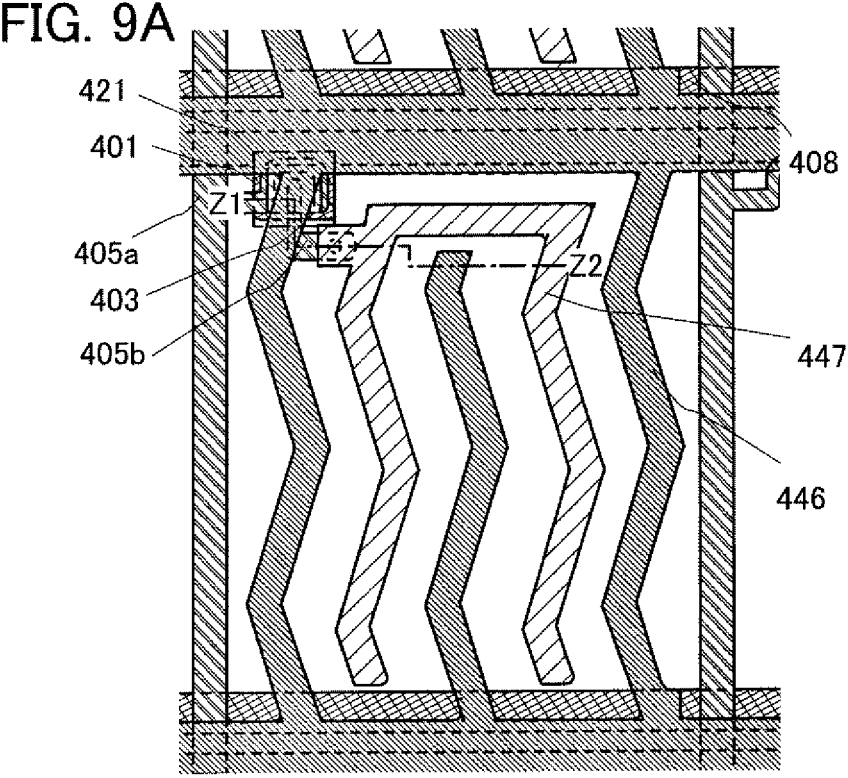
FIGS. 9A and 9B illustrate a liquid crystal display device.
Figure 9B:
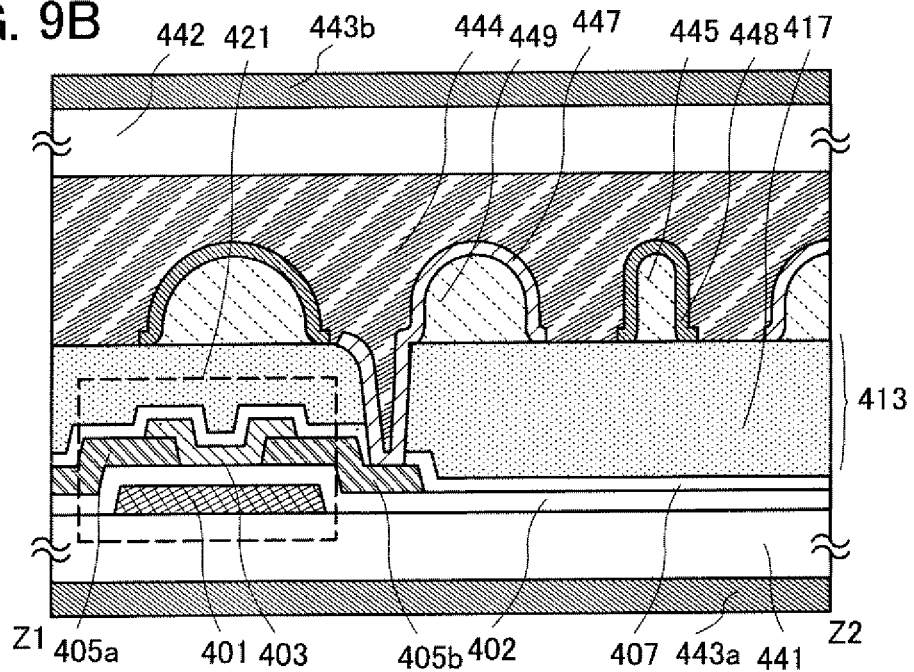

FIG. 9A is a plan view of a liquid crystal display device and illustrates one pixel. FIG. 9B is a cross-sectional view taken along line Z1-Z2 in FIG. 9A.

In the plan view of FIG. 9A, in a manner similar to that of Embodiment 2, a plurality of source wiring layers (including the wiring layer 405a) is provided in parallel to each other (extended in a vertical direction in the drawing) and apart from each other. A plurality of gate wiring layers (including the gate electrode layer 401) is extended in a direction generally perpendicular to the source wiring layers (a horizontal direction in the drawing) and provided apart from each other. The capacitor wiring layers 408 are adjacent to the plurality of gate wiring layers and extended in a direction generally parallel to the gate wiring layers, that is, a direction generally perpendicular to the source wiring layers (the horizontal direction in the drawing). A space with a generally rectangular shape, which is surrounded by the source wiring layers, the capacitor wiring layers 408, and the gate wiring layers, is provided with a pixel electrode layer and a common electrode layer of the liquid crystal display device. A transistor 421 for driving the pixel electrode layer is provided at an upper left corner of the drawing. A plurality of pixel electrode layers and a plurality of transistors are arranged in matrix.

The second substrate 442 and the first substrate 441 which is provided with the transistor 421, the interlayer film 413 that is a chromatic-color light-transmitting resin layer, the first structure body 449, the first electrode layer 447, the second structure body 445, and the second electrode layer 448 are firmly attached to each other with the liquid crystal layer 444 interposed therebetween.

The transistor 421 is a bottom-gate thin film transistor and includes, over the first substrate 441 which is a substrate having an insulating surface, the gate electrode layer 401, the gate insulating layer 402, the wiring layers 405a and 405b which function as a source electrode layer and a drain electrode layer, and the semiconductor layer 403. In addition, the insulating film 407 which covers the transistor 421 and is in contact with the semiconductor layer 403 is provided.

Note that buffer layers may be provided between the semiconductor layer 403 and the wiring layers 405a and 405b as in Embodiment 7. Alternatively, buffer layers may be provided both between the gate insulating layer and the wiring layer and between the wiring layer and the semiconductor layer.

The gate insulating layer 402 exists in the entire region including the transistor 421, and the gate electrode layer 401 is provided between the gate insulating layer 402 and the first substrate 441 which is a substrate having an insulating surface. The wiring layers 405a and 405b are provided over the gate insulating layer 402. In addition, the semiconductor layer 403 is provided over the gate insulating layer 402 and the wiring layers 405a and 405b. Note that the wiring layers 405a and 405b over the gate insulating layer 402 extend beyond the perimeter of the semiconductor layer 403 to the outside.

The first electrode layer 447 is provided so as to cover a top surface and a side surface of the first structure body 449 and the second electrode layer 448 is provided so as to cover a top surface and a side surface of the second structure body 445, whereby the formation area of the first electrode layer 447 and the second electrode layer 448 can be increased in a thickness direction (three-dimensionally) of the liquid crystal layer 444. Accordingly, when voltage is applied between the first electrode layer 447 and the second electrode layer 448, an electric field can be widely formed between the first electrode layer 447 and the second electrode layer 448.

Therefore, liquid crystal molecules in the entire liquid crystal layer in a thickness direction can be made to respond and white transmittance can be improved. Accordingly, the contrast ratio which is a ratio of white transmittance to black transmittance can also be increased.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

This embodiment can be combined with any of the structures described in the other embodiments as appropriate.

Embodiment 9

An oxide semiconductor will be described as a material which can be used for the semiconductor layers of the transistors 420, 421, and 422 in Embodiments 3 to 8. Specifically, transistors 1420 and 1450 in which an oxide semiconductor layer is used as a semiconductor layer will be described.

Figure 11A:
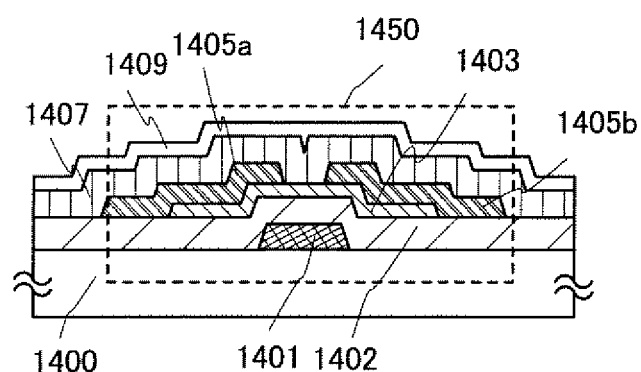
FIGS. 11A and 11B illustrate transistors which can be applied to a liquid crystal display device.

The transistor 1450 illustrated in FIG. 11A is a bottom-gate thin film transistor and includes, over a substrate 1400 having an insulating surface, a gate electrode layer 1401, a gate insulating layer 1402, an oxide semiconductor layer 1403, a source electrode layer 1405a, and a drain electrode layer 1405b. Further, an oxide insulating layer 1407 which covers the transistor 1450 and is stacked over the oxide semiconductor layer 1403 is provided. A protective insulating layer 1409 formed using a nitride insulating layer is further provided over the oxide insulating layer 1407.

In order to prevent variation in electric characteristics of the transistor including an oxide semiconductor layer, an impurity such as hydrogen, moisture, a hydroxyl group, or hydride (also referred to as a hydrogen compound) which causes the variation is intentionally removed from the oxide semiconductor layer. Additionally, the oxide semiconductor layer is purified to become electrically i-type (intrinsic) by supplying oxygen which is one of a main component of an oxide semiconductor and is simultaneously reduced in a step of removing an impurity.

Therefore, it is preferable that the oxide semiconductor includes hydrogen as little as possible. Hydrogen included in the oxide semiconductor is preferably set less than $1 \times 10^{16}/\text{cm}^3$, and hydrogen included in the oxide semiconductor is removed as much as possible to be close to zero.

In addition, a purified oxide semiconductor includes extremely few carriers (close to zero), and the carrier concentration thereof is lower than $1 \times 10^{14}/\text{cm}^3$, preferably lower than $1 \times 10^{12}/\text{cm}^3$, more preferably $1 \times 10^{11}/\text{cm}^3$. Since the oxide semiconductor includes extremely few carriers, off state current of a transistor can be reduced. It is preferable that off-state current be as small as possible. Off state current (also referred to as leakage current) is current that flows between a source and a drain of a transistor in the case where given gate voltage between −1 V to −10 V is applied. A current value per 1 μm in a channel width (w) of a transistor including an oxide semiconductor, which is disclosed in this specification, is less than or equal to 100 aA/μm, preferably less than or equal to 10 aA/μm, more preferably less than or equal to 1 aA/μm. Further, since there is no pn junction and no hot carrier degradation, electric characteristics of the transistor is not adversely affected.

The above concentration range of hydrogen can be obtained by secondary ion mass spectrometry (SIMS) or on the basis of data of SIMS. In addition, the carrier concentration can be measured by Hall effect measurement. As an example of equipment used for Hall effect measurement, the specific resistance/hole measuring system ResiTest 8310 (manufactured by TOYO Corporation) can be given. With the specific resistance/Hall measuring system ResiTest 8310, the direction and strength of a magnetic field are changed in a certain cycle and in synchronization therewith, only Hall electromotive voltage caused in a sample is detected, so that AC (alternate current) Hall measurement can be performed. Even in the case of a material with low mobility and high resistivity, Hall electromotive voltage can be detected.

Further, impurities such as moisture existing not only in the oxide semiconductor film but also in the gate insulating layer are reduced, and impurities such as moisture existing at interfaces between the oxide semiconductor film and films which are provided over and under the oxide semiconductor film and are in contact therewith are also reduced.

When the oxide semiconductor is purified so that impurities except a main component of the oxide semiconductor are included as little as possible, the operation of the transistor can be favorable.

As the oxide semiconductor film, a four-component metal oxide such as an In—Sn—Ga—Zn—O film, a three-component metal oxide such as an In—Ga—Zn—O film, an In—Sn—Zn—O film, an In—Al—Zn—O film, a Sn—Ga—Zn—O film, an Al—Ga—Zn—O film, or a Sn—Al—Zn—O film, a two-component metal oxide such as an In—Zn—O film, a Sn—Zn—O film, an Al—Zn—O film, a Zn—Mg—O film, a Sn—Mg—O film, or an In—Mg—O film, an In—O film, a Sn—O film, a Zn—O film, or the like can be used. Further, $SiO_2$ may be included in the above oxide semiconductor film.

Note that as the oxide semiconductor film, a thin film expressed by $InMO_3(ZnO)_m$ (m>0) can be used. Here, M represents one or more metal elements selected from Ga, Al, Mn, and Co. For example, M may be Ga, Ga and Al, Ga and Mn, Ga and Co, or the like. An oxide semiconductor film whose composition formula is expressed by $InMO_3(ZnO)_m$ (m>0), which includes Ga as M, is referred to as the In—Ga—Zn—O oxide semiconductor described above, and a thin film of the In—Ga—Zn—O oxide semiconductor is also referred to as an In—Ga—Zn—O non-single-crystal film.

Although the transistor 1450 is example of an inverted staggered thin film transistor having a bottom-gate structure, the transistor including an oxide semiconductor layer which can be applied to the liquid crystal display device disclosed in this specification may be a channel protective transistor in which a channel protective layer is provided over an oxide semiconductor layer or a transistor having a top-gate structure.

Although description is given using a single-gate transistor as the transistor 1450, a multi-gate transistor including a plurality of channel formation regions may be formed as needed.

Figure 11B:
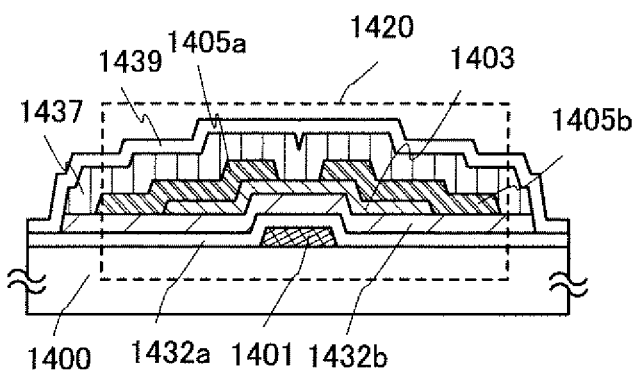

FIG. 11B illustrates an example in which an oxide semiconductor layer is surrounded by a nitride insulating layer when seen in a cross section thereof.

The transistor 1420 illustrated in FIG. 11B is a bottom gate thin film transistor, and includes, over the substrate 1400 having an insulating surface, the gate electrode layer 1401, a gate insulating layer 1432a which is formed using a nitride insulating layer, a gate insulating layer 1432b which is formed using an oxide insulating layer, the oxide semiconductor layer 1403, the source electrode layer 1405a, and the drain electrode layer 1405b. Further, an oxide insulating layer 1437 which covers the transistor 1420 and is stacked over the oxide semiconductor layer 1403 is provided. A protective insulating layer 1439 which is formed using a nitride insulating layer is provided over the oxide insulating layer 1437. The protective insulating layer 1439 is in contact with the gate insulating layer 1432a which is formed using a nitride insulating layer.

In the transistor 1420 in this embodiment, the gate insulating layer has a stacked-layer structure in which the nitride insulating layer and the oxide insulating layer are stacked in this order over the gate electrode layer. Further, before the protective insulating layer 1439 which is formed using a nitride insulating layer is formed, the oxide insulating layer 1437 and the gate insulating layer 1432b are selectively removed so that the gate insulating layer 1432a which is formed using a nitride insulating layer is exposed.

At least the top surface shapes of the oxide insulating layer 1437 and the gate insulating layer 1432b are larger than the top surface shape of the oxide semiconductor layer 1403, and the top surfaces of the oxide insulating layer 1437 and the gate insulating layer 1432b preferably covers the transistor 1420.

Further, the protective insulating layer 1439 which is formed using a nitride insulating layer is formed to cover the top surface of the oxide insulating layer 1437 and the side surfaces of the oxide insulating layer 1437 and the gate insulating layer 1432b, and to be in contact with the gate insulating layer 1432a which is formed using a nitride insulating layer.

For the protective insulating layer 1439 and the gate insulating layer 1432a which are each formed using a nitride insulating layer, an inorganic insulating film which does not include impurities such as moisture, a hydrogen ion, and OH⁻ and blocks entry of these from the outside is used; a silicon nitride film, a silicon oxynitride film, an aluminum nitride film, an aluminum oxynitride film, or the like obtained by a sputtering method or a plasma CVD method is used.

In this embodiment, as the protective insulating layer 1439 which is formed using a nitride insulating layer, a silicon nitride layer having a thickness of 100 nm is provided by an RF sputtering method so as to cover the bottom surface, the top surface, and the side surface of the oxide semiconductor layer 1403.

With the structure illustrated in FIG. 11B, an impurity such as hydrogen, moisture, a hydroxyl group, or hydride in the oxide semiconductor layer is reduced owing to the gate insulating layer 1432b and the oxide insulating layer 1437 which are provided to surround and be in contact with the oxide semiconductor layer, and entry of moisture from the outside in a manufacturing process after formation of the protective insulating layer 1439 can be prevented because the oxide semiconductor layer is further surrounded by the gate insulating layer 1432a and the protective insulating layer 1439 which are each formed using a nitride insulating layer. Further, even after a device is completed as a liquid crystal display device, entry of moisture from the outside can be prevented in the long term; therefore, long-term reliability of the device can be improved.

In this embodiment, one transistor is surrounded by a nitride insulating layer; however, an embodiment of the present invention is not limited to this structure. Alternatively, a plurality of transistors may be surrounded by a nitride insulating layer, or a plurality of transistors in a pixel portion may be collectively surrounded by a nitride insulating layer. A region where the protective insulating layer 1439 and the gate insulating layer 1432a are in contact with each other may be formed so as to surround at least the pixel portion of the active matrix substrate.

A subsequent process may be performed in the following manner as in Embodiment 3: a pixel electrode layer connected to the transistor 1420 or the transistor 1450 is formed so as to cover a surface of a first structure body which projects into a liquid crystal layer over an insulating surface (insulating layer), a common electrode layer is formed so as to cover a surface of a second structure body which is provided over the same insulating surface (insulating layer) to project into the liquid crystal layer, and a first substrate and a second substrate are firmly attached to each other with the liquid crystal layer interposed therebetween.

With the pixel electrode layer which is provided so as to cover a top surface and a side surface of the first structure body and the common electrode layer which is provided so as to cover a top surface and a side surface of the second structure body, an electric field can be widely formed between the pixel electrode layer and the common electrode layer in the liquid crystal layer.

In addition, when a second common electrode layer is provided on the second substrate side as in Embodiment 2, an electric field can be applied to liquid crystal in an oblique direction (in a direction oblique to the substrate) between the pixel electrode layer and the second common electrode layer; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance can also be increased.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

When a blue-phase liquid crystal material is used, rubbing treatment on an alignment film is unnecessary; accordingly, electrostatic discharge damage caused by the rubbing treatment can be prevented and defects and damage of the liquid crystal display device in the manufacturing process can be reduced. Thus, productivity of the liquid crystal display device can be increased. A transistor that includes an oxide semiconductor layer particularly has a possibility that electric characteristics of the transistor may fluctuate significantly by the influence of static electricity and deviate from the designed range.

The response speed of a blue-phase liquid crystal material is greater than or equal to ten times as high as that of a conventional liquid crystal material; therefore, by combining the blue-phase liquid crystal material with a device capable of double-frame rate (high-speed) driving, such as a transistor including an oxide semiconductor layer, a liquid crystal display device having a higher function and higher response speed can be realized.

Since the off-state current of a transistor including an oxide semiconductor layer is extremely small, a storage capacitor may be extremely small or the storage capacitor is not necessarily provided; thus, the aperture ratio can be increased. In addition, even when capacitance is increased owing to use of a blue-phase liquid crystal material, the storage capacitance can be reduced and thus power consumption can be suppressed.

Accordingly, it is more effective to use a blue-phase liquid crystal material for a liquid crystal display device including a transistor that includes an oxide semiconductor layer as in this embodiment.

This embodiment can be combined with any of the structures described in the other embodiments as appropriate.

Embodiment 10

In this embodiment, an example of the transistor including an oxide semiconductor layer, which is described in Embodiment 9, and an example of a manufacturing method thereof will be described in detail with reference to FIGS. 25A to 25E. A transistor 390 described in this embodiment can be used as the transistors 1420 and 1450 which include an oxide semiconductor layer including a channel formation region in the above embodiment. The same portions as or portions having functions similar to those of the above embodiment can be formed in a manner similar to that of the above embodiment, and also steps similar to those of the above embodiment can be performed in a manner similar to that of the above embodiment; therefore, repetitive description will be omitted. In addition, detailed description of the same portions will be omitted.

FIGS. 25A to 25E illustrate an example of a cross-sectional structure of a transistor. The transistor 390 illustrated in FIGS. 25A to 25E is one of bottom-gate transistors and is also referred to as an inverted staggered thin film transistor.

Although description is given using a single-gate transistor as the transistor 390, a multi-gate transistor including a plurality of channel formation regions may be formed as needed.

A process of manufacturing the transistor 390 over a substrate 394 is described below with reference to FIGS. 25A to 25E.

First, a conductive film is formed over the substrate 394 having an insulating surface, and then a gate electrode layer 391 is formed in a first photolithography process. The gate electrode layer preferably has a tapered shape because coverage with a gate insulating layer stacked thereover can be improved. Note that a resist mask may be formed by an ink jetting method. When the resist mask is formed by an ink jetting method, a photomask is not used; therefore, manufacturing cost can be reduced.

There is no particular limitation on a substrate that can be used as the substrate 394 having an insulating surface as long as it has at least heat resistance enough to withstand heat treatment performed later. A glass substrate formed using barium borosilicate glass, aluminoborosilicate glass, or the like can be used.

When the temperature of the heat treatment performed later is high, a substrate having a strain point of 730° C. or higher is preferably used as the glass substrate. As a material of the glass substrate, a glass material such as aluminosilicate glass, aluminoborosilicate glass, or barium borosilicate glass is used, for example. A glass substrate including a larger amount of BaO than $B_2O_3$ is preferably used because a practical heat-resistant glass substrate is obtained.

Note that, instead of the glass substrate described above, a substrate fanned using an insulator such as a ceramic substrate, a quartz substrate, or a sapphire substrate may be used. Alternatively, a crystallized glass substrate or the like can be used. Still alternatively, a plastic substrate or the like can be used as appropriate.

An insulating film serving as a base film may be provided between the substrate 394 and the gate electrode layer 391. The base film has a function of preventing diffusion of an impurity element from the substrate 394, and can be formed to have a single-layer structure or a stacked-layer structure using any of a silicon nitride film, a silicon oxide film, a silicon nitride oxide film, and a silicon oxynitride film.

Further, the gate electrode layer 391 can be formed to have a single-layer structure or a stacked-layer structure using any of metal materials such as molybdenum, titanium, chromium, tantalum, tungsten, aluminum, copper, neodymium, and scandium, and an alloy material including any of these as a main component.

As a two-layer structure of the gate electrode layer 391, for example, a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, a two-layer structure in which a titanium nitride layer and a molybdenum layer are stacked, or a two-layer structure in which a tungsten nitride layer and a tungsten layer are stacked is preferable. As a three-layer structure, a stack of a tungsten layer or a tungsten nitride layer, an alloy layer of aluminum and silicon or an alloy layer of aluminum and titanium, and a titanium nitride layer or a titanium layer is preferable. Note that the gate electrode layer may be formed using a light-transmitting conductive film. A light-transmitting conductive oxide can be given as an example of the light-transmitting conductive film.

Then, a gate insulating layer 397 is formed over the gate electrode layer 391.

The gate insulating layer 397 can be formed to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. In the case where a silicon oxide film is formed by a sputtering method, a silicon target or a quartz target is used as a target and oxygen or a mixed gas of oxygen and argon is used as a sputtering gas.

Here, an oxide semiconductor (a purified oxide semiconductor) which is made to be i-type or substantially i-type by removal of an impurity is extremely sensitive to an interface level and interface electric charge; thus, an interface between the oxide semiconductor and a gate insulating layer is important. Therefore, the gate insulating layer (GI) that is in contact with the purified oxide semiconductor needs to have high quality.

For example, high-density plasma CVD using microwaves (2.45 GHz) is preferably employed because formation of a dense and high-quality insulating layer having high withstand voltage is possible. When a purified oxide semiconductor and a high-quality gate insulating layer are in close contact with each other, the interface level can be reduced and interface characteristics can be favorable.

Needless to say, another deposition method such as a sputtering method or a plasma CVD method can be employed as long as a high-quality insulating layer as a gate insulating layer can be formed. Moreover, it is possible to use, as the gate insulating layer, an insulating layer whose quality and characteristics of an interface with an oxide semiconductor are improved by heat treatment performed after the formation of the insulating layer. In any case, the gate insulating layer may be an insulating layer that can reduce interface level density with an oxide semiconductor to form a favorable interface, as well as having favorable film quality as the gate insulating layer.

In a gate bias-temperature stress test (BT test) at 85° C. with $2 \times 10^6$ V/cm for 12 hours, if an impurity is added to an oxide semiconductor, a bond between the impurity and a main component of the oxide semiconductor is broken by a high electric field (B: bias) and high temperature (T: temperature), and a dangling bond generated causes a drift of the threshold voltage (Vth).

In contrast, according to an embodiment of the invention disclosed in this specification, impurities of an oxide semiconductor, particularly hydrogen and water, are removed as much as possible and interface characteristics between the oxide semiconductor and the gate insulating layer are made favorable as described above, whereby a transistor that is stable through the BT test can be obtained.

The gate insulating layer 397 may have a structure in which a nitride insulating layer and an oxide insulating layer are stacked in this order over the gate electrode layer 391. For example, a silicon nitride layer ($SiN_y$ (y>0)) with a thickness of greater than or equal to 50 nm and less than or equal to 200 nm is formed by a sputtering method as a first gate insulating layer and a silicon oxide layer ($SiO_x$ (x>0)) with a thickness of greater than or equal to 5 nm and less than or equal to 300 nm is stacked as a second gate insulating layer over the first gate insulating layer; thus, a gate insulating layer is formed. The thickness of the gate insulating layer may be set as appropriate depending on characteristics needed for a transistor and may be approximately 100 nm, or approximately 350 nm to 400 nm.

Further, in order that hydrogen, a hydroxyl group, and moisture might be included in the gate insulating layer 397 and an oxide semiconductor film 393 as little as possible, it is preferable that the substrate 394 over which the gate electrode layer 391 is formed or the substrate 394 over which layers up to the gate insulating layer 397 are formed be preheated in a preheating chamber of a sputtering apparatus as pretreatment for film formation so that impurities such as hydrogen and moisture adsorbed to the substrate 394 is eliminated. The temperature for the preheating is higher than or equal to 100° C. and lower than or equal to 400° C., preferably higher than or equal to 150° C. and lower than or equal to 300° C. Note that a cryopump is preferable as an evacuation unit provided in the preheating chamber. Note that this preheating treatment may be omitted. Further, this preheating may be similarly performed on the substrate 394 over which layers up to a source electrode layer 395a and a drain electrode layer 395b are formed, before formation of an oxide insulating layer 396.

Figure 25A:
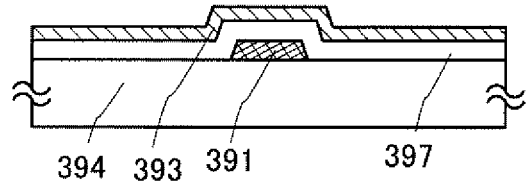
FIGS. 25A to 25E illustrate a transistor which can be applied to a liquid crystal display device and a method for manufacturing the transistor.

Then, the oxide semiconductor film 393 is formed to a thickness of greater than or equal to 2 nm and less than or equal to 200 nm over the gate insulating layer 397 (see FIG. 25A).

Note that before the oxide semiconductor film 393 is formed by a sputtering method, dust attached to a surface of the gate insulating layer 397 is preferably removed by reverse sputtering in which an argon gas is introduced and plasma is generated. The reverse sputtering refers to a method in which, without application of voltage to a target side, an RF power source is used for application of voltage to the substrate side in an argon atmosphere so that plasma is generated in the vicinity of the substrate to modify a surface of the substrate. Note that instead of an argon atmosphere, a nitrogen atmosphere, a helium atmosphere, an oxygen atmosphere, or the like may be used.

The oxide semiconductor film 393 is formed by a sputtering method. As the oxide semiconductor film 393, a four-component metal oxide such as an In—Sn—Ga—Zn—O film, a three-component metal oxide such as an In—Ga—Zn—O film, an In—Sn—Zn—O film, an In—Al—Zn—O film, a Sn—Ga—Zn—O film, an Al—Ga—Zn—O film, or a Sn—Al—Zn—O film, a two-component metal oxide such as an In—Zn—O film, a Sn—Zn—O film, an Al—Zn—O film, a Zn—Mg—O film, a Sn—Mg—O film, or an In—Mg—O film, an In—O film, a Sn—O film, a Zn—O film, or the like can be used. Further, $SiO_2$ may be included in the above oxide semiconductor film. In this embodiment, the oxide semiconductor film 393 is formed by a sputtering method with the use of an In—Ga—Zn—O-based oxide semiconductor target. Further, the oxide semiconductor film 393 can be formed by a sputtering method in a rare gas (typically argon) atmosphere, an oxygen atmosphere, or an atmosphere including a rare gas (typically argon) and oxygen.

As a target for forming the oxide semiconductor film 393 by a sputtering method, a metal oxide target including zinc oxide as a main component can be used. As another example of a metal oxide target, an oxide semiconductor target including In, Ga, and Zn (in a composition ratio, $In_2O_3$:$Ga_2O_3$:ZnO=1:1:1 [mol %], In:Ga:Zn=1:1:0.5 [atomic %]) can be used. Alternatively, an oxide semiconductor target including In, Ga, and Zn (the composition ratio of In:Ga:Zn=1:1:1 or 1:1:2 [atomic %]) may be used. The fill rate of the oxide semiconductor target is higher than or equal to 90% and lower than or equal to 100%, preferably higher than or equal to 95% and lower than or equal to 99.9%. With the use of the oxide semiconductor target with high fill rate, a dense oxide semiconductor film is formed.

The substrate is held in a treatment chamber kept under reduced pressure, and the substrate is heated to room temperature or a temperature of lower than 400° C. Then, a sputtering gas from which hydrogen and moisture are removed is introduced into the treatment chamber while moisture remaining in the treatment chamber is removed, and the oxide semiconductor film 393 is formed over the substrate 394 with the use of a metal oxide as a target. In order to remove moisture remaining in the treatment chamber, an entrapment vacuum pump is preferably used. For example, a cryopump, an ion pump, or a titanium sublimation pump is preferably used. Further, an evacuation unit may be a turbo pump provided with a cold trap. In the deposition chamber which is evacuated with the cryopump, a hydrogen atom, a compound including a hydrogen atom, such as water ($H_2O$), (more preferably, also a compound including a carbon atom), and the like are removed, whereby the concentration of an impurity in the oxide semiconductor film formed in the deposition chamber can be reduced.

An example of the deposition condition is as follows: the distance between the substrate and the target is 100 mm, the pressure is 0.6 Pa, the DC power is 0.5 kW, and the atmosphere is an oxygen atmosphere (the oxygen flow rate is 100%). It is preferable that a pulsed DC power source be used because dust can be reduced and the film thickness can be uniform. The oxide semiconductor film preferably has a thickness of greater than or equal to 5 nm and less than or equal to 30 nm. Note that the appropriate thickness depends on an oxide semiconductor material to be used and the thickness may be set in accordance with the material.

Examples of a sputtering method include an RF sputtering method in which a high-frequency power source is used as a sputtering power source, a DC sputtering method, and a pulsed DC sputtering method in which a bias is applied in a pulsed manner. An RF sputtering method is mainly used in the case where a film is formed by using an insulating target, and a DC sputtering method is mainly used in the case where a film is formed by using a conductive target such as a metal target.

In addition, there is also a multi-source sputtering apparatus in which a plurality of targets of different materials can be set. With the multi-source sputtering apparatus, films of different materials can be formed to be stacked in the same chamber, or plural kinds of materials can be discharged for film formation at the same time in the same chamber.

In addition, there are a sputtering apparatus provided with a magnet system inside the chamber, which is for a magnetron sputtering method, and a sputtering apparatus which is used for an ECR sputtering method in which plasma generated with the use of microwaves is used without using glow discharge.

Furthermore, as a deposition method using a sputtering method, there are also a reactive sputtering method in which a target substance and a sputtering gas component are chemically reacted with each other during deposition to form a thin compound film thereof, and a bias sputtering method in which voltage is also applied to a substrate during deposition.

Figure 25B:
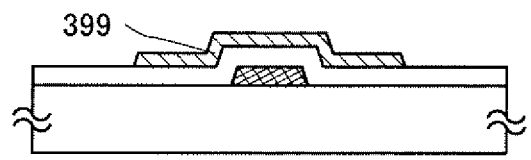
Figure 25C:
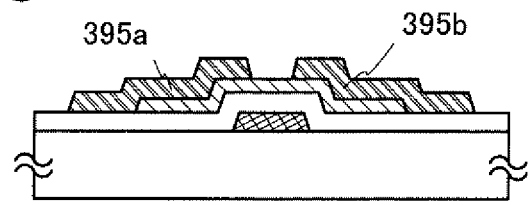

Then, in a second photolithography process, the oxide semiconductor film is processed into an island-shaped oxide semiconductor layer 399 (see FIG. 25B). A resist mask for forming the island-shaped oxide semiconductor layer 399 may be formed by an ink jetting method. When the resist mask is formed by an ink jetting method, a photomask is not used; therefore, manufacturing cost can be reduced.

At the time of forming the oxide semiconductor layer 399, a contact hole can be formed in the gate insulating layer 397.

Note that the etching of the oxide semiconductor film 393 may be dry etching, wet etching, or both of them.

As an etching gas for dry etching, a gas including chlorine (a chlorine-based gas such as chlorine ($Cl_2$), boron chloride ($BCl_3$), silicon chloride ($SiCl_4$), or carbon tetrachloride ($CCl_4$)) is preferably used.

Alternatively, a gas including fluorine (a fluorine-based gas such as carbon tetrafluoride ($CF_4$), sulfur hexafluoride ($SF_6$), nitrogen trifluoride ($NF_3$), or trifluoromethane ($CHF_3$));

hydrogen bromide (HBr); oxygen ($O_2$); any of these gases to which a rare gas such as helium (He) or argon (Ar) is added; or the like can be used.

As the dry etching method, a parallel plate reactive ion etching (RIE) method or an inductively coupled plasma (ICP) etching method can be used. In order to etch the film into a desired shape, the etching conditions (such as the amount of electric power applied to a coil-shaped electrode, the amount of electric power applied to an electrode on a substrate side, and the temperature of the electrode on the substrate side) are adjusted as appropriate.

As an etchant used for wet etching, a mixed solution of phosphoric acid, acetic acid, and nitric acid, an ammonia peroxide mixture (a hydrogen peroxide solution at 31 wt %: ammonia water at 28 wt %: water=5:2:2), or the like can be used. Alternatively, ITO07N (produced by KANTO CHEMICAL CO., INC.) may be used.

The etchant used in the wet etching is removed by cleaning together with the material which is etched off The waste liquid including the etchant and the material etched off may be purified and the material may be reused. When a material such as indium included in the oxide semiconductor layer is collected from the waste liquid after the etching and reused, the resources can be effectively used and the cost can be reduced.

The etching conditions (such as an etchant, etching time, and temperature) are adjusted as appropriate in accordance with the material so that the film can be etched to have a desired shape.

Note that it is preferable to perform reverse sputtering before formation of a conductive film in the following step so that a resist residue and the like attached to surfaces of the oxide semiconductor layer 399 and the gate insulating layer 397 can be removed.

Next, a conductive film is formed over the gate insulating layer 397 and the oxide semiconductor layer 399. The conductive film may be formed by a sputtering method or a vacuum evaporation method. As a material of the conductive film to be the source electrode layer and the drain electrode layer (including a wiring formed in the same layer as the source electrode layer and the drain electrode layer), there are an element selected from Al, Cr, Cu, Ta, Ti, Mo, and W; an alloy including any of these elements as a component; an alloy including any of these elements in combination; and the like. Alternatively, a structure may be employed in which a high-melting-point metal layer of Cr, Ta, Ti, Mo, W, or the like is stacked over and/or below a metal layer of Al, Cu, or the like. Still alternatively, when an Al material to which an element preventing generation of hillocks and whiskers in an Al film, such as Si, Ti, Ta, W, Mo, Cr, Nd, Sc, or Y, is added is used, heat resistance can be increased.

The conductive film may have a single-layer structure or a stacked-layer structure of two or more layers. For example, a single-layer structure of an aluminum film including silicon, a two-layer structure in which a titanium film is stacked over an aluminum film, a three-layer structure in which a Ti film, an aluminum film, and a Ti film are stacked in this order, and the like can be given.

Alternatively, the conductive film to be the source electrode layer and the drain electrode layer (including a wiring formed in the same layer as the source electrode layer and the drain electrode layer) may be formed using a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—ZnO), or any of the metal oxide materials including silicon or silicon oxide can be used.

A third photolithography process is performed. A resist mask is formed over the conductive film and selective etching is performed, so that the source electrode layer 395a and the drain electrode layer 395b are formed. Then, the resist mask is removed (see FIG. 25C).

Ultraviolet, a KrF laser beam, or an ArF laser beam is used for light exposure for forming the resist mask in the third photolithography process. A channel length L of the transistor to be formed later depends on the width of an interval between a bottom portion of the source electrode layer and a bottom portion of the drain electrode layer which are adjacent to each other over the oxide semiconductor layer 399. Note that when light exposure is performed in the case where the channel length L is shorter than 25 nm, extreme ultraviolet with extremely short wavelengths of several nanometers to several tens of nanometers is used for light exposure for forming the resist mask in the third photolithography process. Light exposure with extreme ultraviolet leads to a high resolution and large depth of focus. Accordingly, the channel length L of the transistor to be formed later can be set to greater than or equal to 10 nm and less than or equal to 1000 nm. Thus, the operation speed of a circuit can be increased, and further, the off state current is significantly small, so that low power consumption can be achieved.

Note that materials and etching conditions are adjusted as appropriate so that the oxide semiconductor layer 399 is not removed when the conductive film is etched.

In this embodiment, a Ti film is used as the conductive film, and an In—Ga—Zn—O-based oxide semiconductor is used for the oxide semiconductor layer 399. As an etchant, an ammonia hydrogen peroxide mixture (a mixed solution of ammonia, water, and a hydrogen peroxide solution) is used.

Note that in the third photolithography process, only part of the oxide semiconductor layer 399 is etched, whereby an oxide semiconductor layer having a groove (a depressed portion) might be formed. The resist mask used for forming the source electrode layer 395a and the drain electrode layer 395b may be formed by an ink jetting method. When the resist mask is formed by an ink jetting method, a photomask is not used; therefore, manufacturing cost can be reduced.

In order to reduce the numbers of photomasks and steps in a photolithography process, an etching step may be performed with the use of a resist mask formed using a multi-tone mask that is a light-exposure mask through which light is transmitted so as to have a plurality of intensities. Since a resist mask formed using a multi-tone mask has a plurality of thicknesses and can be further changed in shape by performing etching, the resist mask can be used in a plurality of etching steps to provide different patterns. Thus, a resist mask corresponding to at least two kinds of different patterns can be formed by using one multi-tone mask. Accordingly, the number of light-exposure masks can be reduced and the number of corresponding photolithography processes can also be reduced, whereby simplification of a process can be realized.

By plasma treatment using a gas such as $N_2O$, $N_2$, or Ar, water or the like adsorbed to a surface of an exposed portion of the oxide semiconductor layer may be removed. Alternatively, plasma treatment may be performed using a mixed gas of oxygen and argon.

Figure 25D:
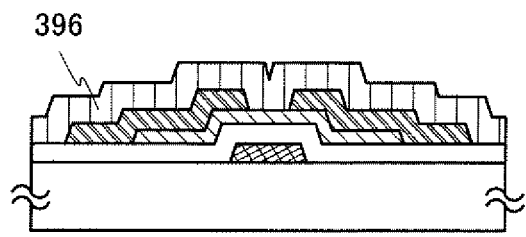

In the case of performing the plasma treatment, the oxide insulating layer 396 is formed without exposure to air as an oxide insulating layer which serves as a protective insulating film and is in contact with part of the oxide semiconductor layer (see FIG. 25D). In this embodiment, the oxide insulating layer 396 is formed in contact with the oxide semiconductor layer 399 in a region where the oxide semiconductor layer 399 does not overlap with the source electrode layer 395a and the drain electrode layer 395b.

In this embodiment, the substrate 394 over which layers up to the island-shaped oxide semiconductor layer 399, the source electrode layer 395a, and the drain electrode layer 395b are formed is heated to room temperature or a temperature of lower than 100° C. and a sputtering gas from which hydrogen and moisture are removed and which includes high-purity oxygen is introduced, and a silicon semiconductor target is used, whereby a silicon oxide layer having a defect is formed as the oxide insulating layer 396.

For example, the silicon oxide film is formed by a pulsed DC sputtering method in which the purity of a sputtering gas is 6N, a boron-doped silicon target (the resistivity is 0.01 Ωcm) is used, the distance between the substrate and the target (T-S distance) is 89 mm, the pressure is 0.4 Pa, the DC power is 6 kW, and the atmosphere is an oxygen atmosphere (the oxygen flow rate is 100%). The thickness of the silicon oxide film is 300 nm. Note that instead of a silicon target, quartz (preferably synthetic quartz) can be used as a target used when the silicon oxide film is formed. As a sputtering gas, oxygen or a mixed gas of oxygen and argon is used.

In that case, the oxide insulating layer 396 is preferably formed while moisture remaining in the treatment chamber is removed. This is for preventing hydrogen, a hydroxyl group, and moisture from being included in the oxide semiconductor layer 399 and the oxide insulating layer 396.

In order to remove moisture remaining in the treatment chamber, an entrapment vacuum pump is preferably used. For example, a cryopump, an ion pump, or a titanium sublimation pump is preferably used. Further, an evacuation unit may be a turbo pump provided with a cold trap. In the deposition chamber which is evacuated with the cryopump, a hydrogen atom, a compound including a hydrogen atom, such as water ($H_2O$), and the like are removed, whereby the concentration of an impurity in the oxide insulating layer 396 formed in the deposition chamber can be reduced.

Note that as the oxide insulating layer 396, a silicon oxynitride layer, an aluminum oxide layer, an aluminum oxynitride layer, or the like may be used instead of the silicon oxide layer.

Further, heat treatment may be performed at 100° C. to 400° C. while the oxide insulating layer 396 and the oxide semiconductor layer 399 are in contact with each other. Since the oxide insulating layer 396 in this embodiment has a lot of defects, by this heat treatment, an impurity such as hydrogen, moisture, a hydroxyl group, or hydride included in the oxide semiconductor layer 399 can be diffused to the oxide insulating layer 396 so that the impurity in the oxide semiconductor layer 399 can be further reduced.

Figure 25E:
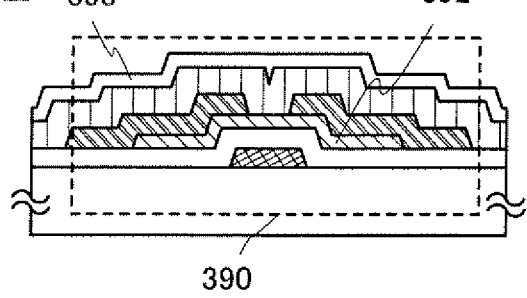

Through the above process, the transistor 390 including an oxide semiconductor layer 392 in which the concentration of hydrogen, moisture, a hydroxyl group, or hydride is reduced can be formed (see FIG. 25E).

Moisture remaining in a reaction atmosphere is removed in the above manner in forming the oxide semiconductor film, whereby the concentration of hydrogen and hydride in the oxide semiconductor film can be reduced. Accordingly, the oxide semiconductor film can be stabilized.

A protective insulating layer may be provided over the oxide insulating layer. In this embodiment, a protective insulating layer 398 is formed over the oxide insulating layer 396. As the protective insulating layer 398, a silicon nitride film, a silicon nitride oxide film, an aluminum nitride film, an aluminum nitride oxide film, or the like is used.

The substrate 394 over which layers up to the oxide insulating layer 396 are formed is heated to a temperature of 100° C. to 400° C., a sputtering gas from which hydrogen and moisture are removed and which includes high-purity nitrogen is introduced, and a silicon semiconductor target is used, whereby a silicon nitride film is formed as the protective insulating layer 398. In this case, the protective insulating layer 398 is preferably formed while moisture remaining in a treatment chamber is removed, similarly to the case of the oxide insulating layer 396.

In the case where the protective insulating layer 398 is formed, the substrate 394 is heated to 100° C. to 400° C. during formation of the protective insulating layer 398, whereby hydrogen or moisture included in the oxide semiconductor layer can be diffused to the oxide insulating layer. In that case, heat treatment is not necessarily performed after formation of the oxide insulating layer 396.

In the case where the silicon oxide layer is formed as the oxide insulating layer 396 and the silicon nitride layer is stacked thereover as the protective insulating layer 398, the silicon oxide layer and the silicon nitride layer can be formed with the use of a common silicon target in the same treatment chamber. After an etching gas including oxygen is introduced first, a silicon oxide layer is formed using a silicon target set in the treatment chamber, and then the etching gas is switched to an etching gas including nitrogen and the same silicon target is used to form a silicon nitride layer. Since the silicon oxide layer and the silicon nitride layer can be formed successively without being exposed to air, impurities such as hydrogen and moisture can be prevented from adsorbing onto a surface of the silicon oxide layer. In that case, after the silicon oxide layer is formed as the oxide insulating layer 396 and the silicon nitride layer is stacked thereover as the protective insulating layer 398, heat treatment (at a temperature of 100° C. to 400° C.) for diffusing hydrogen or moisture included in the oxide semiconductor layer to the oxide insulating layer is preferably performed.

After the protective insulating layer is formed, heat treatment may be further performed at higher than or equal to 100° C. and lower than or equal to 200° C. for longer than or equal to 1 hour and shorter than or equal to 30 hours in air. This heat treatment may be performed at a fixed heating temperature. Alternatively, the following change in the heating temperature may be conducted plural times repeatedly: the heating temperature is raised from room temperature to a temperature of higher than or equal to 100° C. and lower than or equal to 200° C. and then lowered to room temperature. Further, this heat treatment may be performed under reduced pressure before formation of the oxide insulating layer. When the heat treatment is performed under reduced pressure, the heating time can be shortened. By this heat treatment, the transistor can be normally off. Therefore, reliability of a display panel can be improved.

Moisture remaining in a reaction atmosphere is removed in forming the oxide semiconductor layer including a channel formation region over the gate insulating layer, whereby the concentration of hydrogen and hydride in the oxide semiconductor layer can be reduced.

The above process can be used for manufacture of backplanes (substrates over which transistors are formed) of liquid crystal display devices or the like. The above process can also be applied to a manufacturing process where a glass substrate with a thickness of 1 mm or less and a side of longer than 1 m.

A subsequent process may be performed in the following manner as in Embodiment 3: a pixel electrode layer connected to the transistor 390 is formed so as to cover a surface of a first structure body which projects into a liquid crystal layer over an insulating surface (insulating layer), a common electrode layer is formed so as to cover a surface of a second structure body which is provided over the same insulating surface (insulating layer) to project into the liquid crystal layer, and a first substrate and a second substrate are firmly attached to each other with the liquid crystal layer interposed therebetween.

With the pixel electrode layer which is provided so as to cover a top surface and a side surface of the first structure body and the common electrode layer which is provided so as to cover a top surface and a side surface of the second structure body, an electric field can be widely formed between the pixel electrode layer and the common electrode layer in the liquid crystal layer.

In addition, when a second common electrode layer is provided on the second substrate side as in Embodiment 2, an electric field can be applied to liquid crystal in an oblique direction (in a direction oblique to the substrate) between the pixel electrode layer and the second common electrode layer; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance can also be increased.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

This embodiment can be combined with any of the other embodiments as appropriate.

Embodiment 11

In this embodiment, an example of the transistor including an oxide semiconductor layer, which is described in Embodiment 9, and an example of a manufacturing method thereof will be described in detail with reference to FIGS. 26A to 26E. A transistor 310 described in this embodiment can be used as the transistors 1420 and 1450 which include an oxide semiconductor layer including a channel formation region in the above embodiment. The same portions as or portions having functions similar to those of the above embodiment can be formed in a manner similar to that of the above embodiment, and also steps similar to those of the above embodiment can be performed in a manner similar to that of the above embodiment; therefore, repetitive description will be omitted. In addition, detailed description of the same portions will be omitted.

FIGS. 26A to 26E illustrate an example of a cross-sectional structure of a transistor. The transistor 310 illustrated in FIGS. 26A to 26E is one of bottom-gate transistors and is also referred to as an inverted staggered thin film transistor.

Although description is given using a single-gate transistor as the transistor 310, a multi-gate transistor including a plurality of channel formation regions can be formed as needed.

A process of manufacturing the transistor 310 over a substrate 305 is described below with reference to FIGS. 26A to 26E.

First, a conductive film is formed over the substrate 305 having an insulating surface, and then a gate electrode layer 311 is formed in a first photolithography process. Note that a resist mask may be formed by an ink jetting method. When the resist mask is formed by an ink jetting method, a photomask is not used; therefore, manufacturing cost can be reduced.

There is no particular limitation on a substrate that can be used as the substrate 305 having an insulating surface as long as it has at least heat resistance enough to withstand heat treatment performed later. A glass substrate formed using barium borosilicate glass, aluminoborosilicate glass, or the like can be used.

When the temperature of the heat treatment performed later is high, a substrate having a strain point of 730° C. or higher is preferably used as the glass substrate. As a material of the glass substrate, a glass material such as aluminosilicate glass, aluminoborosilicate glass, or barium borosilicate glass is used, for example. By including a larger amount of barium oxide (BaO) than boron oxide ($B_2O_3$), a more practical heat-resistant glass substrate is obtained. Therefore, a glass substrate including a larger amount of BaO than $B_2O_3$ is preferably used.

Note that, instead of the glass substrate described above, a substrate formed using an insulator such as a ceramic substrate, a quartz substrate, or a sapphire substrate may be used. Alternatively, a crystallized glass substrate or the like can be used.

An insulating film serving as a base film may be provided between the substrate 305 and the gate electrode layer 311. The base film has a function of preventing diffusion of an impurity element from the substrate 305, and can be formed to have a single-layer structure or a stacked-layer structure using any of a silicon nitride film, a silicon oxide film, a silicon nitride oxide film, and a silicon oxynitride film.

Further, the gate electrode layer 311 can be formed to have a single-layer structure or a stacked-layer structure using any of metal materials such as molybdenum, titanium, chromium, tantalum, tungsten, aluminum, copper, neodymium, and scandium, and an alloy material including any of these as a main component.

As a two-layer structure of the gate electrode layer 311, for example, a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, a two-layer structure in which a titanium nitride layer and a molybdenum layer are stacked, or a two-layer structure in which a tungsten nitride layer and a tungsten layer are stacked is preferable. As a three-layer structure, a stack of a tungsten layer or a tungsten nitride layer, an alloy layer of aluminum and silicon or an alloy layer of aluminum and titanium, and a titanium nitride layer or a titanium layer is preferable.

Then, a gate insulating layer 307 is formed over the gate electrode layer 311.

The gate insulating layer 307 can be formed to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. In addition, a high-density plasma CVD method using microwaves (2.45 GHz) may be employed.

In this embodiment, a 100-nm-thick silicon oxynitride layer is formed as the gate insulating layer 307 by a plasma CVD method.

Then, an oxide semiconductor film 330 is formed to a thickness of greater than or equal to 2 nm and less than or equal to 200 nm over the gate insulating layer 307.

Note that before the oxide semiconductor film 330 is formed by a sputtering method, dust attached to a surface of the gate insulating layer 307 is preferably removed by reverse sputtering in which an argon gas is introduced and plasma is generated. Note that instead of an argon atmosphere, a nitrogen atmosphere, a helium atmosphere, an oxygen atmosphere, or the like may be used.

As the oxide semiconductor film 330, a four-component metal oxide such as an In—Sn—Ga—Zn—O film, a three-component metal oxide such as an In—Ga—Zn—O film, an In—Sn—Zn—O film, an In—Al—Zn—O film, a Sn—Ga—Zn—O film, an Al—Ga—Zn—O film, or a Sn—Al—Zn—O film, a two-component metal oxide such as an In—Zn—O film, a Sn—Zn—O film, an Al—Zn—O film, a Zn—Mg—O film, a Sn—Mg—O film, or an In—Mg—O film, an In—O film, a Sn—O film, a Zn—O film, or the like can be used. Further, $SiO_2$ may be included in the above oxide semiconductor film. In this embodiment, the oxide semiconductor film 330 is formed by a sputtering method with the use of an In—Ga—Zn—O-based oxide semiconductor target. A cross-sectional view at this stage corresponds to FIG. 26A. Further, the oxide semiconductor film 330 can be formed by a sputtering method in a rare gas (typically argon) atmosphere, an oxygen atmosphere, or an atmosphere including a rare gas (typically argon) and oxygen.

As a target for forming the oxide semiconductor film 330 by a sputtering method, a metal oxide target including zinc oxide as a main component can be used. As another example of a metal oxide target, an oxide semiconductor target including In, Ga, and Zn (in a composition ratio, $In_2O_3$:$Ga_2O_3$:ZnO=1:1:1 [molar ratio], In:Ga:Zn=1:1:0.5 [atomic ratio]) can be used. Alternatively, an oxide semiconductor target including In, Ga, and Zn (the composition ratio of In:Ga:Zn=1:1:1 or 1:1:2 [atomic ratio]) can be used. The fill rate of the oxide semiconductor target is higher than or equal to 90% and lower than or equal to 100%, preferably higher than or equal to 95% and lower than or equal to 99.9%. With the use of the oxide semiconductor target with a high fill rate, a dense oxide semiconductor film is formed.

It is preferable to use a high-purity gas from which an impurity such as hydrogen, water, a hydroxyl group, or hydride is removed to a concentration expressed by a level of ppm or ppb, as a sputtering gas used when the oxide semiconductor film 330 is formed.

The substrate is held in a treatment chamber kept under reduced pressure, and the substrate temperature is set to higher than or equal to 100° C. and lower than or equal to 600° C., preferably higher than or equal to 200° C. and lower than or equal to 400° C. Film formation is performed while the substrate is heated, whereby the concentration of an impurity included in the formed oxide semiconductor film can be reduced. Further, damage due to sputtering is reduced. Then, a sputtering gas from which hydrogen and moisture are removed is introduced into the treatment chamber while moisture remaining in the treatment chamber is removed, and the oxide semiconductor film 330 is formed over the substrate 305 with the use of a metal oxide as a target. In order to remove moisture remaining in the treatment chamber, an entrapment vacuum pump is preferably used. For example, a cryopump, an ion pump, or a titanium sublimation pump is preferably used. Further, an evacuation unit may be a turbo pump provided with a cold trap. In the deposition chamber which is evacuated with the cryopump, a hydrogen atom, a compound including a hydrogen atom, such as water ($H_2O$), (more preferably, also a compound including a carbon atom), and the like are removed, whereby the concentration of an impurity in the oxide semiconductor film formed in the deposition chamber can be reduced.

An example of the deposition condition is as follows: the distance between the substrate and the target is 100 mm, the pressure is 0.6 Pa, the DC power is 0.5 kW, and the atmosphere is an oxygen atmosphere (the oxygen flow rate is 100%). It is preferable that a pulsed DC power source be used because dust can be reduced and the film thickness can be uniform. The oxide semiconductor film preferably has a thickness of greater than or equal to 5 nm and less than or equal to 30 nm. Note that the appropriate thickness depends on an oxide semiconductor material to be used and the thickness may be set in accordance with the material.

Then, in a second photolithography process, the oxide semiconductor film 330 is processed into an island-shaped oxide semiconductor layer. A resist mask for forming the island-shaped oxide semiconductor layer may be formed by an ink jetting method. When the resist mask is formed by an ink jetting method, a photomask is not used; therefore, manufacturing cost can be reduced.

Next, the oxide semiconductor layer is subjected to first heat treatment. By the first heat treatment, dehydration or dehydrogenation of the oxide semiconductor layer can be performed. The temperature of the first heat treatment is higher than or equal to 400° C. and lower than or equal to 750° C., preferably higher than or equal to 400° C. and lower than the strain point of the substrate. Here, the substrate is introduced into an electric furnace, which is one of heat treatment apparatuses, heat treatment is performed on the oxide semiconductor layer in a nitrogen atmosphere at 450° C. for 1 hour, and then the oxide semiconductor layer is not exposed to air so that entry of water and hydrogen into the oxide semiconductor layer is prevented; thus, an oxide semiconductor layer 331 is obtained (see FIG. 26B).

The heat treatment apparatus is not limited to the electric furnace and may be the one provided with a device for heating an object to be processed by heat conduction or heat radiation from a heater such as a resistance heater. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the gas, an inert gas which does not react with an object to be processed due to heat treatment, such as nitrogen or a rare gas such as argon, is used.

For example, as the first heat treatment, GRTA may be performed in the following manner. The substrate is transferred and put in an inert gas which has been heated to a high temperature of 650° C. to 700° C., heated for several minutes, and then transferred and taken out of the inert gas which has been heated to a high temperature. GRTA enables high-temperature heat treatment in a short time.

Note that in the first heat treatment, it is preferable that water, hydrogen, and the like be not included in nitrogen or a rare gas such as helium, neon, or argon. Alternatively, it is preferable that nitrogen or a rare gas such as helium, neon, or argon introduced into a heat treatment apparatus have a purity of 6N (99.9999%) or higher, preferably 7N (99.99999%) or higher (that is, the impurity concentration is 1 ppm or lower, preferably 0.1 ppm or lower).

Alternatively, the first heat treatment of the oxide semiconductor layer may be performed on the oxide semiconductor film 330 which has not yet been processed into the island-shaped oxide semiconductor layer. In that case, after the first heat treatment, the substrate is taken out of the heating apparatus and a photolithography process is performed.

The heat treatment having an effect of dehydration or dehydrogenation on the oxide semiconductor layer may be performed at any of the following timings: after the oxide semiconductor layer is formed; after a source electrode and a drain electrode are formed over the oxide semiconductor layer; and after a protective insulating film is formed over the source electrode and the drain electrode.

In the case of forming a contact hole in the gate insulating layer 307, the step may be performed either before or after dehydration or dehydrogenation treatment of the oxide semiconductor film 330.

Note that etching of the oxide semiconductor film is not limited to wet etching and may be dry etching.

The etching conditions (such as an etchant, etching time, and temperature) are adjusted as appropriate in accordance with the material so that the film can be etched to have a desired shape.

Next, a conductive film to be a source electrode layer and a drain electrode layer (including a wiring formed in the same layer as the source electrode layer and the drain electrode layer) is formed over the gate insulating layer 307 and the oxide semiconductor layer 331. The conductive film may be formed by a sputtering method or a vacuum evaporation method. As a material of the conductive film to be the source electrode layer and the drain electrode layer (including a wiring formed in the same layer as the source electrode layer and the drain electrode layer), there are an element selected from Al, Cr, Cu, Ta, Ti, Mo, and W; an alloy including any of these elements as a component; an alloy including any of these elements in combination; and the like. Alternatively, a structure may be employed in which a high-melting-point metal layer of Cr, Ta, Ti, Mo, W, or the like is stacked over and/or below a metal layer of Al, Cu, or the like. Still alternatively, when an Al material to which an element preventing generation of hillocks and whiskers in an Al film, such as Si, Ti, Ta, W, Mo, Cr, Nd, Sc, or Y, is added is used, heat resistance can be increased.

The conductive film may have a single-layer structure or a stacked-layer structure of two or more layers. For example, a single-layer structure of an aluminum film including silicon, a two-layer structure in which a titanium film is stacked over an aluminum film, a three-layer structure in which a Ti film, an aluminum film, and a Ti film are stacked in this order, and the like can be given.

Alternatively, the conductive film to be the source electrode layer and the drain electrode layer (including a wiring formed in the same layer as the source electrode layer and the drain electrode layer) may be formed using a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—Zn)), or any of the metal oxide materials including silicon or silicon oxide can be used.

If heat treatment is performed after formation of the conductive film, it is preferable that the conductive film have heat resistance enough to withstand the heat treatment.

A third photolithography process is performed. A resist mask is formed over the conductive film and selective etching is performed, so that a source electrode layer 315a and a drain electrode layer 315b are formed. Then, the resist mask is removed (see FIG. 26C).

Ultraviolet, a KrF laser beam, or an ArF laser beam is used for light exposure for forming the resist mask in the third photolithography process. A channel length L of the transistor to be formed later depends on the width of an interval between a bottom portion of the source electrode layer and a bottom portion of the drain electrode layer which are adjacent to each other over the oxide semiconductor layer 331. Note that when light exposure is performed in the case where the channel length L is shorter than 25 nm, extreme ultraviolet with extremely short wavelengths of several nanometers to several tens of nanometers is used for light exposure for forming the resist mask in the third photolithography process. Light exposure with extreme ultraviolet leads to a high resolution and large depth of focus. Accordingly, the channel length L of the transistor to be formed later can be set to greater than or equal to 10 nm and less than or equal to 1000 nm. Thus, the operation speed of a circuit can be increased, and further, the off-state current is significantly small, so that low power consumption can be achieved.

Note that materials and etching conditions are adjusted as appropriate so that the oxide semiconductor layer 331 is not removed when the conductive film is etched.

In this embodiment, a Ti film is used as the conductive film, and an In—Ga—Zn—O-based oxide semiconductor is used for the oxide semiconductor layer 331. As an etchant, an ammonia hydrogen peroxide mixture (a mixed solution of ammonia, water, and a hydrogen peroxide solution) is used.

Note that in the third photolithography process, only part of the oxide semiconductor layer 331 is etched, whereby an oxide semiconductor layer having a groove (a depressed portion) might be formed. The resist mask used for forming the source electrode layer 315a and the drain electrode layer 315b may be formed by an ink jetting method. When the resist mask is formed by an ink jetting method, a photomask is not used; therefore, manufacturing cost can be reduced.

Further, an oxide conductive layer may be formed between the oxide semiconductor layer and the source and drain electrode layers. The oxide conductive layer and a metal layer for forming the source electrode layer and the drain electrode layer can be formed successively. The oxide conductive layer can function as a source region and a drain region.

When the oxide conductive layer is provided as the source region and the drain region between the oxide semiconductor layer and the source and drain electrode layers, the source region and the drain region can have lower resistance and the transistor can operate at high speed.

In order to reduce the numbers of photomasks and steps in a photolithography process, an etching step may be performed with the use of a resist mask formed using a multi-tone mask that is a light-exposure mask through which light is transmitted so as to have a plurality of intensities. Since a resist mask formed using a multi-tone mask has a plurality of thicknesses and can be further changed in shape by etching, the resist mask can be used in a plurality of etching steps to provide different patterns. Thus, a resist mask corresponding to at least two kinds of different patterns can be formed using one multi-tone mask. Accordingly, the number of light-exposure masks can be reduced and the number of corresponding photolithography processes can also be reduced, whereby simplification of a process can be realized.

Next, by plasma treatment using a gas such as $N_2O$, $N_2$, or Ar, water or the like adsorbed to a surface of an exposed portion of the oxide semiconductor layer may be removed.

After the plasma treatment is performed, an oxide insulating layer 316 which serves as a protective insulating film and is in contact with part of the oxide semiconductor layer is formed without exposure to air.

The oxide insulating layer 316 can be formed to a thickness of greater than or equal to 1 nm by a sputtering method or the like as appropriate, which is a method with which an impurity such as water or hydrogen does not enter the oxide insulating layer 316. When hydrogen is included in the oxide insulating layer 316, entry of the hydrogen to the oxide semiconductor layer or extraction of oxygen in the oxide semiconductor layer by the hydrogen occurs, thereby causing a back channel of the oxide semiconductor layer to have lower resistance (n-type conductivity), so that a parasitic channel might be formed. Therefore, it is important that a formation method in which hydrogen is not used is employed so that the oxide insulating layer 316 is formed including as little hydrogen as possible.

In this embodiment, a silicon oxide film is formed to a thickness of 200 nm as the oxide insulating layer 316 by a sputtering method. The substrate temperature in film formation may be higher than or equal to room temperature and lower than or equal to 300° C. and in this embodiment, is 100° C. The silicon oxide film can be formed by a sputtering method in a rare gas (typically argon) atmosphere, an oxygen atmosphere, or an atmosphere including a rare gas (typically argon) and oxygen. Further, a silicon oxide target or a silicon target can be used as a target. For example, the silicon oxide film can be formed using a silicon target by a sputtering method in an atmosphere including oxygen and nitrogen. The oxide insulating layer 316 which is formed in contact with the oxide semiconductor layer whose resistance is reduced is formed using an inorganic insulating film that does not include impurities such as moisture, a hydrogen ion, and OH$^-$ and blocks entry of these from the outside, typically, a silicon oxide film, a silicon oxynitride film, an aluminum oxide film, or an aluminum oxynitride film.

In that case, the oxide insulating layer 316 is preferably formed while moisture remaining in the treatment chamber is removed. This is for preventing hydrogen, a hydroxyl group, and moisture from being included in the oxide semiconductor layer 331 and the oxide insulating layer 316.

In order to remove moisture remaining in the treatment chamber, an entrapment vacuum pump is preferably used. For example, a cryopump, an ion pump, or a titanium sublimation pump is preferably used. Further, an evacuation unit may be a turbo pump provided with a cold trap. In the deposition chamber which is evacuated with the cryopump, a hydrogen atom, a compound including a hydrogen atom, such as water ($H_2O$), and the like are removed, whereby the concentration of an impurity in the oxide insulating layer 316 formed in the deposition chamber can be reduced.

It is preferable to use a high-purity gas from which an impurity such as hydrogen, water, a hydroxyl group, or hydride is removed to a concentration expressed by a level of ppm or ppb, as a sputtering gas used when the oxide insulating layer 316 is formed.

Next, second heat treatment (preferably at higher than or equal to 200° C. and lower than or equal to 400° C., for example, higher than or equal to 250° C. and lower than or equal to 350° C.) is performed in an inert gas atmosphere or an oxygen gas atmosphere. For example, the second heat treatment is performed in a nitrogen atmosphere at 250° C. for 1 hour. In the second heat treatment, heating is performed while part of the oxide semiconductor layer (a channel formation region) is in contact with the oxide insulating layer 316.

Through the above process, heat treatment for dehydration or dehydrogenation is performed on the oxide semiconductor film after deposition so that an impurity such as hydrogen, moisture, a hydroxyl group, or hydride (also referred to as a hydrogen compound) is intentionally removed from the oxide semiconductor layer. Additionally, the oxide semiconductor layer is purified to become electrically i-type (intrinsic) by supplying oxygen which is a main component of an oxide semiconductor and is simultaneously reduced in a step of removing an impurity.

In particular, when the heat treatment for dehydration or dehydrogenation is performed in an atmosphere of an inert gas such as nitrogen or a rare gas, the resistance of the oxide semiconductor layer after the heat treatment is reduced. Therefore, when the oxide insulating layer 316 is provided in contact with the oxide semiconductor layer so as to supply oxygen thereto as in this embodiment, part of the oxide semiconductor layer which is in contact with the oxide insulating layer 316 can be selectively brought into an oxygen-excess state and used as an i-type channel formation region. In this case, a region of an oxide semiconductor layer 312, which is not in direct contact with the oxide insulating layer 316 and overlaps with the source electrode layer 315a or the drain electrode layer 315b, can function as a high-resistance source region or a high-resistance drain region in a self-aligned manner. With such a structure, the high-resistance drain region serves as a buffer and a high electric field is not applied locally even if a high electric field is applied between the gate electrode layer 311 and the drain electrode layer 315b, so that the withstand voltage of the transistor can be improved.

Figure 26A:
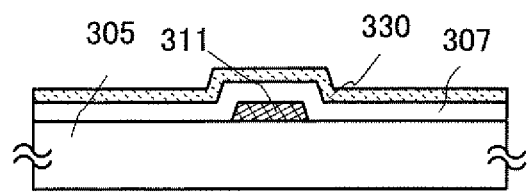
FIGS. 26A to 26E illustrate a transistor which can be applied to a liquid crystal display device and a method for manufacturing the transistor.
Figure 26B:
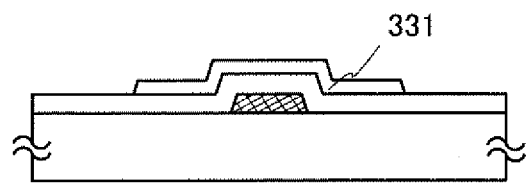
Figure 26C:
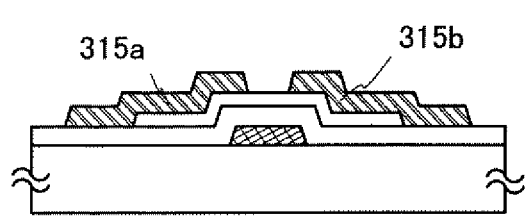
Figure 26D:
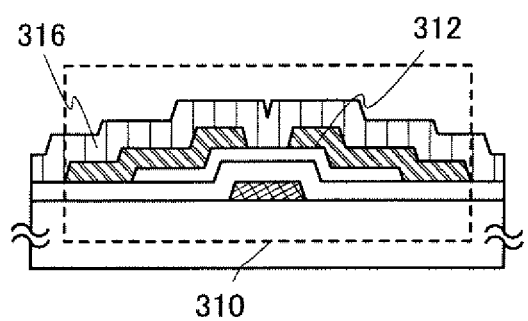
Figure 26E:
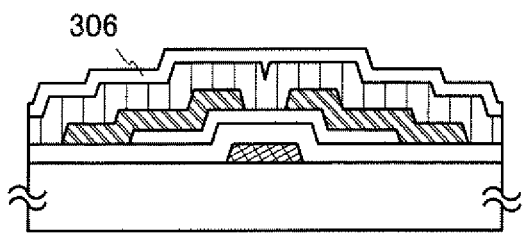

Through the above process, the transistor 310 is formed (see FIG. 26D).

When a silicon oxide layer having a lot of defects is used as the oxide insulating layer, by heat treatment after formation of the silicon oxide layer, an impurity such as hydrogen, moisture, a hydroxyl group, or hydride included in the oxide semiconductor layer is diffused to the oxide insulating layer, so that the impurity in the oxide semiconductor layer can be further reduced.

A protective insulating layer may be formed over the oxide insulating layer 316. For example, a silicon nitride film is formed by an RF sputtering method. Since an RF sputtering method has high productivity, it is preferably used as a formation method of the protective insulating layer. As the protective insulating layer, an inorganic insulating film which does not include impurities such as moisture, a hydrogen ion, and OH$^-$ and blocks entry of these from the outside is used; a silicon nitride film, an aluminum nitride film, a silicon nitride oxide film, an aluminum nitride oxide film, or the like is used. In this embodiment, a protective insulating layer 306 is formed using a silicon nitride film as the protective insulating layer (see FIG. 26E).

In this embodiment, the substrate 305 over which layers up to the oxide insulating layer 316 are formed is heated to a temperature of 100° C. to 400° C., a sputtering gas from which hydrogen and moisture are removed and which includes high-purity nitrogen is introduced, and a silicon semiconductor target is used, whereby a silicon nitride film is formed as the protective insulating layer 306. In this case, the protective insulating layer 306 is preferably formed while moisture remaining in a treatment chamber is removed, similarly to the case of the oxide insulating layer 316.

Further, after formation of the protective insulating layer, heat treatment may be performed at higher than or equal to 100° C. and lower than or equal to 200° C. for longer than or equal to 1 hour and shorter than or equal to 30 hours in air. This heat treatment may be performed at a fixed heating temperature. Alternatively, the following change in the heating temperature may be conducted plural times repeatedly: the heating temperature is raised from room temperature to a temperature of higher than or equal to 100° C. and lower than or equal to 200° C. and then lowered to room temperature.

Further, this heat treatment may be performed under reduced pressure before formation of the oxide insulating layer. When the heat treatment is performed under reduced pressure, the heating time can be shortened.

A planarization insulating layer for planarization may be provided over the protective insulating layer 306.

A subsequent process may be performed in the following manner as in Embodiment 3: a pixel electrode layer connected to the transistor 310 is formed so as to cover a surface of a first structure body which projects into a liquid crystal layer over an insulating surface (insulating layer), a common electrode layer is formed so as to cover a surface of a second structure body which is provided over the same insulating surface (insulating layer) to project into the liquid crystal layer, and a first substrate and a second substrate are firmly attached to each other with the liquid crystal layer interposed therebetween.

With the pixel electrode layer which is provided so as to cover a top surface and a side surface of the first structure body and the common electrode layer which is provided so as to cover a top surface and a side surface of the second structure body, an electric field can be widely formed between the pixel electrode layer and the common electrode layer in the liquid crystal layer.

In addition, when a second common electrode layer is provided on the second substrate side as in Embodiment 2, an electric field can be applied to liquid crystal in an oblique direction (in a direction oblique to the substrate) between the pixel electrode layer and the second common electrode layer; thus, liquid crystal molecules can be controlled more efficiently.

This embodiment can be combined with any of the other embodiments as appropriate.

Embodiment 12

Figure 27:
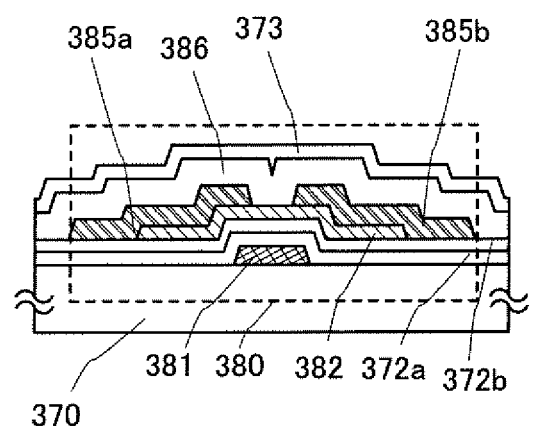
FIG. 27 illustrates a transistor which can be applied to a liquid crystal display device and a method for manufacturing the transistor.

In this embodiment, an example of the transistor including an oxide semiconductor layer, which is described in Embodiment 9, and an example of a manufacturing method thereof will be described in detail with reference to FIG. 27. A transistor 380 described in this embodiment can be used as the transistors 1420 and 1450 which include an oxide semiconductor layer including a channel formation region in the above embodiment.

In this embodiment, an example which is partly different from Embodiment 9 in the manufacturing process of a transistor is described with reference to FIG. 27. Since FIG. 27 is the same as FIGS. 26A to 26E except for part of the process, detailed description of the same portions is omitted.

In accordance with Embodiment 9, a gate electrode layer 381 is formed over a substrate 370, and a first gate insulating layer 372a and a second gate insulating layer 372b are stacked thereover. In this embodiment, a gate insulating layer has a two-layer structure in which a nitride insulating layer and an oxide insulating layer are used as the first gate insulating layer 372a and the second gate insulating layer 372b, respectively.

As the oxide insulating layer, a silicon oxide layer, a silicon oxynitride layer, an aluminum oxide layer, an aluminum oxynitride layer, a hafnium oxide layer, or the like can be used. As the nitride insulating layer, a silicon nitride layer, a silicon nitride oxide layer, an aluminum nitride layer, an aluminum nitride oxide layer, or the like can be used.

In this embodiment, the gate insulating layer has a structure in which a silicon nitride layer and a silicon oxide layer are stacked in this order over the gate electrode layer 381. A silicon nitride layer ($SiN_y$ ($y>0$)) with a thickness of greater than or equal to 50 nm and less than or equal to 200 nm (50 nm in this embodiment) is formed by a sputtering method as the first gate insulating layer 372a, and a silicon oxide layer ($SiO_x$ ($x>0$)) with a thickness of greater than or equal to 5 nm and less than or equal to 300 nm (100 nm in this embodiment) is stacked as the second gate insulating layer 372b over the first gate insulating layer 372a; thus, a gate insulating layer with a thickness of 150 nm is formed.

Next, an oxide semiconductor film is formed and then processed into an island-shaped oxide semiconductor layer in a photolithography process. In this embodiment, the oxide semiconductor film is formed by a sputtering method with the use of an In—Ga—Zn—O-based oxide semiconductor target.

In this case, the oxide semiconductor film is preferably formed while moisture remaining in a treatment chamber is removed. This is for preventing hydrogen, a hydroxyl group, and moisture from being included in the oxide semiconductor film.

In order to remove moisture remaining in the treatment chamber, an entrapment vacuum pump is preferably used. For example, a cryopump, an ion pump, or a titanium sublimation pump is preferably used. Further, an evacuation unit may be a turbo pump provided with a cold trap. In the deposition chamber which is evacuated with the cryopump, a hydrogen atom, a compound including a hydrogen atom, such as water ($H_2O$), and the like are removed, whereby the concentration of an impurity in the oxide semiconductor film formed in the deposition chamber can be reduced.

It is preferable to use a high-purity gas from which an impurity such as hydrogen, water, a hydroxyl group, or hydride is removed to a concentration expressed by a level of ppm or ppb, as a sputtering gas used when the oxide semiconductor film is formed.

Next, the oxide semiconductor layer is subjected to dehydration or dehydrogenation. The temperature of first heat treatment for dehydration or dehydrogenation is higher than or equal to 400° C. and lower than or equal to 750° C., preferably higher than or equal to 425° C. Note that in the case where the temperature is 425° C. or higher, the heat treatment time may be 1 hour or shorter; in the case where the temperature is lower than 425° C., the heat treatment time is longer than 1 hour. Here, the substrate is introduced into an electric furnace, which is one of heat treatment apparatuses, heat treatment is performed on the oxide semiconductor layer in a nitrogen atmosphere, and then the oxide semiconductor layer is not exposed to air so that entry of water and hydrogen into the oxide semiconductor layer is prevented. Thus, the oxide semiconductor layer is obtained. After that, a high-purity oxygen gas, a high-purity $N_2O$ gas, or ultra-dry air (with a dew point of −40° C. or lower, preferably −60° C. or lower) is introduced into the same furnace and cooling is performed. It is preferable that water, hydrogen, and the like be not included in the oxygen gas or the $N_2O$ gas. Alternatively, the purity of the oxygen gas or the $N_2O$ gas which is introduced into the heat treatment apparatus is preferably 6N (99.9999%) or higher, more preferably 7N (99.99999%) or higher (that is, the impurity concentration of the oxygen gas or the $N_2O$ gas is 1 ppm or lower, preferably 0.1 ppm or lower).

Dehydration or dehydrogenation treatment is performed so that an impurity such as hydrogen, moisture, a hydroxyl group, or hydride (also referred to as a hydrogen compound) is intentionally removed from the oxide semiconductor layer. Additionally, the oxide semiconductor layer is purified to become electrically i-type (intrinsic) by supplying oxygen which is a main component of an oxide semiconductor and is simultaneously reduced in a step of removing an impurity.

Note that the heat treatment apparatus is not limited to the electric furnace, and for example, may be a rapid thermal annealing (RTA) apparatus such as a gas rapid thermal annealing (GRTA) apparatus or a lamp rapid thermal annealing (LRTA) apparatus. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. An LRTA apparatus may be provided with not only a lamp but also a device for heating an object to be processed by heat conduction or heat radiation from a heater such as a resistance heater. GRTA is a method for performing heat treatment using a high-temperature gas. As the gas, an inert gas which does not react with an object to be processed due to heat treatment, such as nitrogen or a rare gas such as argon, is used. The heat treatment may be performed at 600° C. to 750° C. for several minutes by an RTA method.

Moreover, after the first heat treatment for dehydration or dehydrogenation, heat treatment may be performed at higher than or equal to 200° C. and lower than or equal to 400° C., preferably higher than or equal to 200° C. and lower than or equal to 300° C., in an oxygen gas atmosphere or an $N_2O$ gas atmosphere.

The first heat treatment of the oxide semiconductor layer may be performed on the oxide semiconductor film which has not yet been processed into the island-shaped oxide semiconductor layer. In that case, after the first heat treatment, the substrate is taken out of the heating apparatus and a photolithography process is performed.

Through the above process, an entire region of the oxide semiconductor film is brought into an oxygen-excess state; thus, the oxide semiconductor film has higher resistance, that is, the oxide semiconductor film becomes i-type. Accordingly, an oxide semiconductor layer 382 which is purified and electrically i-type (intrinsic) is obtained.

Next, a resist mask is formed over the oxide semiconductor layer 382 in a photolithography process, and selective etching is performed, whereby a source electrode layer 385a and a drain electrode layer 385b are formed. Then, an oxide insulating layer 386 is formed by a sputtering method.

In this case, the oxide insulating layer 386 is preferably formed while moisture remaining in the treatment chamber is removed. This is for preventing hydrogen, a hydroxyl group, and moisture from being included in the oxide semiconductor layer 382 and the oxide insulating layer 386.

In order to remove moisture remaining in the treatment chamber, an entrapment vacuum pump is preferably used. For example, a cryopump, an ion pump, or a titanium sublimation pump is preferably used. Further, an evacuation unit may be a turbo pump provided with a cold trap. In the deposition chamber which is evacuated with the cryopump, a hydrogen atom, a compound including a hydrogen atom, such as water ($H_2O$), and the like are removed, whereby the concentration of an impurity in the oxide insulating layer 386 formed in the deposition chamber can be reduced.

It is preferable to use a high-purity gas from which an impurity such as hydrogen, water, a hydroxyl group, or hydride is removed to a concentration expressed by a level of ppm or ppb, as a sputtering gas used when the oxide insulating layer 386 is formed.

Through the above process, the transistor 380 can be formed.

Next, in order to reduce variation in electric characteristics of the transistor, heat treatment (preferably at higher than or equal to 150° C. and tower than 350° C.) may be performed in an inert gas atmosphere or a nitrogen gas atmosphere. For example, the heat treatment is performed in a nitrogen atmosphere at 250° C. for 1 hour.

A protective insulating layer 373 is formed over the oxide insulating layer 386. In this embodiment, the protective insulating layer 373 is formed to a thickness of 100 nm with the use of a silicon nitride film by a sputtering method.

The protective insulating layer 373 and the first gate insulating layer 372a which are each formed using a nitride insulating layer do not include impurities such as moisture, hydrogen, hydride, and hydroxide and have an effect of blocking entry of these from the outside.

Therefore, in a manufacturing process after formation of the protective insulating layer 373, entry of an impurity such as moisture from the outside can be prevented. Further, even after a device is completed as a semiconductor device including a display panel, such as a liquid crystal display device, entry of an impurity such as moisture from the outside can be prevented in the long term; therefore, long-term reliability of the device can be improved.

Further, the insulating layers between the protective insulating layer 373 and the first gate insulating layer 372a, which are each formed using a nitride insulating layer, may be removed so that the protective insulating layer 373 and the first gate insulating layer 372a are in contact with each other.

Accordingly, impurities such as moisture, hydrogen, hydride, and hydroxide in the oxide semiconductor layer are reduced as much as possible and entry of such impurities is prevented, so that the concentration of an impurity in the oxide semiconductor layer can be maintained to be low.

Note that a planarization insulating layer for planarization may be provided over the protective insulating layer 373.

A subsequent process may be performed in the following manner as in Embodiment 3: a pixel electrode layer connected to the transistor 380 is formed so as to cover a surface of a first structure body which projects into a liquid crystal layer over an insulating surface (insulating layer), a common electrode layer is formed so as to cover a surface of a second structure body which is provided over the same insulating surface (insulating layer) to project into the liquid crystal layer, and a first substrate and a second substrate are firmly attached to each other with the liquid crystal layer interposed therebetween.

With the pixel electrode layer which is provided so as to cover a top surface and a side surface of the first structure body and the common electrode layer which is provided so as to cover a top surface and a side surface of the second structure body, an electric field can be widely formed between the pixel electrode layer and the common electrode layer in the liquid crystal layer.

In addition, when a second common electrode layer is provided on the second substrate side as in Embodiment 2, an electric field can be applied to liquid crystal in an oblique direction (in a direction oblique to the substrate) between the pixel electrode layer and the second common electrode layer; thus, liquid crystal molecules can be controlled more efficiently.

This embodiment can be combined with any of the other embodiments as appropriate.

Embodiment 13

An example of another material which can be used for the semiconductor layers of the transistors in Embodiments 3 to 12 will be described.

As a material for a semiconductor layer included in a semiconductor element, it is possible to use an amorphous semiconductor (hereinafter also referred to as an AS) which is formed by a sputtering method or a vapor-phase growth method using a semiconductor material gas typified by silane or germane, a polycrystalline semiconductor which is obtained by crystallizing the amorphous semiconductor by utilizing light energy or thermal energy, a microcrystalline semiconductor (also referred to as a semi-amorphous or microcrystal semiconductor, and hereinafter also referred to as an SAS), or the like. The semiconductor layer can be formed by a sputtering method, an LPCVD method, a plasma CVD method, or the like.

Considering Gibbs free energy, the microcrystalline semiconductor film is in a metastable state which is intermediate between an amorphous state and a single crystal state. That is, the microcrystalline semiconductor is in a third state which is stable in free energy, and has short-range order and lattice distortion. Columnar or needle-like crystals grow in a normal direction with respect to a surface of a substrate. The Raman spectrum of microcrystalline silicon, which is a typical example of a microcrystalline semiconductor, is shifted to a lower wavenumber side than 520 cm$^{-1}$ that represents single crystal silicon. In other words, the Raman spectrum of microcrystalline silicon has a peak between 480 cm$^{-1}$ that represents amorphous silicon and 520 cm$^{-1}$ that represents single crystal silicon. Furthermore, the microcrystalline semiconductor film includes at least 1 atomic % of hydrogen or halogen to terminate dangling bonds. The microcrystalline semiconductor film may include a rare gas element such as helium, argon, krypton, or neon to further promote lattice distortion, whereby a favorable microcrystalline semiconductor film with improved stability can be obtained.

This microcrystalline semiconductor film can be formed using a high-frequency plasma CVD method with a frequency of several tens of megahertz to several hundreds of megahertz, or a microwave plasma CVD apparatus with a frequency of 1 GHz or more. Typically, the microcrystalline semiconductor film can be formed using silicon hydride such as $SiH_4$, $Si_2H_6$, $SiH_2Cl_2$, $SiHCl_3$, $SiCl_4$, or $SiF_4$, which is diluted with hydrogen. Alternatively, the microcrystalline semiconductor film can be formed using, in addition to silicon hydride and hydrogen, one or more kinds of rare gas elements selected from helium, argon, krypton, and neon for dilution. In such a case, the flow rate of hydrogen is greater than or equal to 5 times and less than or equal to 200 times, preferably greater than or equal to 50 times and less than or equal to 150 times, more preferably 100 times, higher than that of silicon hydride.

The amorphous semiconductor is typified by hydrogenated amorphous silicon, and the crystalline semiconductor is typified by polysilicon or the like. Polysilicon (polycrystalline silicon) includes so-called high-temperature polysilicon which includes polysilicon formed at a process temperature of 800° C. or higher as a main component, so-called low-temperature polysilicon which includes polysilicon formed at a process temperature of 600° C. or lower as a main component, polysilicon formed by crystallizing amorphous silicon with the use of, for example, an element which promotes crystallization, and the like. Needless to say, a microcrystalline semiconductor or a semiconductor partly including a crystalline phase in a semiconductor layer can also be used as described above.

In addition, as a material for the semiconductor, a compound semiconductor such as GaAs, InP, SiC, ZnSe, GaN, or SiGe can be used as well as an element such as silicon (Si) or germanium (Ge).

In the case of using a crystalline semiconductor film for the semiconductor layer, the crystalline semiconductor film may be formed by various methods (e.g., a laser crystallization method, a thermal crystallization method, or a thermal crystallization method using an element which promotes crystallization, such as nickel). Alternatively, a microcrystalline semiconductor, which is an SAS, may be crystallized by laser irradiation to increase crystallinity. In the case where an element which promotes crystallization is not introduced, before being irradiated with laser light, an amorphous silicon film is heated at 500° C. for 1 hour in a nitrogen atmosphere, whereby hydrogen included in the amorphous silicon film is released to a concentration of $1\times10^{20}$ atoms/cm$^3$ or lower. This is because, if the amorphous silicon film includes much hydrogen, the amorphous silicon film is broken by laser light irradiation.

There is no particular limitation on a method of introducing a metal element into the amorphous semiconductor film as long as the metal element can exist on the surface of or inside the amorphous semiconductor film. For example, a sputtering method, a CVD method, a plasma treatment method (including a plasma CVD method), an adsorption method, or a method of applying a metal salt solution can be employed. Among them, the method using a solution is simple and easy, and is useful in terms of easy concentration adjustment of the metal element. At this time, an oxide film is preferably formed by UV light irradiation in an oxygen atmosphere, thermal oxidation, treatment with ozone water or hydrogen peroxide including a hydroxyl radical, or the like in order to improve the wettability of the surface of the amorphous semiconductor film and to spread an aqueous solution over the entire surface of the amorphous semiconductor film.

In a crystallization step of crystallizing the amorphous semiconductor film to form a crystalline semiconductor film, an element which promotes crystallization (also referred to as a catalytic element or a metal element) may be added to the amorphous semiconductor film, and crystallization may be performed by heat treatment (at 550° C. to 750° C. for 3 minutes to 24 hours). As the element which promotes (accelerates) crystallization, it is possible to use one or more kinds of elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au).

In order to remove or reduce the element which promotes crystallization from the crystalline semiconductor film, a semiconductor film including an impurity element is formed in contact with the crystalline semiconductor film so as to function as a gettering sink. As the impurity element, an impurity element imparting n-type conductivity, an impurity element imparting p-type conductivity, a rare gas element, or the like can be used. For example, it is possible to use one or more kinds of elements selected from phosphorus (P), nitrogen (N), arsenic (As), antimony (Sb), bismuth (Bi), boron (B), helium (He), neon (Ne), argon (Ar), krypton (Kr), and xenon (Xe). A semiconductor film including a rare gas element is formed on the crystalline semiconductor film including the element which promotes crystallization, and then heat treatment is performed (at 550° C. to 750° C. for 3 minutes to 24 hours). The element which promotes crystallization that is included in the crystalline semiconductor film moves into the semiconductor film including a rare gas element, and thus the element which promotes crystallization in the crystalline semiconductor film is removed or reduced. After that, the semiconductor film including a rare gas element, which has functioned as a gettering sink, is removed.

The amorphous semiconductor film may be crystallized by a combination of heat treatment and laser light irradiation. Alternatively, either heat treatment or laser light irradiation may be performed a plurality of times.

A crystalline semiconductor film may also be formed directly over the substrate by a plasma method. Alternatively, a crystalline semiconductor film may be selectively formed over the substrate by a plasma method.

This embodiment can be combined with any of the structures described in the other embodiments as appropriate.

Embodiment 14

In this embodiment, one embodiment of a liquid crystal display device will be described with reference to block diagrams of FIGS. 33A and 33B and a timing chart of FIG. 24.

Figure 33A:
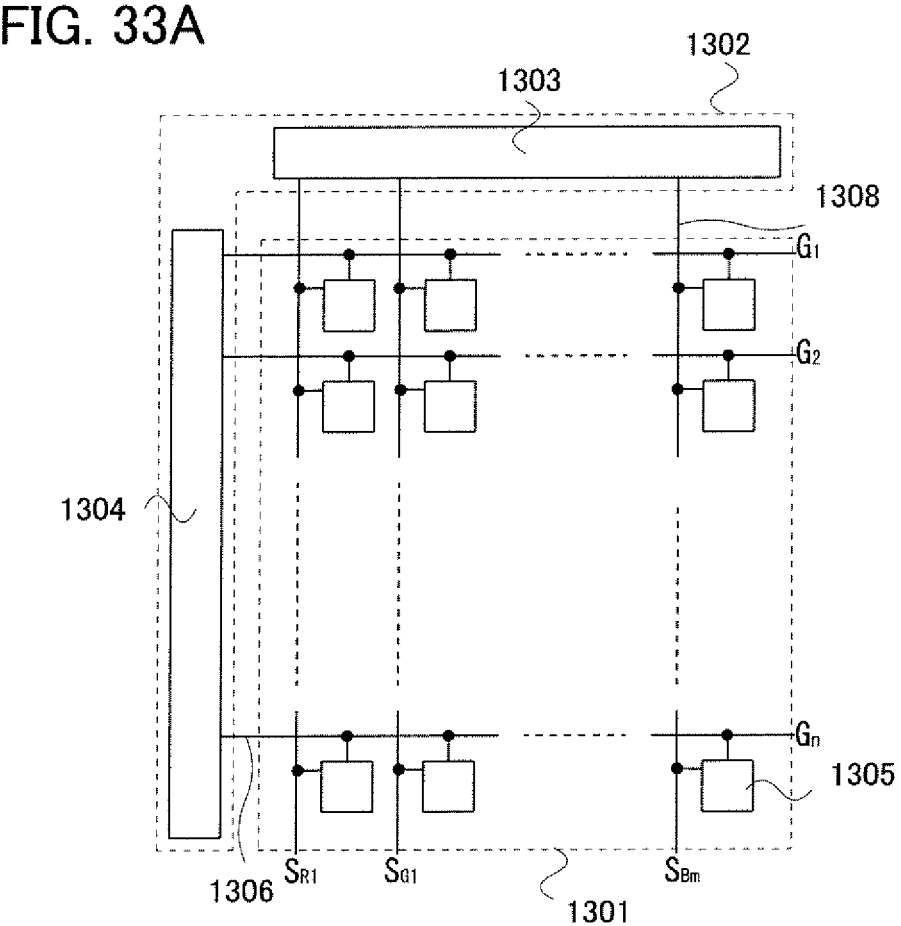
FIGS. 33A and 33B are block diagrams illustrating a liquid crystal display device.
Figure 33B:
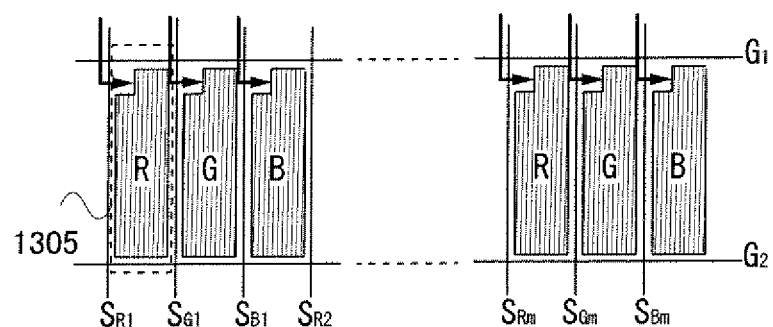

FIGS. 33A and 33B are block diagrams illustrating a structure of a liquid crystal display device. FIG. 33A illustrates a structure of a display portion 1301 and a driving portion 1302. The driving portion 1302 includes a signal line driver circuit 1303, a scan line driver circuit 1304, and the like. In the display portion 1301, a plurality of pixels 1305 are provided in matrix.

In FIG. 33A, a scan signal is supplied from the scan line driver circuit 1304 to a scan line 1306. In addition, data is supplied from the signal line driver circuit 1303 to a signal line 1308. A scan signal from the scan line 1306 is supplied such that the pixels 1305 are sequentially selected from a first row of the scan line 1306.

Note that in FIG. 33A, n (from $G_1$ to $G_n$) scan lines 1306 are connected to the scan line driver circuit 1304. Considering the case where a minimum unit of an image is formed with three pixels of R, and B (R: red, G: green, and B: blue), the signal line driver circuit 1303 is connected to 3 m signal lines in total: m (from $S_{R1}$ to $S_{Rm}$) signal lines corresponding to R, m (from $S_{G1}$ to $S_{Gm}$) signal lines corresponding to G, and m (from $S_{B1}$ to $S_{Bm}$) signal lines corresponding to B. That is, as illustrated in FIG. 33B, a signal line is provided for each color element, and data is supplied from the signal line to the pixel corresponding to a color element, so that the pixels 1305 can express a desired color.

Figure 24:
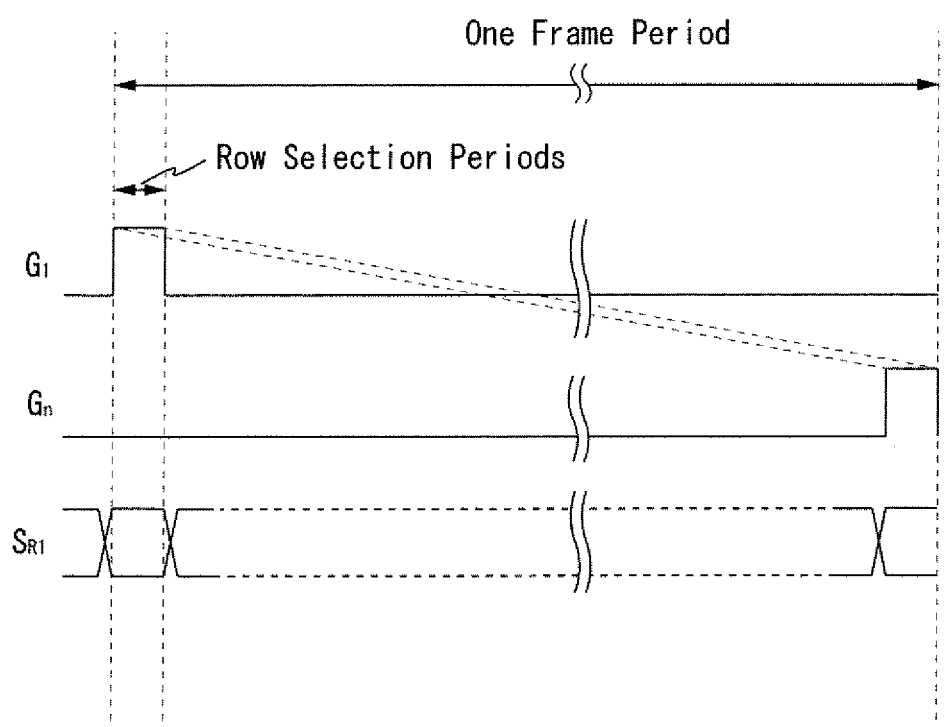
FIG. 24 is a timing chart of a liquid crystal display device.

The timing chart of FIG. 24 illustrates scan signals for selecting the scan lines 1306 (typically $G_1$ and $G_n$) in the respective row selection periods (scan period of one row of pixels of the liquid crystal display device) in one frame period, and illustrates a data signal of the signal line 1308 (typically $S_{R1}$).

Note that circuit diagrams in FIGS. 33A and 33B show the case where an n-channel transistor is used as a transistor provided for each pixel. FIG. 24 shows driving of pixels in the case where on and off of the n-channel transistor are controlled. Note that when a p-channel transistor is used in the circuit diagrams in FIGS. 33A and 33B, the potential of the scan signal may be changed as appropriate so that the transistor can be turned on or off in the same manner.

In the timing chart of FIG. 24, one frame period corresponding to a period in which an image of one screen is displayed is set to at least 1/120 second 8.3 ms) (preferably 1/240 second) such that a viewer does not perceive afterimages when a moving image is displayed. When the number of scan lines is n, a row selection period corresponds to 1/(120×n) second. For example, in the case where a liquid crystal display device includes 2000 scan lines (a so-called 4 k2 k image such as 4096×2160 pixels or 3840×2160 pixels is assumed) and delay of a signal due to a wiring or the like is not considered, a row selection period corresponds to 1/240000 second (≈4.2 μs).

A blue-phase liquid crystal element has a response time (time to change the alignment of liquid crystal molecules) of 1 msec or less when voltage is applied. On the other hand, a VA mode liquid crystal element has a response time of approximately several milliseconds when voltage is applied, even if the overdrive method is employed. Therefore, in the operation of a VA mode liquid crystal element, the length of one frame period is made not to be shorter than the response time in order to maintain favorable display. On the other hand, in the liquid crystal display device of this embodiment, a blue-phase liquid crystal element is used and a wiring is formed using a low-resistance material such as a Cu wiring, so that delay of a signal due to the wiring or the like can be reduced; thus, a sufficient margin for the response time of the liquid crystal element can be obtained, and desired alignment of the liquid crystal element which is based on voltage applied to the liquid crystal element in a row selection period can be efficiently obtained.

Similarly, in the liquid crystal display device described with reference to FIGS. 33A and 33B and FIG. 24, with a pixel electrode layer which is provided so as to cover a top surface and a side surface of a first structure body and a common electrode layer which is provided so as to cover a top surface and a side surface of a second structure body, an electric field can be widely formed between the pixel electrode layer and the common electrode layer in a liquid crystal layer.

In addition, when a second common electrode layer is provided on a second substrate side as in Embodiment 2, an electric field can be applied to liquid crystal in an oblique direction (in a direction oblique to the substrate) between the pixel electrode layer and the second common electrode layer; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance can also be increased.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

This embodiment can be combined with any of the structures described in the other embodiments as appropriate.

Embodiment 15

A transistor is manufactured, and a liquid crystal display device having a display function can be manufactured using the transistor in a pixel portion and further in a driver circuit. Further, part or whole of a driver circuit can be formed over the same substrate as a pixel portion with the use of a transistor, whereby a system-on-panel can be obtained.

The liquid crystal display device includes a liquid crystal element (also referred to as a liquid crystal display element) as a display element.

Further, a liquid crystal display device includes a panel in which a display element is sealed, and a module in which an IC or the like including a controller is mounted on the panel. An embodiment of the present invention relates to one mode of an element substrate before the display element is completed in a process of manufacturing the liquid crystal display device, and the element substrate is provided with a means to supply current to the display element in each of a plurality of pixels. Specifically, the element substrate may be in a state after only a pixel electrode of the display element is formed, a state after a conductive film to be a pixel electrode is formed and before the conductive film is etched to form the pixel electrode, or any of other states.

Note that a liquid crystal display device in this specification means an image display device, a display device, or a light source (including a lighting device). Further, the liquid crystal display device includes any of the following modules in its category: a module to which a connector such as a flexible printed circuit (FPC), tape automated bonding (TAB) tape, or a tape carrier package (TCP) is attached; a module having a TAB tape or a TCP at the tip of which a printed wiring board is provided; and a module in which an integrated circuit (IC) is directly mounted on a display element by a chip on glass (COG) method.

The appearance and a cross section of a liquid crystal display panel, which is one embodiment of a liquid crystal display device, is described with reference to FIGS. 12A1, 12A2, and 12B. FIGS. 12A1 and 12A2 are top views of a panel in which transistors 4010 and 4011 and a liquid crystal element 4013, which are formed over a first substrate 4001, are sealed between the first substrate 4001 and a second substrate 4006 with a sealant 4005. FIG. 12B is a cross-sectional view taken along line M-N in FIGS. 12A1 and 12A2.

The sealant 4005 is provided so as to surround a pixel portion 4002 and a scan line driver circuit 4004 which are provided over the first substrate 4001. The second substrate 4006 is provided over the pixel portion 4002 and the scan line driver circuit 4004. Thus, the pixel portion 4002 and the scan line driver circuit 4004 are sealed together with a liquid crystal layer 4008 by the first substrate 4001, the sealant 4005, and the second substrate 4006.

In FIG. 12A1, a signal line driver circuit 4003 which is fainted using a single crystal semiconductor film or a polycrystalline semiconductor film over a substrate separately prepared is mounted in a region which is different from the region surrounded by the sealant 4005 over the first substrate 4001. FIG. 12A2 illustrates an example in which part of a signal line driver circuit is formed with the use of a transistor which is provided over the first substrate 4001. A signal line driver circuit 4003*b* is formed over the first substrate 4001 and a signal line driver circuit 4003*a* which is formed using a single crystal semiconductor film or a polycrystalline semiconductor film is mounted on a substrate separately prepared.

Note that there is no particular limitation on the connection method of a driver circuit which is separately formed, and a COG method, a wire bonding method, a TAB method, or the like can be used. FIG. 12A1 illustrates an example of mounting the signal line driver circuit 4003 by a COG method, and FIG. 12A2 illustrates an example of mounting the signal line driver circuit 4003*a* by a TAB method.

The pixel portion 4002 and the scan line driver circuit 4004 which are provided over the first substrate 4001 include a plurality of transistors. FIG. 12B illustrates the transistor 4010 included in the pixel portion 4002 and the transistor 4011 included in the scan line driver circuit 4004 as an example. An insulating layer 4020 and an interlayer film 4021 are provided over the transistors 4010 and 4011.

Any of the transistors which are described in Embodiments 3 to 12 can be used as the transistors 4010 and 4011. The transistors 4010 and 4011 are n-channel thin film transistors.

Further, a conductive layer may be provided over the interlayer film 4021 or the insulating layer 4020 so as to overlap with a channel formation region of a semiconductor layer of the transistor 4011 for the driver circuit. The conductive layer may have the same potential as or a potential different from that of a gate electrode layer of the transistor 4011 and can function as a second gate electrode layer. Further, the potential of the conductive layer may be GND or 0 V, or the conductive layer may be in a floating state.

In addition, over the first substrate 4001, a pixel electrode layer 4030 is formed over a first structure body 4037 which is provided over the interlayer film 4021 to project into the liquid crystal layer 4008 and the pixel electrode layer 4030 is electrically connected to the transistor 4010. Over the interlayer film 4021, a first common electrode layer 4036 is provided over a second structure body 4038 which is provided to project into the liquid crystal layer 4008. The liquid crystal element 4013 includes the pixel electrode layer 4030, a second common electrode layer 4031, the first common electrode layer 4036, and the liquid crystal layer 4008. Note that a polarizing plate 4032 and a polarizing plate 4033 are provided on the outer sides of the first substrate 4001 and the second substrate 4006, respectively. In this embodiment, an example in which the second common electrode layer 4031 is further provided on the second substrate 4006 side is described, and the second common electrode layer 4031 is stacked over the pixel electrode layer 4030 and the first common electrode layer 4036 with the liquid crystal layer 4008 interposed therebetween. A structure in which the second common electrode layer 4031 is not provided as in Embodiment 1 may be employed.

With the pixel electrode layer 4030 which is provided so as to cover a top surface and a side surface of the first structure body 4037 and the first common electrode layer 4036 which is provided so as to cover a top surface and a side surface of the second structure body 4038, an electric field can be widely formed between the pixel electrode layer 4030 and the first common electrode layer 4036 in the liquid crystal layer 4008.

In addition, when the second common electrode layer 4031 is provided on the second substrate 4006 side, an electric field can be applied to liquid crystal in an oblique direction (in a direction oblique to the substrate) between the pixel electrode layer 4030 and the second common electrode layer 4031; thus, liquid crystal molecules can be controlled more efficiently.

Therefore, liquid crystal molecules in the entire liquid crystal layer in a thickness direction can be made to respond and white transmittance can be improved. Accordingly, the contrast ratio which is a ratio of white transmittance to black transmittance can also be increased.

As the first substrate 4001 and the second substrate 4006, a glass substrate, a plastic substrate, or the like having a light-transmitting property can be used. As the plastic substrate, a fiberglass-reinforced plastics (FRP) plate, a polyvinyl fluoride (PVF) film, a polyester film, or an acrylic resin film can be used. Further, a sheet in which aluminum foil is sandwiched between PVF films or polyester films can also be used.

A columnar spacer denoted by reference numeral 4035 is obtained by selective etching of an insulating film and is provided in order to control the thickness (a cell gap) of the liquid crystal layer 4008. Note that a spherical spacer may also be used. In the liquid crystal display device including the liquid crystal layer 4008, the cell gap which is the thickness of the liquid crystal layer is preferably greater than or equal to 1 µm and less than or equal to 20 µm. In this specification, the thickness of a cell gap refers to the length of a thickest part (film thickness) of a liquid crystal layer.

Although FIGS. 12A1, 12A2, and 12B illustrate an example of a transmissive liquid crystal display device, an embodiment of the present invention can also be applied to a semi-transmissive liquid crystal display device.

Further, FIGS. 12A1, 12A2, and 12B illustrate an example of a liquid crystal display device in which polarizing plates are provided on the outer side (the viewing side) of substrates; however, the polarizing plates may be provided on the inner side of the substrates. Whether the polarizing plate is provided on the inner side or the outer side may be determined as appropriate depending on the material of the polarizing plate and conditions of the manufacturing process. Furthermore, a light-blocking layer functioning as a black matrix may be provided.

The interlayer film 4021 is a chromatic-color light-transmitting resin layer and functions as a color filter layer. Further, part of the interlayer film 4021 may function as a light-blocking layer. In FIGS. 12A1, 12A2, and 12B, a light-blocking layer 4034 is provided on the second substrate 4006 side so as to cover the transistors 4010 and 4011. With the provision of the light-blocking layer 4034, the contrast can be increased and the transistors can be stabilized.

The transistors may be covered with the insulating layer 4020 which functions as a protective film of the transistors; however, there is no particular limitation.

Note that the protective film is provided to prevent entry of contaminant impurities floating in air, such as an organic substance, a metal substance, or moisture, and is preferably a dense film. The protective film may be formed by a sputtering method to have a single-layer structure or a stacked-layer structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

After the protective film is formed, the semiconductor layer may be subjected to annealing (at 300° C. to 400° C.).

Further, in the case of further forming a light-transmitting insulating layer as a planarization insulating film, the light-transmitting insulating layer can be formed using an organic material having heat resistance, such as polyimide, acrylic, benzocyclobutene, polyamide, or epoxy. Other than such organic materials, it is also possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed using any of these materials.

There is no particular limitation on the method for forming the insulating layer to be stacked, and any of the following can be employed in accordance with the material: methods such as a sputtering method, an SOG method, spin coating, dip coating, spray coating, and a droplet discharging method (such as an ink jetting method, screen printing, or offset printing); tools (equipment) such as a doctor knife, a roll coater, a curtain coater, and a knife coater; and the like. In the case where the insulating layer is formed using a material solution, the semiconductor layer may be annealed (at 200° C. to 400° C.) at the same time as a baking step. The baking step of the insulating layer serves also as the annealing step of the semiconductor layer, whereby a liquid crystal display device can be manufactured efficiently.

The pixel electrode layer 4030, the second common electrode layer 4031, and the first common electrode layer 4036 can be formed using a light-transmitting conductive material such as indium oxide including tungsten oxide, indium zinc oxide including tungsten oxide, indium oxide including titanium oxide, indium tin oxide including titanium oxide, indium tin oxide (ITO), indium zinc oxide, or indium tin oxide to which silicon oxide is added.

Alternatively, the pixel electrode layer 4030, the second common electrode layer 4031, and the first common electrode layer 4036 can be formed using any one or more of the following: metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy thereof; and a nitride thereof.

A conductive composition including a conductive macromolecule (also referred to as a conductive polymer) can be used for the pixel electrode layer 4030, the second common electrode layer 4031, and the first common electrode layer 4036.

In addition, a variety of signals and potentials are supplied to the signal line driver circuit 4003 that is formed separately, and the scan line driver circuit 4004 or the pixel portion 4002 from an FPC 4018.

Further, since the transistor is easily broken by static electricity or the like, a protection circuit for protecting the driver circuit is preferably provided over the same substrate for a gate line or a source line. The protection circuit is preferably formed using a nonlinear element.

In FIGS. 12A1, 12A2, and 12B, a connection terminal electrode 4015 is formed using the same conductive film as the pixel electrode layer 4030, and a terminal electrode 4016 is formed using the same conductive film as source electrode layers and drain electrode layers of the transistors 4010 and 4011.

The connection terminal electrode 4015 is electrically connected to a terminal included in the FPC 4018 through an anisotropic conductive film 4019.

Although FIGS. 12A1, 12A2, and 12B illustrate an example in which the signal line driver circuit 4003 is formed separately and mounted on the first substrate 4001, an embodiment of the present invention is not limited to this structure. The scan line driver circuit may be formed separately and then mounted, or only part of the signal line driver circuit or part of the scan line driver circuit may be formed separately and then mounted.

Figure 16:
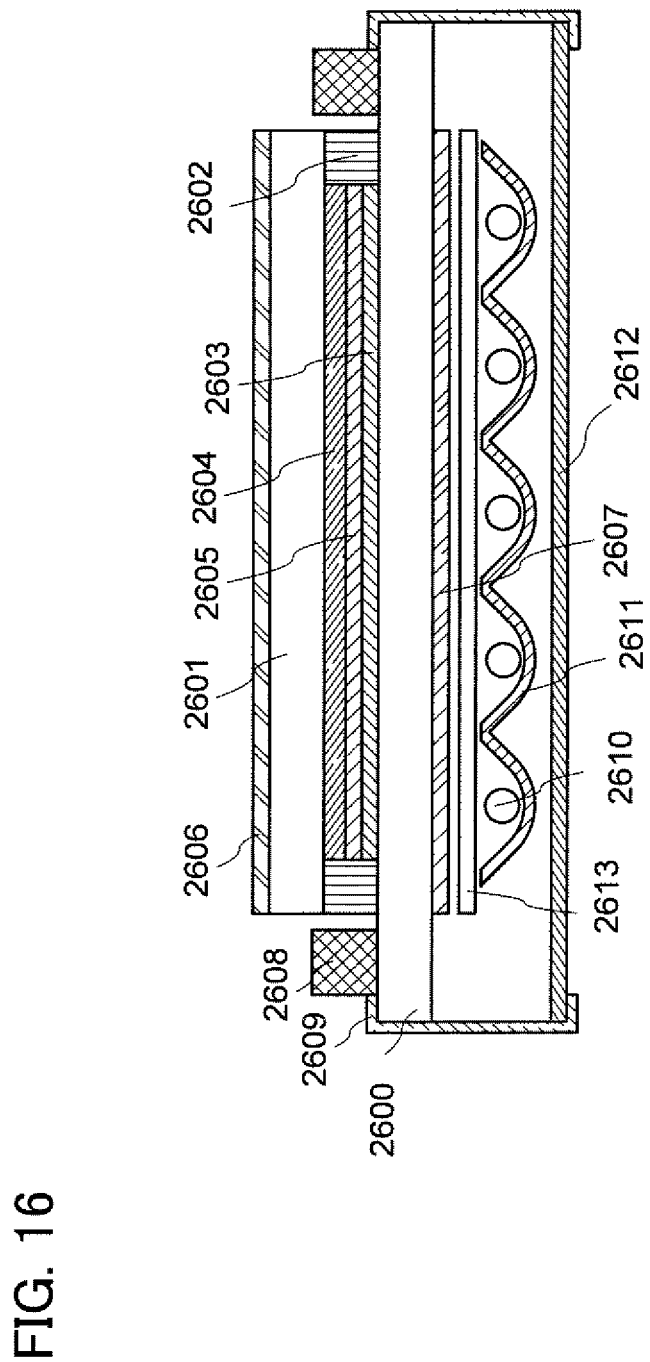
FIG. 16 illustrates a liquid crystal display module.

FIG. 16 illustrates an example of a liquid crystal display module which is formed as a liquid crystal display device disclosed in this specification.

FIG. 16 illustrates an example of the liquid crystal display module in which an element substrate 2600 and a counter substrate 2601 are firmly attached to each other with a sealant 2602 and an element layer 2603 including a TFT or the like, a display element 2604 including a liquid crystal layer, and an interlayer film 2605 including a chromatic-color light-transmitting resin layer which functions as a color filter are provided between the substrates to form a display region. The interlayer film 2605 including a chromatic-color light-transmitting resin layer is necessary to perform color display. In the case of the ROB system, respective chromatic-color light-transmitting resin layers corresponding to colors of red, green, and blue are provided for respective pixels. A polarizing plate 2606, a polarizing plate 2607, and a diffusing plate 2613 are provided on outer sides of the element substrate 2600 and the counter substrate 2601. A light source includes a cold cathode tube 2610 and a reflective plate 2611. A circuit board 2612 is connected to a wiring circuit portion 2608 of the element substrate 2600 through a flexible wiring board 2609 and includes an external circuit such as a control circuit or a power source circuit. As the light source, a white diode may be used. The polarizing plate and the liquid crystal layer may be stacked with a retardation plate interposed therebetween.

In the above manner, the contrast ratio of the liquid crystal display device including a liquid crystal layer exhibiting a blue phase can be increased.

In addition, since high white transmittance can be obtained with lower voltage, reduction in power consumption of the liquid crystal display device can also be achieved.

This embodiment can be combined with any of the structures described in the other embodiments as appropriate.

Embodiment 16

A liquid crystal display device disclosed in this specification can be applied to a variety of electronic devices (including a game machine). Examples of electronic devices include television sets (also referred to as televisions or television receivers), monitors of computers or the like, cameras such as digital cameras or digital video cameras, digital photo frames, mobile phones (also referred to as cellular phones or mobile phone sets), portable game consoles, portable information terminals, audio reproducing devices, large-sized game machines such as pachinko machines, and the like.

Figure 13A:
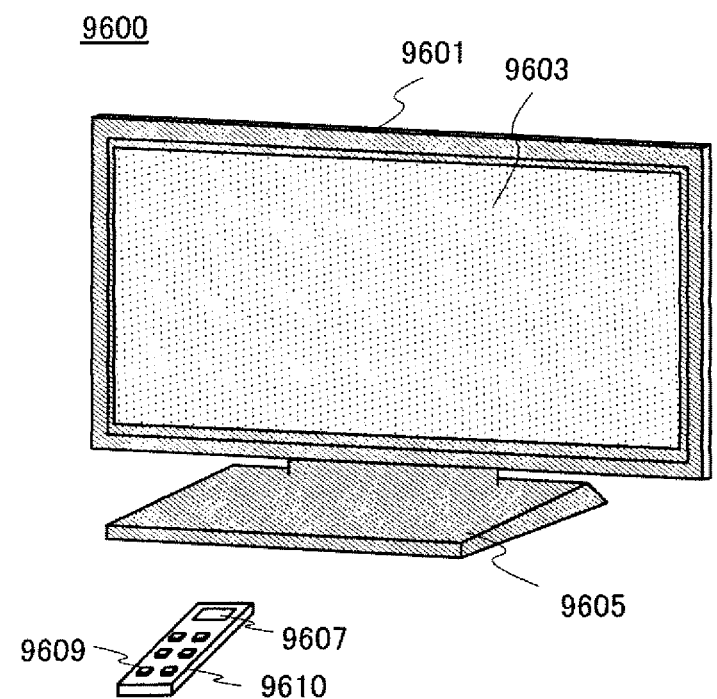
FIGS. 13A and 13B are external views respectively illustrating an example of a television set and an example of a digital photo frame.

FIG. 13A illustrates an example of a television set. In a television set 9600, a display portion 9603 is incorporated in a housing 9601. Images can be displayed on the display portion 9603. Here, the housing 9601 is supported by a stand 9605.

The television set 9600 can be operated with an operation switch of the housing 9601 or a separate remote controller 9610. Channels and volume can be controlled with an operation key 9609 of the remote controller 9610 so that an image displayed on the display portion 9603 can be controlled. Furthermore, the remote controller 9610 may be provided with a display portion 9607 for displaying data output from the remote controller 9610.

Note that the television set 9600 is provided with a receiver, a modem, and the like. With the receiver, a general television broadcast can be received. Furthermore, when the television set 9600 is connected to a communication network by wired or wireless connection via the modem, one-way (from a transmitter to a receiver) or two-way (between a transmitter and a receiver, between receivers, or the like) data communication can be performed.

Figure 13B:
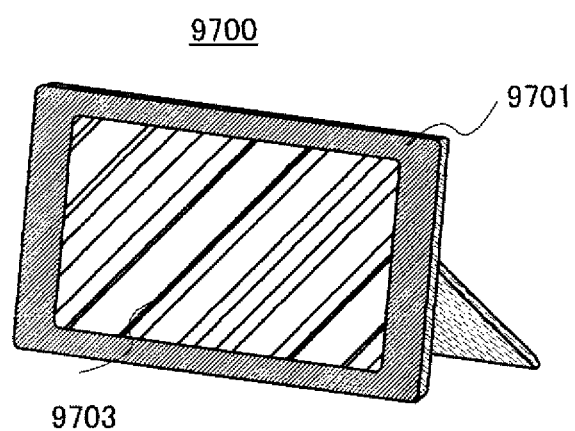

FIG. 13B illustrates an example of a digital photo frame. For example, in a digital photo frame 9700, a display portion 9703 is incorporated in a housing 9701. Various images can be displayed on the display portion 9703. For example, the display portion 9703 can display data of an image shot by a digital camera or the like to function as a normal photo frame.

Note that the digital photo frame 9700 is provided with an operation portion, an external connection terminal (a USB terminal, a terminal which can be connected to various cables such as a USB cable, or the like), a recording medium insertion portion, and the like. Although they may be provided on the same surface as the display portion, it is preferable to provide them on the side surface or the back surface for the design of the digital photo frame 9700. For example, a memory storing data of an image shot by a digital camera is inserted in the recording medium insertion portion of the digital photo frame, whereby the image data can be downloaded and displayed on the display portion 9703.

The digital photo frame 9700 may have a configuration capable of wirelessly transmitting and receiving data. Through wireless communication, desired image data can be downloaded to be displayed.

Figure 14A:
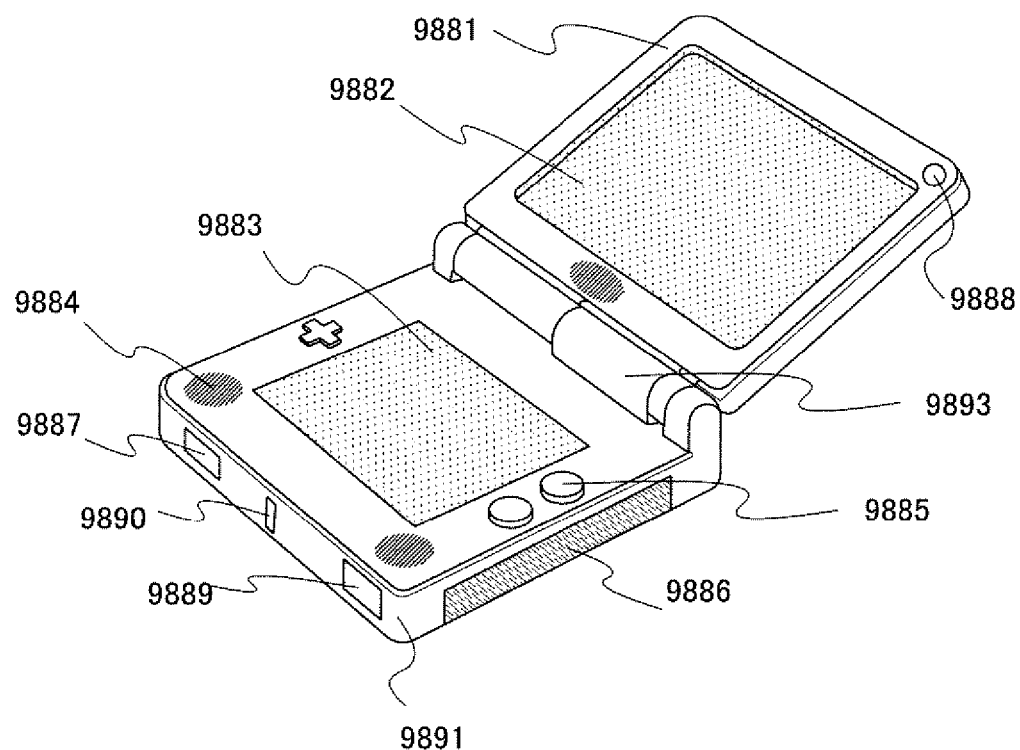
FIGS. 14A and 14B are external views illustrating examples of game machines.

FIG. 14A illustrates a portable game machine including a housing 9881 and a housing 9891 which are jointed with a connector 9893 so as to be opened and closed. A display portion 9882 and a display portion 9883 are incorporated in the housing 9881 and the housing 9891, respectively. The portable game machine illustrated in FIG. 14A further includes a speaker portion 9884, a recording medium insertion portion 9886, an LED lamp 9890, input means (an operation key 9885, a connection terminal 9887, a sensor 9888 (a sensor having a function of measuring force, displacement, position, speed, acceleration, angular speed, the number of rotations, distance, light, liquid, magnetism, temperature, chemical substance, sound, time, hardness, electric field, current, voltage, electric power, radiation, flow rate, humidity, tilt angle, vibration, odor, or infrared ray), and a microphone 9889), and the like. Needless to say, the structure of the portable game machine is not limited to the above and other structures provided with at least a liquid crystal display device disclosed in this specification may be employed. The portable game machine may include other accessory equipment as appropriate. The portable game machine illustrated in FIG. 14A has a function of reading out a program or data stored in a recording medium to display it on the display portion, and a function of sharing information with another portable game machine by wireless communication. The portable game machine in FIG. 14A can have various functions without limitation to the above.

Figure 14B:
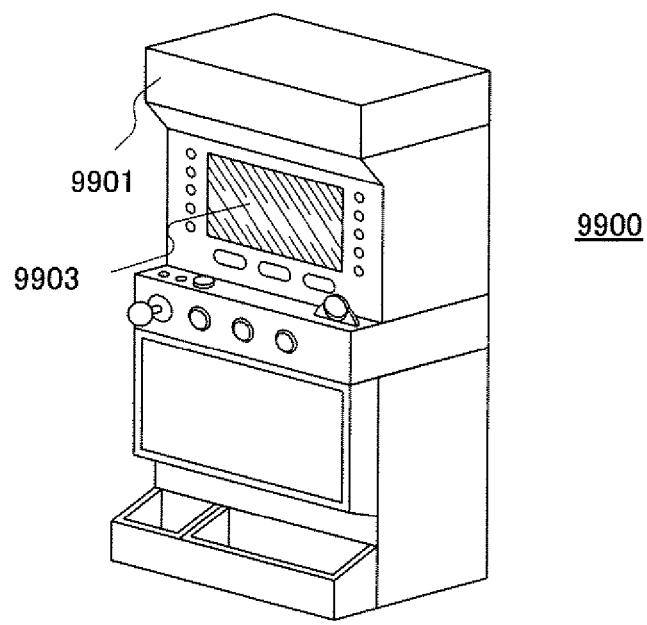

FIG. 14B illustrates an example of a slot machine which is a large-sized game machine. In a slot machine 9900, a display portion 9903 is incorporated in a housing 9901. In addition, the slot machine 9900 includes an operation means such as a start lever or a stop switch, a coin slot, a speaker, and the like. Needless to say, the structure of the slot machine 9900 is not limited to the above and other structures provided with at least a liquid crystal display device disclosed in this specification may be employed. The slot machine may include other accessory equipment as appropriate.

Figure 15A:
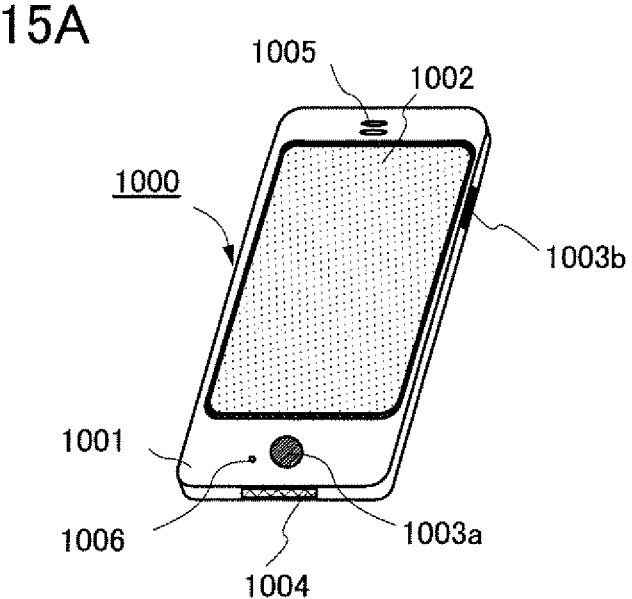
FIGS. 15A and 15B are external views illustrating examples of mobile phones.

FIG. 15A illustrates an example of a mobile phone. A mobile phone 1000 is provided with a display portion 1002 incorporated in a housing 1001, operation buttons 1003a and 1003b, an external connection port 1004, a speaker 1005, a microphone 1006, and the like.

When the display portion 1002 of the mobile phone 1000 illustrated in FIG. 15A is touched with a finger or the like, data can be input into the mobile phone 1000. Furthermore, operations such as making calls and composing mails can be performed by touching the display portion 1002 with a finger or the like.

There are mainly three screen modes of the display portion 1002. The first mode is a display mode mainly for displaying an image. The second mode is an input mode mainly for inputting information such as text. The third mode is a display-and-input mode in which two modes of the display mode and the input mode are mixed.

For example, in the case of making a call or composing a mail, a text input mode mainly for inputting text is selected for the display portion 1002 so that text displayed on a screen can be input. In this case, it is preferable to display a keyboard or number buttons on almost all the area of the screen of the display portion 1002.

When a detection device including a sensor for detecting inclination, such as a gyroscope or an acceleration sensor, is provided inside the mobile phone 1000, display on the screen of the display portion 1002 can be automatically switched by determining the orientation of the mobile phone 1000 (whether the mobile phone 1000 is placed horizontally or vertically for a landscape mode or a portrait mode).

The screen mode is switched by touching the display portion 1002 or operating the operation buttons 1003a and 1003b of the housing 1001. Further, the screen mode can be switched depending on the kind of images displayed on the display portion 1002. For example, when a signal of an image displayed on the display portion is a signal of data of moving image, the screen mode is switched to the display mode. When the signal is a signal of text data, the screen mode is switched to the input mode.

Furthermore, in the input mode, when input by touching the display portion 1002 is not performed for a certain period while a signal is detected by an optical sensor in the display portion 1002, the screen mode may be controlled so as to be switched from the input mode to the display mode.

The display portion 1002 can also function as an image sensor. For example, an image of a palm print, a fingerprint, or the like is taken by touching the display portion 1002 with the palm or the finger, whereby personal authentication can be performed. Furthermore, by providing a backlight or a sensing light source emitting near-infrared light for the display portion, an image of a finger vein, a palm vein, or the like can also be taken.

Figure 15B:
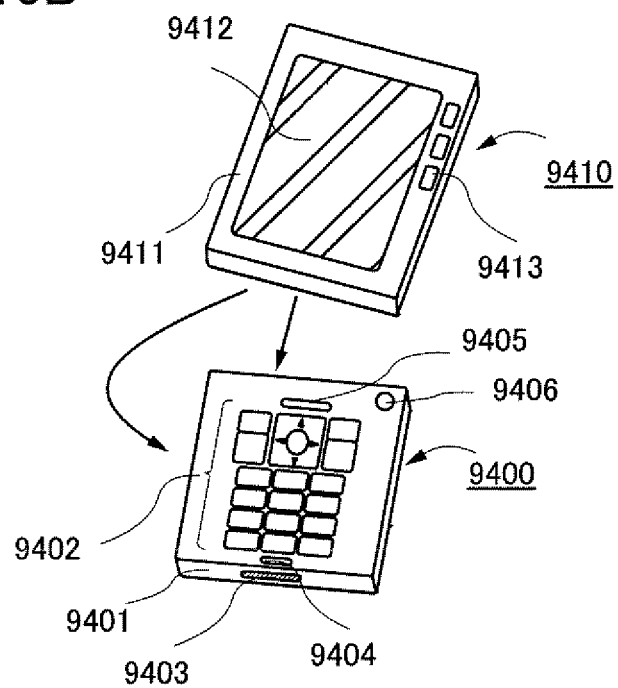

FIG. 15B illustrates another example of a mobile phone. The mobile phone illustrated in FIG. 15B includes a display device 9410 having a display portion 9412 and an operation button 9413 in a housing 9411 and a communication device 9400 having operation buttons 9402, an external input terminal 9403, a microphone 9404, a speaker 9405, and a light-emitting portion 9406 which emits light when receiving a call in a housing 9401. The display device 9410 having a display function can be detached from or attached to the communication device 9400 having a telephone function in two directions indicated by arrows. Accordingly, the display device 9410 and the communication device 940.0 can be attached to each other along their short sides or long sides. In addition, when only the display function is needed, the display device 9410 can be detached from the communication device 9400 and used alone. Images or input information can be transmitted or received by wireless or wired communication between the communication device 9400 and the display device 9410, each of which has a rechargeable battery.

EXAMPLE 1

Figure 20A:
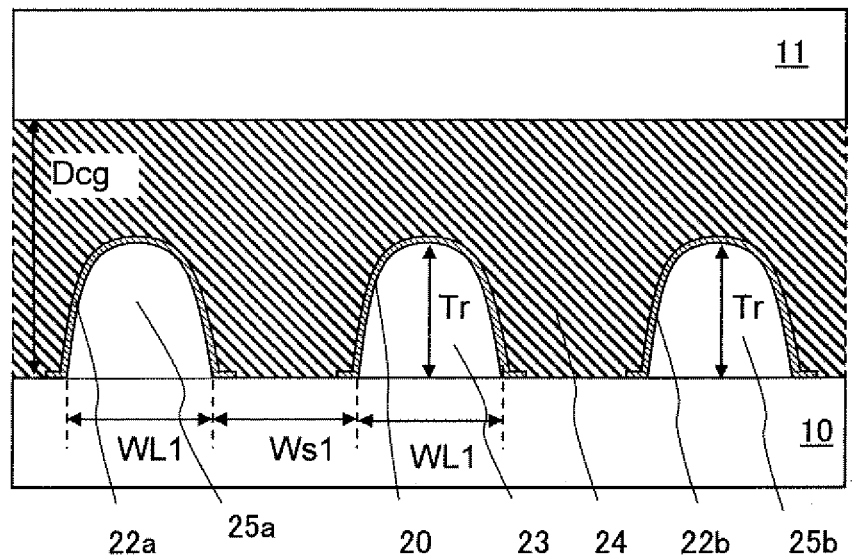
FIGS. 20A and 20B illustrate structures of Sample 1 and Sample 2, respectively, in Example 1.
Figure 20B:
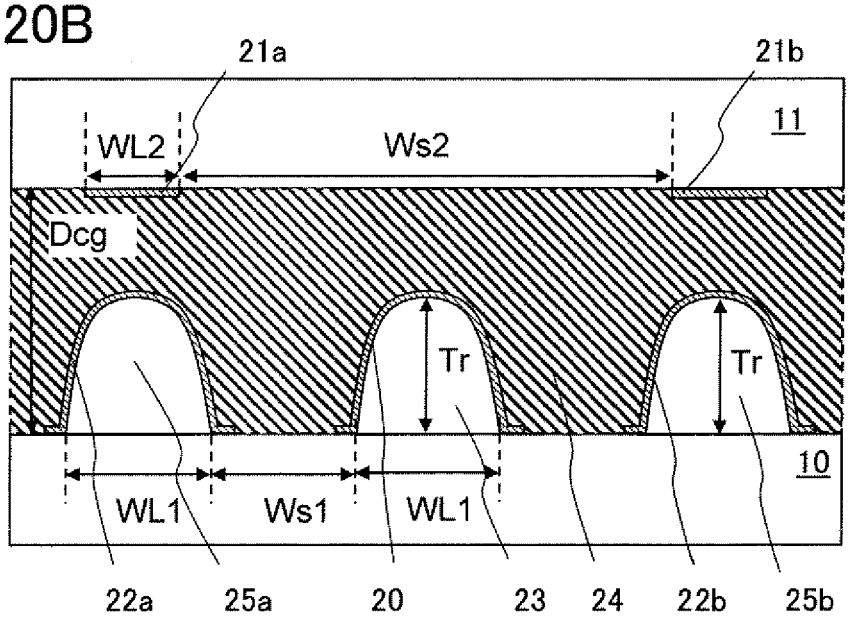

In this example, Sample 1 and Sample 2 having structures illustrated in FIGS. 20A and 20B, which are disclosed in this specification, are manufactured, and results of evaluating a relation between applied voltage and intensity of transmitted light are shown.

FIG. 20A is a schematic view of Sample 1, and FIG. 20B is a schematic view of Sample 2. Each illustrates a liquid crystal display device in which a first substrate 10 and a second substrate 11 are positioned so as to face each other with a liquid crystal layer 24 including a liquid crystal material exhibiting a blue phase interposed therebetween. A first structure body 23, a pixel electrode layer 20, second structure bodies 25a and 25b, and common electrode layers 22a and 22b are provided between the first substrate 10 and the liquid crystal layer 24. The first structure body 23 and the second structure bodies 25a and 25b are provided to project into the liquid crystal layer 24 from a surface of the first substrate 10 on the liquid crystal layer 24 side.

The pixel electrode layer 20 is formed to cover a top surface and a side surface of the first structure body 23 which is provided to project into the liquid crystal layer 24 from the surface of the first substrate 10 on the liquid crystal layer 24 side. The common electrode layers 22a and 22b are formed to cover top surfaces and side surfaces of the second structure bodies 25a and 25b which are provided to project into the liquid crystal layer 24 from the surface of the first substrate 10 on the liquid crystal layer 24 side.

In FIG. 20B, common electrode layers 21a and 21b are further provided on a second substrate 11 side as second common electrode layers so as to overlap with the common electrode layers 22a and 22b on the first substrate 10 side with the liquid crystal layer 24 interposed therebetween in the structure of FIG. 20A. Thicknesses (heights) (Tr) of the first structure body 23 and the second structure bodies 25a and 25b were each 0.9 μm, and widths in a substrate surface direction (WL1) thereof were each 2.6 μm. A width in a substrate surface direction (Ws1) between the first structure body 23 and the second structure body 25a was 2.4 μm, widths in a substrate surface direction (WL2) of the common electrode layers 21a and 21b were each 2.0 μm, and a width in a substrate surface direction (Ws2) between the common electrode layer 21a and the common electrode layer 21b was 8.0 μm.

In each of Samples 1 and 2, a cell gap (Dcg) was 4.0 μm.

Figure 22:
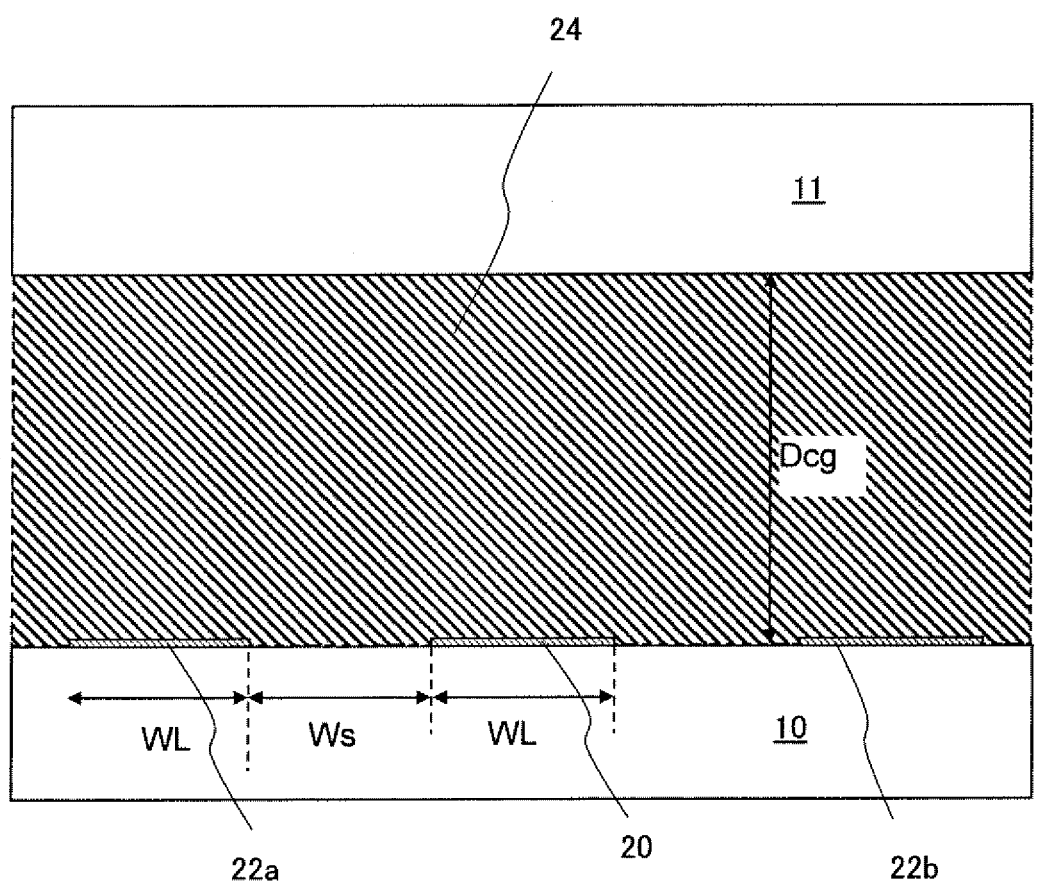
FIG. 22 illustrates a structure of a comparative sample.

For comparison, a comparative sample was also manufactured in which the structure body 23 and the common electrode layers 21a and 21b were not provided, the pixel electrode layer 20 and the common electrode layers 22a and 22b were provided in contact with the first substrate 10, and the cell gap (Dcg) was 4.0 μm, as illustrated in FIG. 22.

The cell gap (Dcg) is a maximum thickness (film thickness) of the liquid crystal layer 24 as illustrated in FIGS. 20A and 20B and is the distance between the first substrate 10 and the second substrate 11 in FIGS. 20A and 20B. Such an interval of the cell gap can be controlled by a spacer or a sealant. In this example, the cell gap was controlled by a sealant.

Glass substrates were used as the first substrate 10 and the second substrate 11, and a resin layer obtained by processing a photosensitive acrylic resin in a photolithography process was used as the first structure body 23 and the second structure bodies 25a and 25b. As the pixel electrode layer 20, the common electrode layers 21a and 21b, and the common electrode layers 22a and 22b, a 110-nm-thick conductive layer obtained in such a manner that a film of indium tin oxide including silicon oxide (ITSO) was formed by a sputtering method and then processed in a photolithography process was used.

Figure 21A:
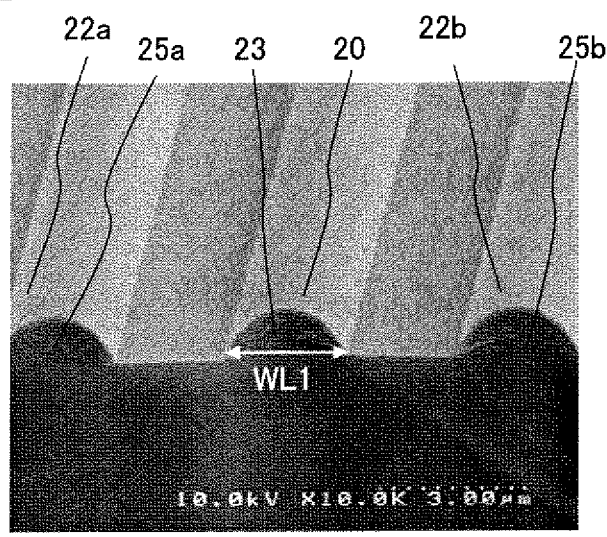
FIGS. 21A and 21B are SEM images of Sample 1.
Figure 21B:
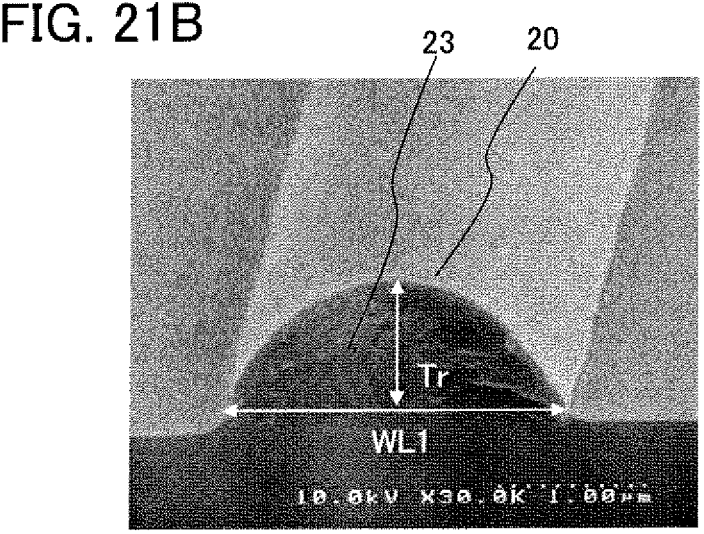

Further, Sample 1 was observed with a scanning electron microscope (SEM). FIGS. 21A and 21B are SEM images in which the first substrate 10 side of Sample 1 was observed. FIGS. 21A and 2113 are SEM images in which Sample 1 was observed obliquely from above, and FIG. 21B is an enlarged image of a portion including the first structure body 23 and the pixel electrode layer 20 in FIG. 21A. Note that FIG. 21A is an image of 10000-fold magnification and FIG. 21B is an image of 30000-fold magnification. As shown in FIG. 21A, the pixel electrode layer 20 which covers the top surface and the side surface of the first structure body 23 and the common electrode layers 22a and 22b which cover the top surfaces and the side surfaces of the second structure bodies 25a and 25b are alternately provided. From FIG. 21B, it can be confirmed that the pixel electrode layer 20 is formed so as to cover the top surface and the side surface of the first structure body 23 and to be partly in contact with the first substrate 10.

Figure 23:
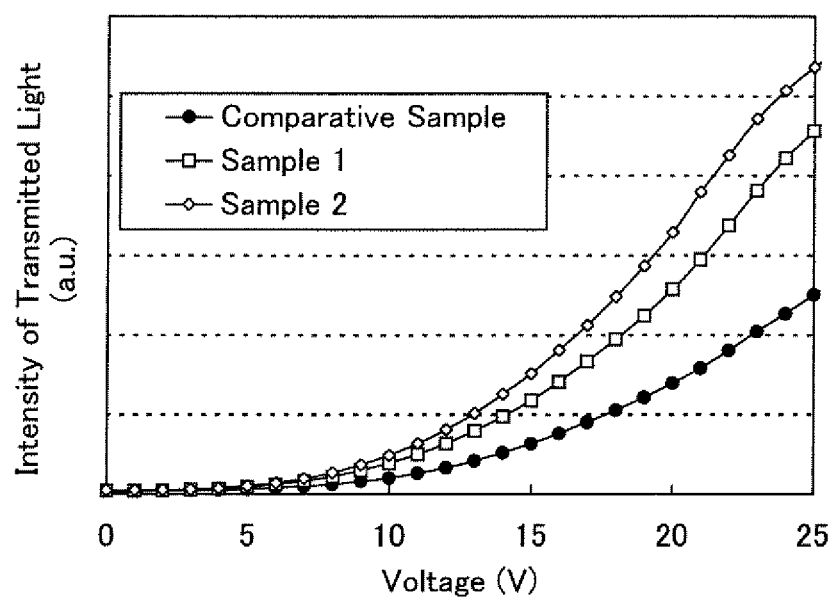
FIG. 23 shows a relation between applied voltage and intensity of transmitted light.

FIG. 23 shows the relation between applied voltage (V) and intensity of transmitted light in the comparative sample and Samples 1 and 2. Note that the applied voltage refers to potential differences between the pixel electrode layer 20, and the common electrode layers 21a and 21b and/or the common electrode layers 22a and 22b. In this example, the common electrode layers 21a and 21b and/or the common electrode layers 22a and 22b were connected to a GND line (a ground line), and voltage was applied to the pixel electrode layer 20. In addition, the intensity of transmitted light refers to the intensity of light that had transmitted from a light source through each sample and was measured. In FIG. 23, the results of each sample are shown as follows: a black circle represents the comparative sample; a white square represents Sample 1; and a white rhombus represents Sample 2.

From FIG. 23, the following results can be confirmed: Sample 1 in which the pixel electrode layer 20 was provided over the top surface and the side surface of the first structure body 23 and the common electrode layers 22a and 22b were provided over the top surfaces and the side surfaces of the second structure bodies 25a and 25b, and Sample 2 in which the common electrode layer 21a and 21b were further provided on the second substrate 11 side, which was a counter substrate, had higher intensity of transmitted light even with low voltage and thus had higher white transmittance than the comparative sample.

Thus, the pixel electrode layer 20 is provided so as to cover the top surface and the side surface of the first structure body 23 and the common electrode layers 22a and 22b are provided so as to cover the top surfaces and the side surfaces of the second structure bodies 25a and 25b, whereby the formation area of the pixel electrode layer 20 and the common electrode layers 22a and 22b can be increased in a thickness direction (three-dimensionally) of the liquid crystal layer 24. Accordingly, when voltage is applied between the pixel electrode layer 20 and the common electrode layers 22a and 22b, an electric field can be widely formed between the pixel electrode layer 20 and the common electrode layers 22a and 22b.

In addition, when the second common electrode layers 21a and 21b are provided on the second substrate 11 side as in the case of Sample 2, an electric field can be applied to liquid crystal in an oblique direction (in a direction oblique to the substrate) between the pixel electrode layer 20 and the second common electrode layers 21a and 21b; thus, liquid crystal molecules can be controlled more efficiently.

Accordingly, liquid crystal molecules in the entire liquid crystal layer 24 in a thickness direction were able to be made to respond effectively and white transmittance was improved. Therefore, the contrast ratio which is a ratio of white transmittance to black transmittance (light transmittance in black display) was able to be increased. Moreover, since high white transmittance (intensity of transmitted light) was able to be obtained with lower voltage, it was confirmed that reduction in power consumption of a liquid crystal display device could be achieved.

This application is based on Japanese Patent Application serial no. 2009-270055 filed with Japan Patent Office on Nov. 27, 2009, the entire contents of which are hereby incorporated by reference.

EXPLANATION OF REFERENCE

10: first substrate, 11: second substrate, 20: pixel electrode layer, 21a: common electrode layer, 21b: common electrode layer, 22a: common electrode layer, 22b: common electrode layer, 23: first structure body, 24: liquid crystal layer, 25a: second structure body, 25b: second structure body, 200: first substrate, 201: second substrate, 202a: arrow, 202b: arrow, 208: liquid crystal layer, 230: pixel electrode layer, 231a: common electrode layer, 231b: common electrode layer, 232: common electrode layer, 232a: common electrode layer, 232b: common electrode layer, 233: first structure body, 235a: second structure body, 235b: second structure body, 240: pixel electrode layer, 242a: common electrode layer, 242b: common electrode layer, 243: first structure body, 245a: second structure body, 245b: second structure body, 246: pixel electrode layer, 247a: common electrode layer, 247b: common electrode layer, 248: first structure body, 249a: second structure body, 249b: second structure body, 260: structure body, 261: film, 262: conductive film, 305: substrate, 306: protective insulating, layer, 307: gate insulating layer, 310: transistor, 311: gate electrode layer, 312: oxide semiconductor layer, 315a: source electrode layer, 315b: drain electrode layer, 316: oxide insulating layer, 330: oxide semiconductor film, 331: oxide semiconductor layer, 370: substrate, 372a: gate insulating layer, 372b: gate insulating layer, 373: protective insulating layer, 380: transistor, 381: gate electrode layer, 382: oxide semiconductor layer, 385a: source electrode layer, 385b: drain electrode layer, 386: oxide insulating layer, 390: transistor, 391: gate electrode layer, 392: oxide semiconductor layer, 393: oxide semiconductor film, 394: substrate, 395a: source electrode layer, 395b: drain electrode layer, 396: oxide insulating layer, 397: gate insulating layer, 398: protective insulating layer, 399: oxide semiconductor layer, 401: gate electrode layer, 402: gate insulating layer, 403: semiconductor layer, 404a: source or drain region, 404b: source or drain region, 405a: wiring layer, 405b: wiring layer, 407: insulating film, 408: capacitor wiring layer, 409: insulating layer, 410: transistor, 413: interlayer film, 414: light-blocking layer, 415: insulating layer, 417: light-transmitting resin layer, 420: transistor, 421: transistor, 422: transistor, 441: first substrate, 442: second substrate, 443a: polarizing plate, 443b: polarizing plate, 444: liquid crystal layer, 445: second structure body, 446: electrode layer, 447: electrode layer, 448: electrode layer, 449: first structure body, 450: color filter, 451: element layer, 454a: light-transmitting resin layer, 454b: light-transmitting resin layer, 454c: light-transmitting resin layer, 455a: light-blocking layer, 455b: light-blocking layer, 455c: light-blocking layer, 456a: sealant, 456b: sealant, 457: light, 458: liquid crystal layer, 459a: substrate, 459b: substrate, 473: transistor, 800: first substrate, 801: second substrate, 808: liquid crystal layer, 830: pixel electrode layer, 832a: common electrode layer, 832b: common electrode layer, 1000: mobile phone, 1001: housing, 1002: display portion, 1003a: operation button, 1003b: operation button, 1004: external connection port, 1005: speaker, 1006: microphone, 1301: display portion, 1302: driving portion, 1303: signal line driver circuit, 1304: scan line driver circuit, 1305: pixel, 1306: scan line, 1308: signal line, 1400: substrate, 1401: gate electrode layer, 1402: gate insulating layer, 1403: oxide semiconductor layer, 1405a: source electrode layer, 1405b: drain electrode layer, 1407: oxide insulating layer, 1409: protective insulating layer, 1420: transistor, 1432a: gate insulating layer, 1432b: gate insulating layer, 1437: oxide insulating layer, 1439: protective insulating layer, 1450: transistor, 2600: element substrate, 2601: counter substrate, 2602: sealant, 2603: element layer, 2604: display element, 2605: interlayer film, 2606: polarizing plate, 2607: polarizing plate, 2608: wiring circuit portion, 2609: flexible wiring board, 2610: cold cathode tube, 2611: reflective plate, 2612: circuit board, 2613: diffusing plate, 4001: first substrate, 4002: pixel portion, 4003: signal line driver circuit, 4003a: signal line driver circuit, 4003b: signal line driver circuit, 4004: scan line driver circuit, 4005: sealant, 4006: second substrate, 4008: liquid crystal layer, 4010: transistor, 4011: transistor, 4013: liquid crystal element, 4015: connection terminal electrode, 4016: terminal electrode, 4018: FPC, 4019: anisotropic conductive film, 4020: insulating layer, 4021: interlayer film, 4030: pixel electrode layer, 4031: common electrode layer, 4032: polarizing plate, 4034: light-blocking layer, 4036: common electrode layer, 4037: first structure body, 4038: second structure body, 9400: communication device, 9401: housing, 9402: operation button, 9403: external input terminal, 9404: microphone, 9405: speaker, 9406: light-emitting portion, 9410: display device, 9411: housing, 9412: display portion, 9413: operation button, 9600: television set, 9601: housing, 9603: display portion, 9605: stand, 9607: display portion, 9609: operation key, 9610: remote controller, 9700: digital photo frame, 9701: housing, 9703: display portion, 9881: housing, 9882: display portion, 9883: display portion, 9884: speaker portion, 9885: operation key, 9886: recoding medium insertion portion, 9887: connection terminal, 9888: sensor, 9889: microphone, 9890: LED lamp, 9891: housing, 9893: connector, 9900: slot machine, 9901: housing, 9903: display portion.

The invention claimed is:

1. A liquid crystal display device comprising:
    a first substrate;
    a second substrate over the first substrate;
    a liquid crystal layer including a liquid crystal material exhibiting a blue phase between the first substrate and the second substrate;
    a transistor comprising a semiconductor layer over the first substrate;
    an interlayer film over the transistor wherein the interlayer film has a contact hole exposing a art of the semiconductor layer;
    a first structure body over the interlayer film, and between the interlayer film and the liquid crystal layer,
    wherein the first structure body has a rib-shaped cross-section, and
    wherein a side surface of the first structure body comprises a tapered shape;
    a second structure body over the interlayer film, and between the interlayer film and the liquid crystal layer,
    wherein the second structure body has a rib-shaped cross-section,
    wherein a side surface of the second structure body comprises a tapered shape, and
    wherein a part of the second structure body is provided between parts of the first structure body;
    a first electrode layer electrically connected to the semiconductor layer through the contact hole, wherein the first electrode layer covers a top surface and the side surface of the first structure body, wherein the first electrode layer is configured to be applied with a first potential; and
    a second electrode layer which covers a top surface and the side surface of the second structure body, wherein the second electrode layer is configured to be applied with a second potential,
    wherein the first electrode layer is elongated from the side surface of the first structure body toward the second structure body on the interlayer film,
    wherein the second electrode layer is elongated from the side surface of the second structure body toward to the first structure body on the interlayer film,
    wherein the interlayer film has a curved inner wall surface at the contact hole, and
    wherein the first structure body has a skirt shape at a bottom of the first structure body.

2. The liquid crystal display device according to claim 1, wherein the first electrode layer and the second electrode layer are in contact with the liquid crystal layer.

3. The liquid crystal display device according to claim 1, wherein the first electrode layer and the second electrode layer each have a comb-like shape.

4. The liquid crystal display device according to claim 1, wherein the liquid crystal layer comprises a chiral agent.

5. The liquid crystal display device according to claim 1, wherein the liquid crystal layer comprises a photocurable resin and a photopolymerization initiator.

6. The liquid crystal display device according to claim 1, wherein the semiconductor layer comprises an oxide semiconductor.

7. The liquid crystal display device according to claim 6, wherein the oxide semiconductor comprises indium and zinc.

8. The liquid crystal display device according to claim 1, wherein the first structure body and the second structure body are formed of a same material.

9. The liquid crystal display device according to claim 1, wherein the first structure body and the second structure body comprises resin.

10. The liquid crystal display device according to claim 1, wherein the first electrode layer and the second electrode layer are formed of a same material.

11. A liquid crystal display device comprising:
    a first substrate;
    a second substrate over the first substrate;
    a liquid crystal layer including a liquid crystal material exhibiting a blue phase between the first substrate and the second substrate;
    a transistor comprising a semiconductor layer over the first substrate;
    an interlayer film over the transistor, wherein the interlayer film has a contact hole exposing a part of the semiconductor layer;
    a first structure body over the interlayer film, and between the interlayer film and the liquid crystal layer,
    wherein the first structure body has a rib-shaped cross-section, and
    wherein a side surface of the first structure body comprises a tapered shape;
    a second structure body over the interlayer film, and between the interlayer film and the liquid crystal layer,
    wherein the second structure body has a rib-shaped cross-section,
    wherein a side surface of the second structure body comprises a tapered shape, and
    wherein a part of the second structure body is provided between parts of the first structure body;
    a first electrode layer electrically connected to the semiconductor layer through the contact hole, wherein the first electrode layer covers a top surface and the side surface of the first structure body, wherein the first electrode layer is configured to be applied with a first potential;
    a second electrode layer which covers a top surface and the side surface of the second structure body, wherein the second electrode layer is configured to be applied with a second potential; and
    a third electrode layer having an opening pattern, wherein the third electrode layer overlaps with the second electrode layer and is provided between the second substrate and the liquid crystal layer,
    wherein the first electrode layer is elongated from the side surface of the first structure body toward the second structure body on the interlayer film,
    wherein the second electrode layer is elongated from the side surface of the second structure body toward to the first structure body on the interlayer film,
    wherein the interlayer film has a curved inner wall surface at the contact hole, and
    wherein the first structure body has a skirt shape at a bottom of the first structure body.

12. The liquid crystal display device according to claim 11, wherein the first electrode layer, the second electrode layer, and the third electrode layer are in contact with the liquid crystal layer.

13. The liquid crystal display device according to claim 11, wherein the first electrode layer, the second electrode layer, and the third electrode layer each have a comb-like shape.

14. The liquid crystal display device according to claim 11, wherein the liquid crystal layer comprises a chiral agent.

15. The liquid crystal display device according to claim 11, wherein the liquid crystal layer comprises a photocurable resin and a photopolymerization initiator.

16. The liquid crystal display device according to claim 11, wherein the semiconductor layer comprises an oxide semiconductor.

17. The liquid crystal display device according to claim 16, wherein the oxide semiconductor comprises indium and zinc.

18. The liquid crystal display device according to claim 11, wherein the first structure body and the second structure body are formed of a same material.

19. The liquid crystal display device according to claim 11, wherein the first structure body and the second structure body comprises resin.

20. The liquid crystal display device according to claim 11, wherein the first electrode layer and the second electrode layer are formed of a same material.

21. A liquid crystal display device comprising:
a first substrate;
a second substrate over the first substrate;
a liquid crystal layer including a liquid crystal material exhibiting a blue phase between the first substrate and the second substrate;
a transistor comprising a semiconductor layer over the first substrate;
an interlayer film over the transistor, wherein the interlayer film has a contact hole exposing a part of the semiconductor layer;
a first structure body over the interlayer film, and between the interlayer film and the liquid crystal layer,
wherein the first structure body has a rib-shaped cross-section, and
wherein a side surface of the first structure body comprises a tapered shape;
a second structure body over the interlayer film, and between the interlayer film and the liquid crystal layer,
wherein the second structure body has a rib-shaped cross-section,
wherein a side surface of the second structure body comprises a tapered shape;
a first electrode layer electrically connected to the semiconductor layer through the contact hole, wherein the first electrode layer covers a top surface and the side surface of the first structure body, wherein the first electrode layer is configured to be applied with a first potential; and
a second electrode layer which covers a top surface and the side surface of the second structure body, wherein the second electrode layer is configured to be applied with a second potential,
wherein the first electrode layer is elongated from the side surface of the first structure body toward the second structure body on the interlayer film,
wherein the second electrode layer is elongated from the side surface of the second structure body toward to the first structure body on the interlayer film,
wherein the interlayer film has a curved inner wall surface at the contact hole, and
wherein the first structure body has a skirt shape at a bottom of the first structure body.

22. The liquid crystal display device according to claim 21, wherein the first electrode layer and the second electrode layer are in contact with the liquid crystal layer.

23. The liquid crystal display device according to claim 21, wherein the first electrode layer and the second electrode layer each have a comb-like shape.

24. The liquid crystal display device according to claim 21, wherein the liquid crystal layer comprises a chiral agent.

25. The liquid crystal display device according to claim 21, wherein the liquid crystal layer comprises a photocurable resin and a photopolymerization initiator.

26. The liquid crystal display device according to claim 21, wherein the semiconductor layer comprises an oxide semiconductor.

27. The liquid crystal display device according to claim 26, wherein the oxide semiconductor comprises indium and zinc.

28. The liquid crystal display device according to claim 21, wherein the first structure body and the second structure body are formed of a same material.

29. The liquid crystal display device according to claim 21, wherein the first structure body and the second structure body comprises resin.

30. The liquid crystal display device according to claim 21, wherein the first electrode layer and the second electrode layer are formed of a same material.

31. The liquid crystal display device according to claim 1,
wherein the top surface of the first structure body is rounded,
wherein a surface of the first electrode layer, which is provided over the top surface of the first structure body, is rounded,
wherein the top surface of the second structure body is rounded, and
wherein a surface of the second electrode layer, which is provided over the top surface of the second structure body, is rounded.

32. The liquid crystal display device according to claim 1
wherein a part of the first electrode layer which is elongated from the side surface of the first structure body toward the second structure body does not overlap with the first structure body, and
wherein a part of the second electrode layer which is elongated from the side surface of the second structure body toward the first structure body does not overlap with the second structure body.

33. The liquid crystal display device according to claim 11,
wherein the top surface of the first structure body is rounded,
wherein a surface of the first electrode layer, which is provided over the top surface of the first structure body, is rounded,
wherein the top surface of the second structure body is rounded, and
wherein a surface of the second electrode layer, which is provided over the top surface of the second structure body, is rounded.

34. The liquid crystal display device according to claim 11,
wherein a part of the first electrode layer which is elongated from the side surface of the first structure body toward the second structure body does not overlap with the first structure body, and
wherein a part of the second electrode layer which is elongated from the side surface of the second structure body toward the first structure body does not overlap with the second structure body.

35. The liquid crystal display device according to claim 21,
wherein the top surface of the first structure body is rounded,
wherein a surface of the first electrode layer, which is provided over the top surface of the first structure body, is rounded,
wherein the top surface of the second structure body is rounded, and
wherein a surface of the second electrode layer, which is provided over the top surface of the second structure body, is rounded.

36. The liquid crystal display device according to claim 21,
wherein a part of the first electrode layer which is elongated from the side surface of the first structure body toward the second structure body does not overlap with the first structure body, and
wherein a part of the second electrode layer which is elongated from the side surface of the second structure body toward the first structure body does not overlap with the second structure body.

\* \* \* \* \*

UNITED STATES PATENT AND TRADEMARK OFFICE
CERTIFICATE OF CORRECTION

PATENT NO. : 8,767,166 B2
APPLICATION NO. : 12/952751
DATED : July 1, 2014
INVENTOR(S) : Daisuke Kubota et al.

It is certified that error appears in the above-identified patent and that said Letters Patent is hereby corrected as shown below:

In the Specification:

Column 4, lines 53-54, "in the ease" should read --in the case--

Column 13, line 21, "a smectie phase" should read --a smectic phase--

Column 13, line 53, "+10° C. preferably +5° C. from" should read --+10° C, preferably +5° C from--

Column 15, lines 59, "fiat shape" should read --flat shape--

Column 17, line 23, "layer 830 are to alternately" should read --layer 830 are alternately--

Column 21, line 34, "color filler" should read --color filter--

Column 24, line 33, "n-electron" should read --π-electron--

Column 25, lines 60, "scandium (Se)" should read --scandium (Sc)--

Column 35, lines 22-23, "off state current" should read --off-state current--

Column 35, line 25, "Off state" should read --Off-state--

Column 39, line 25, "substrate fanned" should read --substrate formed--

Column 43, line 20, "etched off The" should read --etched off. The--

Column 44, lines 24-25, "off state current" should read --off-state current--

Column 51, line 57, "zinc oxide ($In_2O_3$-Zn))," should read --zinc oxide ($In_2O_3$-Zn),--

Signed and Sealed this
Thirtieth Day of December, 2014

Michelle K. Lee
*Deputy Director of the United States Patent and Trademark Office*

CERTIFICATE OF CORRECTION (continued)
U.S. Pat. No. 8,767,166 B2

CONT.,
In the Specification:

Column 57, line 67, "equal to 150° C. and tower than 350° C.)" should read --equal to 150° C and lower than 350° C)--

Column 61, line 29, "pixels of R, and B" should read --pixels of R, G, and B--

Column 61, line 30, "connected to 3 m" should read --connected to 3$m$--

Column 61, line 54, "second 8.3 ms)" should read --second (≈8.3 ms)--

Column 61, line 59, "4 k2 k" should read --4k2k--

Column 63, line 33, "fainted" should read --formed--

Column 66, line 49, "ROB system," should read --RGB system,--

Column 69, line 25, "device 940.0" should read --device 9400--

Column 70, line 41, "2113" should read --21B--

In the Claims:

Claim 1, Column 73, line 20, "transistor wherein" should read --transistor, wherein--

Claim 1, Column 73, line 21, "exposing a art" should read --exposing a part--